US006445468B1

(12) United States Patent
Tsai

(10) Patent No.: US 6,445,468 B1
(45) Date of Patent: *Sep. 3, 2002

(54) METHOD AND APPARATUS FOR LINKING DESIGNATED PORTIONS OF A RECEIVED DOCUMENT IMAGE WITH AN ELECTRONIC ADDRESS

(76) Inventor: Irving Tsai, MBox-NYC, P.O. Box 699, New York, NY (US) 10021-0699

( * ) Notice: Subject to any disclaimer, the term of this patent is extended or adjusted under 35 U.S.C. 154(b) by 0 days.

This patent is subject to a terminal disclaimer.

(21) Appl. No.: 09/192,903
(22) Filed: Nov. 16, 1998

Related U.S. Application Data

(63) Continuation of application No. 08/572,629, filed on Dec. 14, 1995, now Pat. No. 5,838,458, which is a continuation-in-part of application No. 08/475,204, filed on Jun. 7, 1995, now abandoned, which is a continuation-in-part of application No. 08/137,718, filed on Oct. 15, 1993, now Pat. No. 5,495,581, which is a continuation-in-part of application No. 08/124,381, filed on Sep. 17, 1993, now abandoned, which is a continuation of application No. 07/918,150, filed on Jul. 24, 1992, now abandoned, which is a continuation of application No. 07/840,808, filed on Feb. 25, 1992, now abandoned.

(51) Int. Cl.[7] .................................................. H04N 1/04
(52) U.S. Cl. ....................... 358/402; 358/403; 358/442; 358/468
(58) Field of Search ................................. 358/402, 442, 358/403, 440, 468

(56) References Cited

U.S. PATENT DOCUMENTS 5,838,458 A * 11/1998 Tsai ............................ 358/402

* cited by examiner

Primary Examiner—Cheukfan Lee

(57) ABSTRACT

A method and apparatus for receiving document images including portions linked to one or more electronic addresses. The linked portion of the document is identified using a predetermined visual attribute, such as bold-face text, or delimiters to mark the portion. The document image is then transmitted using, e.g., existing apparatus for transmitting images, such as a facsimile machine. An electronic address associated with the identified portion of the document is also transmitted using existing techniques, such as by touch-tone telephone. The address may be a voice telephone number, facsimile telephone number, World Wide Web address, or any other address with which communication can be established. At the receiving end, both the document image and electronic address are received. Pattern matching is performed on the document image to identify the portion with the predetermined attribute as a linked portion. The received electronic address is then correlated with the linked portion. When the document image is displayed on, e.g., a computer screen, the linked portion is visually identified so that the recipient can access the electronic address by, e.g., clicking on the portion using a mouse. Communication may then be initiated by the recipient with the entity associated with the electronic address.

1 Claim, 81 Drawing Sheets

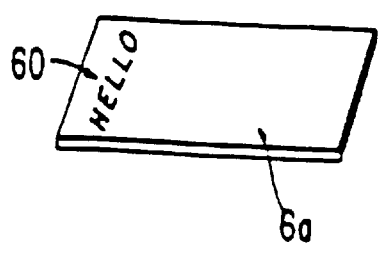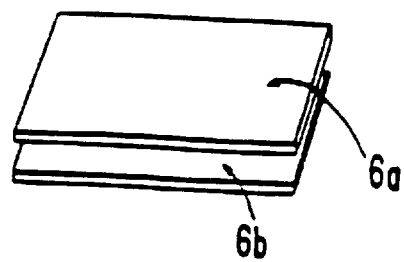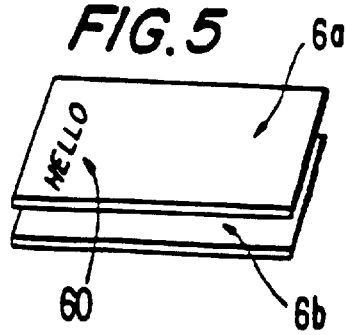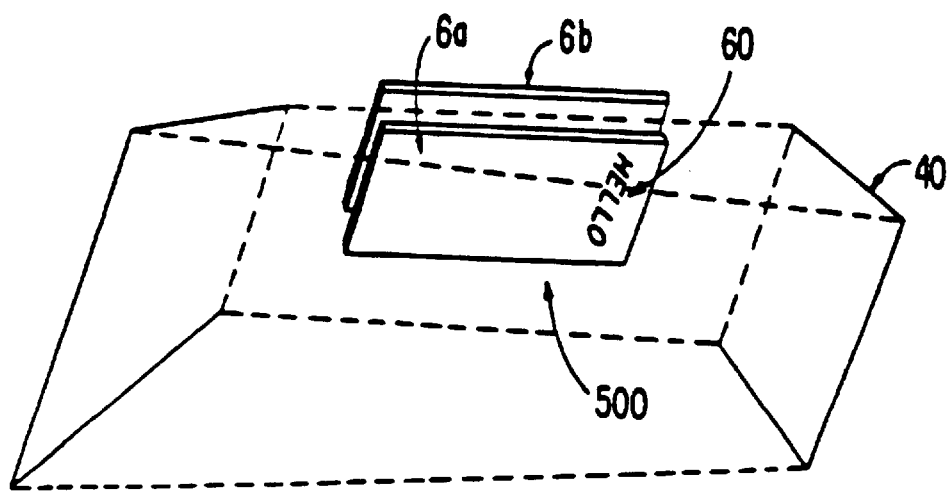

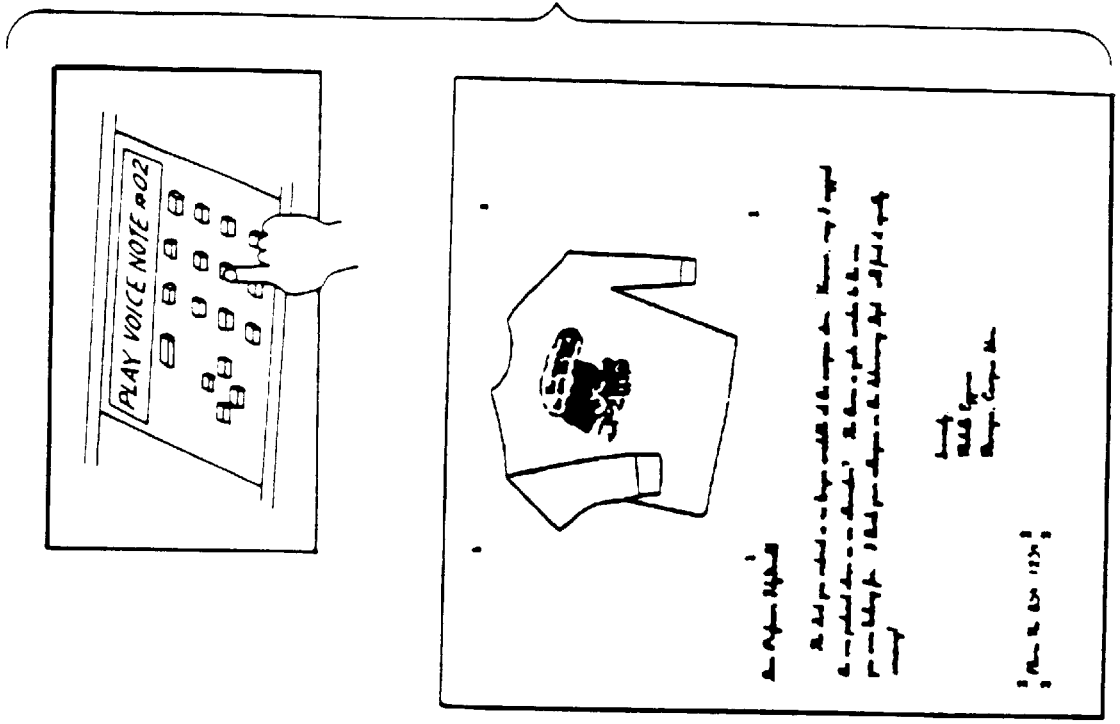
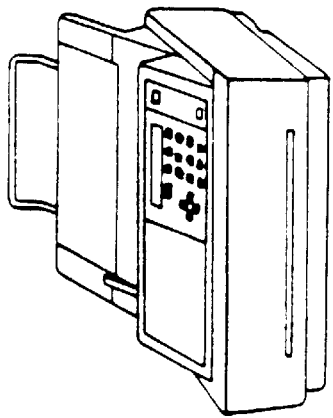
FIG. 50

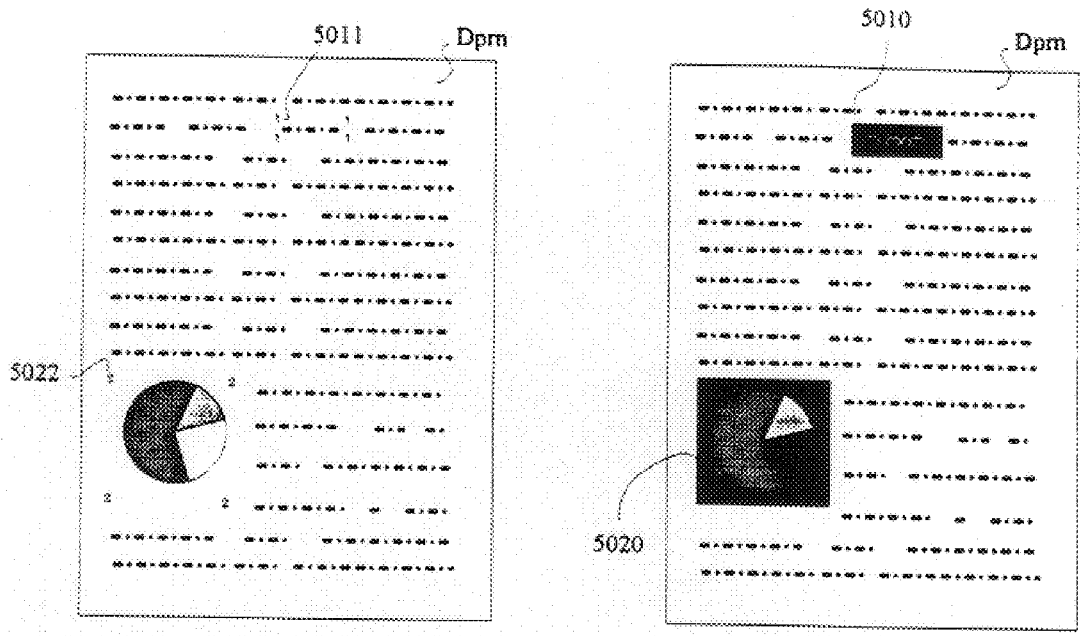
Figure 54(a)
Figure 54(c)
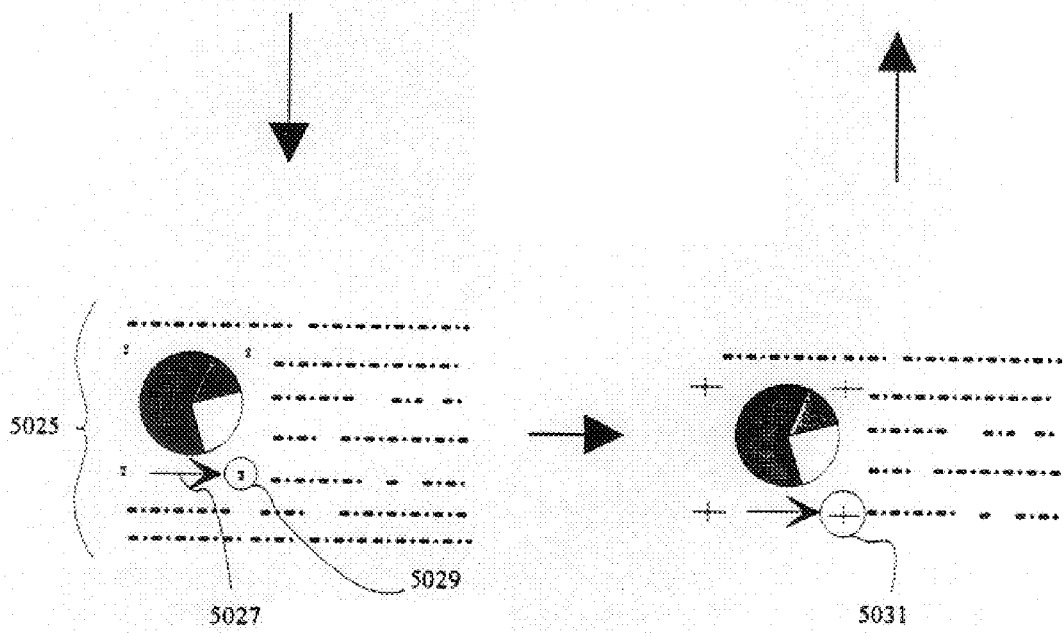
Figure 54(b)
Figure 54(d)

| NAR(p) | NAR(a) | NAR(b1,b2) | NAR(c) ... | NAR(n1,..,nm) |
|---|---|---|---|---|
| Location(p,1) | Location(a,1) | Location(b,1) | Location(c,1) | Location(n,1) |
|  |  | Location(b,2) |  |  |
|  |  |  |  | ⋮ Location(n,m) |

"As you can see, the actual outcome did not exactly match our department's prediction."   5255

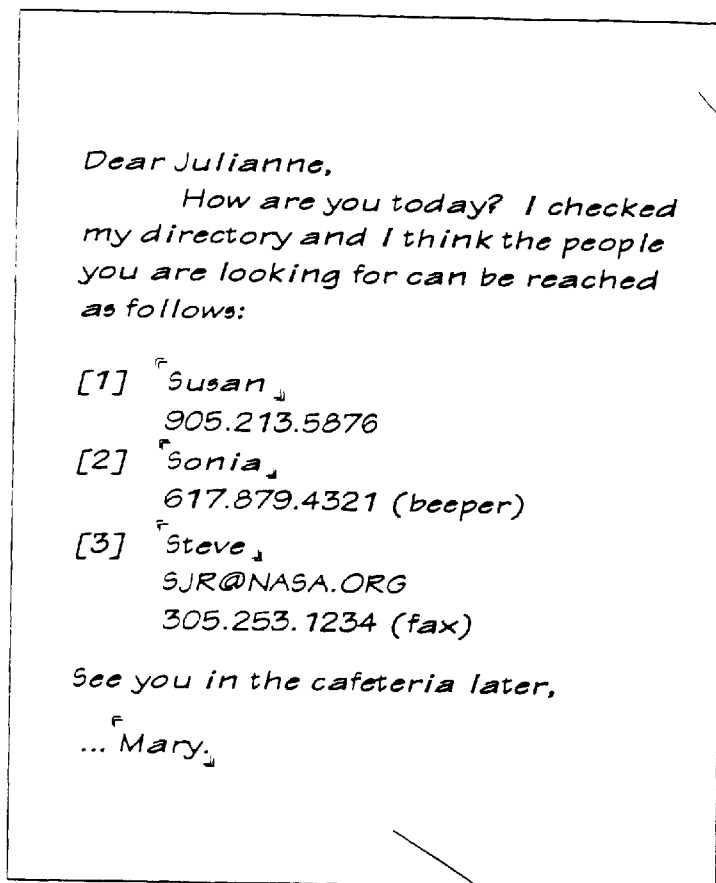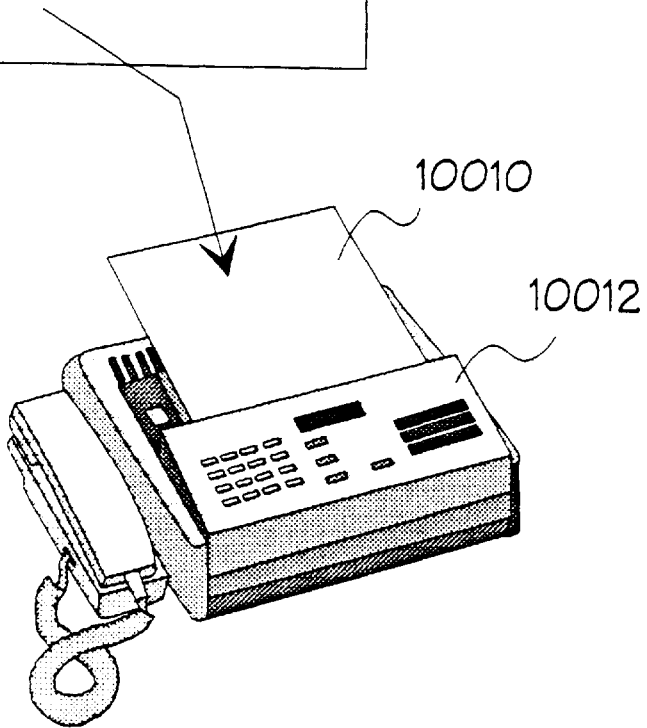
Figure 73

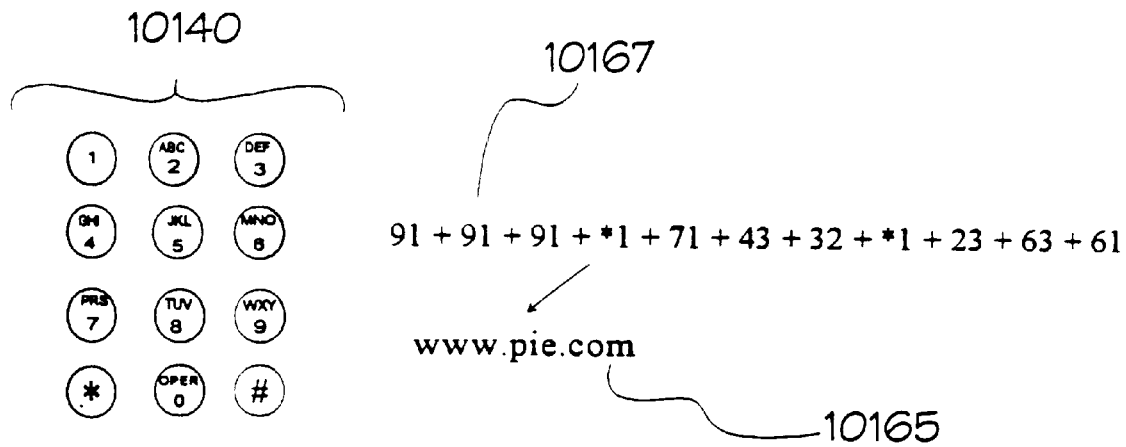
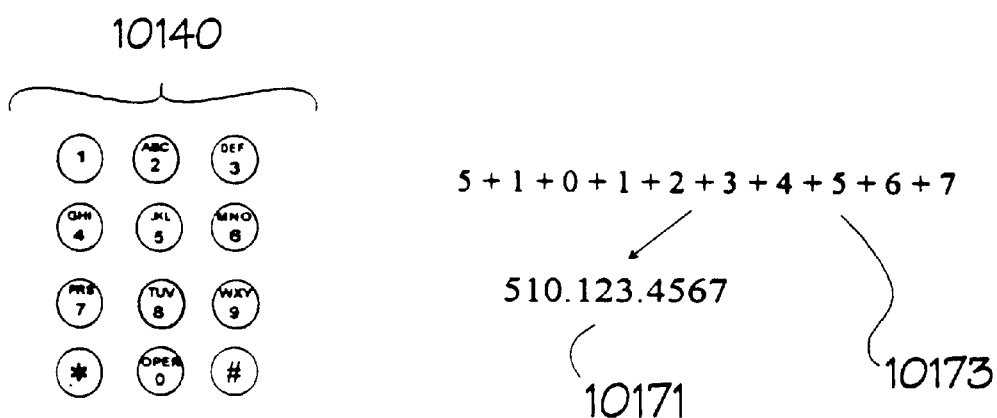
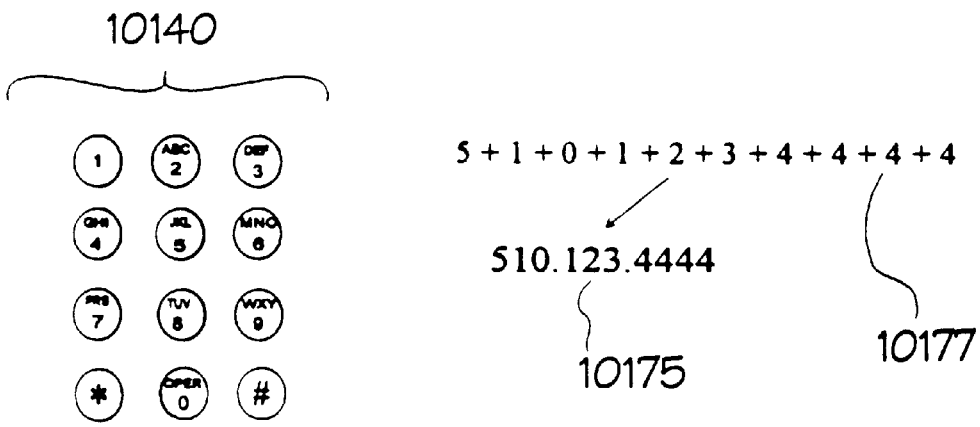
Figure 83(b)

PassCode = f(PIN #, g[ Co-PIN #])

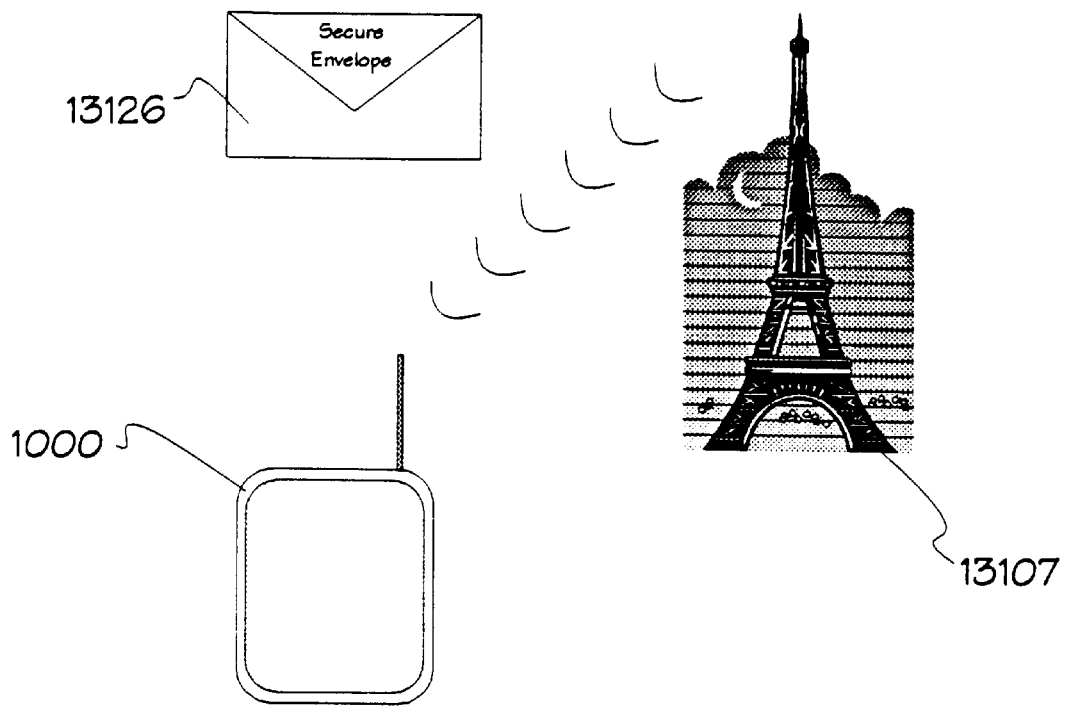
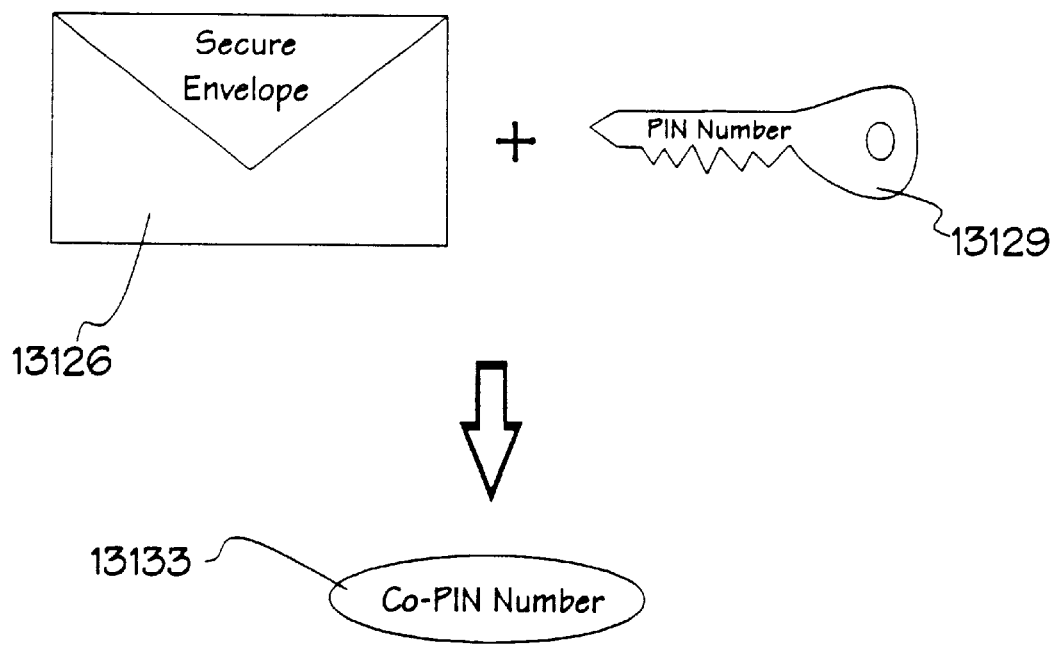
Figure 88

METHOD AND APPARATUS FOR LINKING DESIGNATED PORTIONS OF A RECEIVED DOCUMENT IMAGE WITH AN ELECTRONIC ADDRESS

This application is a con of application Ser. No. 08/572,629 filed Dec. 14, 1995 now U.S. Pat. No. 5,838,458 is a continuation-in-part of U.S. patent application Ser. No. 08/475,204, filed Jun. 7, 1995 now abandoned, which is a continuation-in-part of application Ser. No. 08/137,718, filed Oct. 15, 1993 now U.S. Pat. No. 5,495,581, which is a continuation-in-part of U.S. patent application Ser. No. 08/124,381, filed Sep. 17, 1993 now abandoned, which is a continuation of U.S. Ser. No. 07/918,150, filed Jul. 24, 1992, now abandoned, which is a continuation of Ser. No. 07/840,808, filed Feb. 25, 1992, now abandoned.

1. FIELD OF THE INVENTION

The present invention relates to a method and apparatus for communicating documents with portions linked to electronic reference information. More specifically, the present invention relates to a method and apparatus for receiving document images and linking the received image with electronic reference information, wherein the image is communicated using standard, existing equipment that otherwise would not have this capability.

2. BACKGROUND OF THE INVENTION

Known in the art are document management/recognition systems for facilitating the archival storage and retrieval of documents. Some of these systems will reduce a document down to its constituent components in the course of processing the document for storage. Examples of constituent components are text fragments, graphics fragments, bar codes, etc. In order to enable the retrieval of any given document, or to permit an original document to be reconstructed from its parts, index information may be saved so as to permit associations to be formed between attributes of the documents. However, such methods do not teach the method and apparatus of the present invention.

Also known in the art are systems for manipulating symbolic representations of text such as ASCII, EBCDIC, or the like, wherein embedded codes can be inserted at a position in the text to refer to another position, or to other information associated with the position of the embedded code. The disadvantage of these systems, however, is that the document must be both created and accessed using software capable of processing the embedded codes.

The document images of interest herein can reside on conventional hardcopy media such as paper, and may be transmitted using nothing more than ordinary facsimile equipment designed for transmitting ordinary monochrome hardcopy documents. A distinction should be drawn between equipment sometimes referred to as "Desktop Fax" units and those called "PC-Fax" units. The former are designed to accept hardcopy documents as input, which are scanned and then transmitted to a remote receiving station. The latter operate on data already in electronic format which reside in the memory of a computer; and, with respect to paper-based hardcopy, require their conversion into electronic form before operations of any kind can be performed on the contents of the hardcopy. Whereas the method taught by the present invention is not precluded from use with PC-Fax equipment, it is particularly useful in connection with ordinary Desktop Fax equipment—a significant consideration in view of the limitations of such devices as compared to the capabilities possessed by the former. The present invention can thus be used by the most rudimentary of facsimile equipment, thereby imposing a minimal set of requirements on the document sender with respect to hardware and software. In contrast, this is simply not possible with techniques currently known in the art. For example, techniques which rely on binary file transfer to communicate documents containing color transmit digital data files, as is evident from the name, and not document images; moreover, they mandate the use of a computer to process the data file being sent.

The present invention is also to be distinguished from systems directed at manipulating symbolic representations of document information, such as ones where text occurs in ASCII form, rather than in the form of a document image. Such systems cannot operate on information contained in hardcopy documents until the hardcopy documents have been optically scanned and converted into machine manipulatable code by OCR software. Only then can commands of any kind be embedded into the block of symbolic data. Furthermore, appropriate hardware such as a computer, and software such as a text editor, must be available for manipulating the symbolic data. Such systems do not enable conventional facsimile equipment to be used as they lack the capacity for symbolic manipulation. Such systems clearly do not enable a sender having nothing more than a conventional monochrome facsimile machine, a hardcopy document, and a marking implement such as a pen to achieve the benefits described herein.

It is an object of the present invention to provide a method and apparatus for altering designated portions of a received document image that does not suffer from the drawbacks of prior art systems.

SUMMARY OF THE INVENTION

The present invention relates to a method and apparatus for communicating documents with portions linked to electronic reference information. More specifically, the present invention relates to a method and apparatus for receiving document images and linking the received image with electronic reference information, wherein the image is communicated using standard, existing equipment that otherwise would not have this capability. For example, a standard fax machine may be used to convey a document having a portion electronically linked to electronic audio information.

The present invention comprises an apparatus for linking a document with reference information associated therewith comprising means for receiving an electronic representation of a document image, said document having a portion to be linked to electronic reference information, wherein said portion is designated by a predetermined attribute of the received document image; means for electronically scanning the electronic representation of the document image to locate said predetermined attribute of the document image; means for identifying the linked portion of the document based on the location of said predetermined attribute; means for acquiring the electronic reference information associated with the linked portion; means for correlating the linked portion of the document with the associated electronic reference information; and means for providing a pointer from the linked portion in the document to each piece of electronic reference information associated therewith.

In one embodiment of the invention, the received document image may be transmitted using standard facsimile protocols and the electronic reference information comprises audio information transmitted using standard voice channel telephony.

In a further embodiment of the present invention, the electronic reference information comprises address information related to the designated portion of the document image. The recipient of the document image is provided with means for receiving the document image and the electronic reference information comprising address information. The recipient's means further comprises means for accessing the address information and establishing a communications session with the address or addresses associated with the designated portion of the document, which may, for example, include a voice telephone number, facsimile number, pager number, e-mail address, or a World Wide Web (WWW) address.

A detailed description of preferred embodiments of the invention will be made with reference to the accompanying drawings, wherein like numerals designate corresponding parts in the several figures.

FIG. 3 illustrates a preferred embodiment of the image-forming components of the present invention.

FIG. 4 illustrates a reflective layer that is disposed adjacent to or near the image-forming element of FIG. 3.

FIG. 5 illustrates the structures shown in FIG. 4 with an image present on the image-forming member (in this particular example, a set of alphabetical characters assembled into the word "Hello").

FIG. 6 is a perspective view from below the copier window of the structure in FIG. 5, when the illustrated embodiment of the present invention is mounted on the copy board of a copier.

Figure 17E:
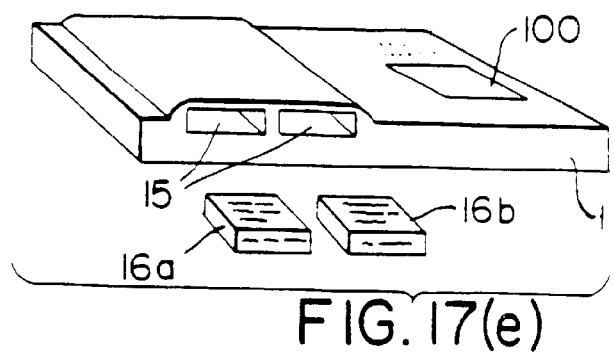
FIG. 17a shows a module insertable into the apparatus 1 for reading a data storage medium comprising a first format.
FIG. 17b shows a module insertable into the apparatus 1 for reading a data storage medium comprising a second format.
FIG. 17c shows a module insertable into the apparatus 1 for reading a data storage medium comprising a third format.
Figure 17D:
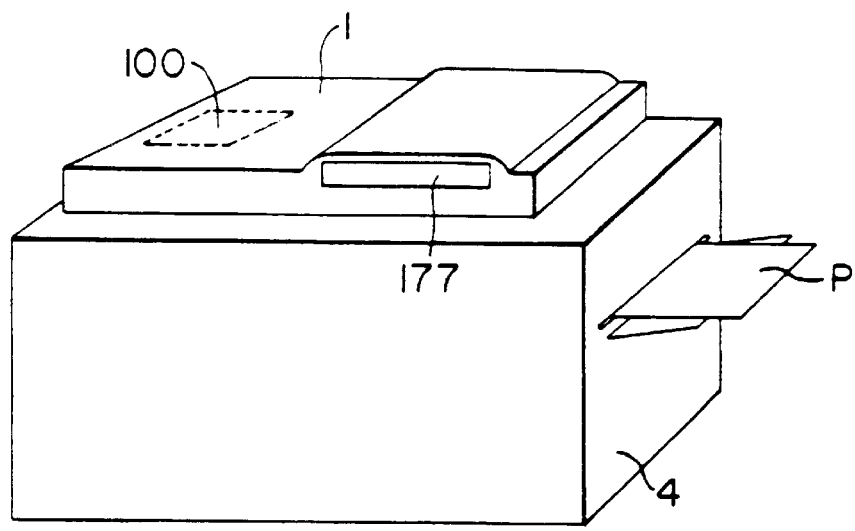

FIG. 17d shows a copier-print apparatus 1 on top of a photocopier. The apparatus 1 has a display console 100, and a receiving means 177 for receiving the modules shown in FIGS. 17a–c.

FIG. 17e shows a copier-print apparatus with receiving means 15 for receiving user-installable option modules 16a and 16b, which are used to extend the functional capabilities of the apparatus.

Figures 18A, 18B:
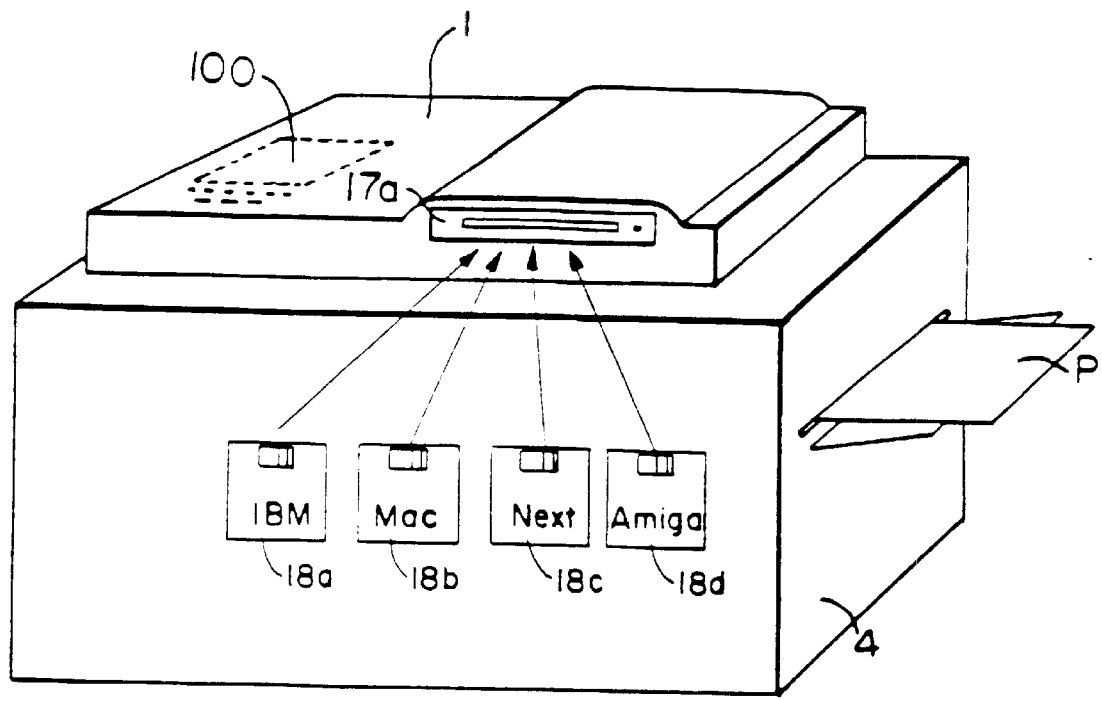

FIG. 18a shows a copier-print apparatus capable of using data from a variety of different, and mutually incompatible computer platforms.

FIG. 18b shows the insertion of two modules into the copier-print apparatus.

FIGS. 19(a)–19(g) illustrate an example of a process that might be involved in creating a hard copy of a disk file using a tablet in accordance with the present invention.

Figure 20A:
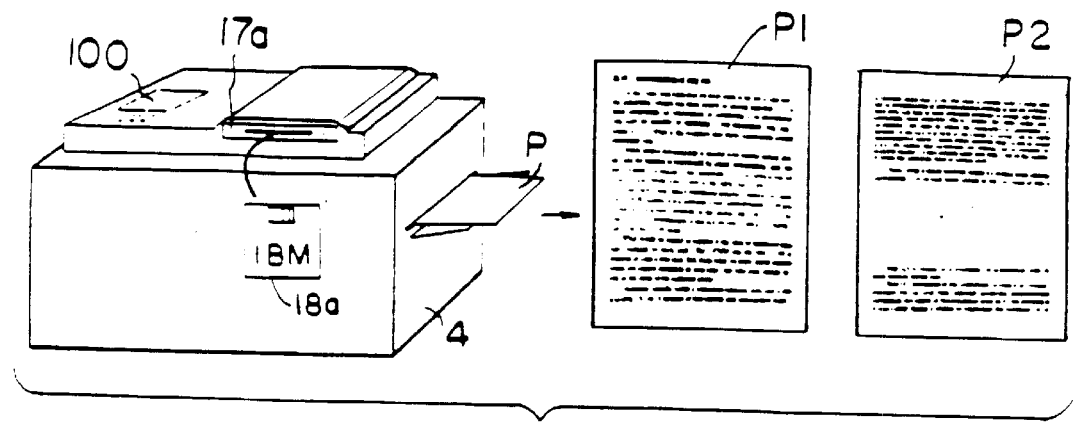
Figure 20B:
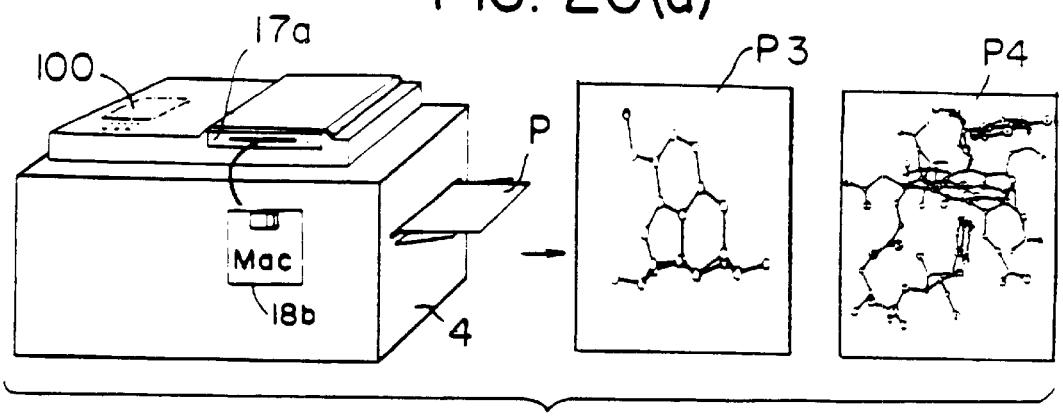
Figure 20C:
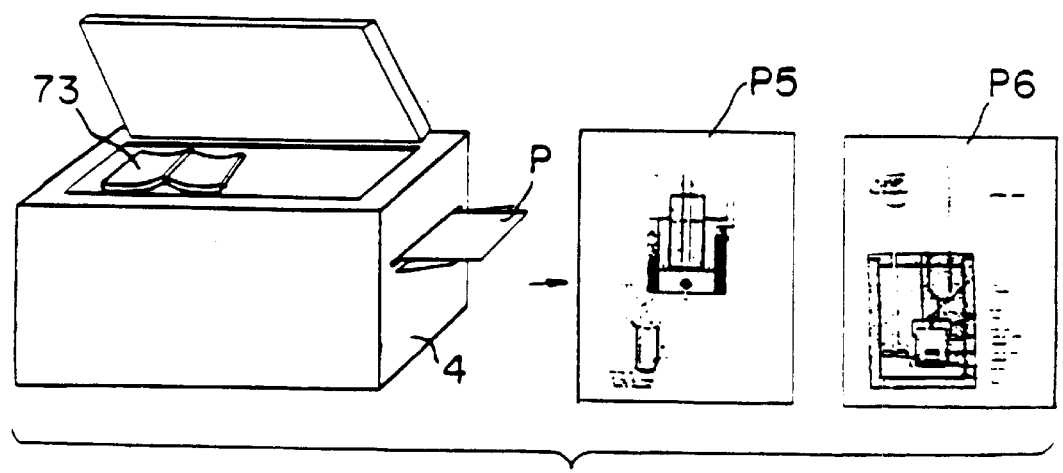

FIGS. 20(a)–(c) illustrate an example of the versatility afforded by an embodiment of the present invention.

Figure 21:
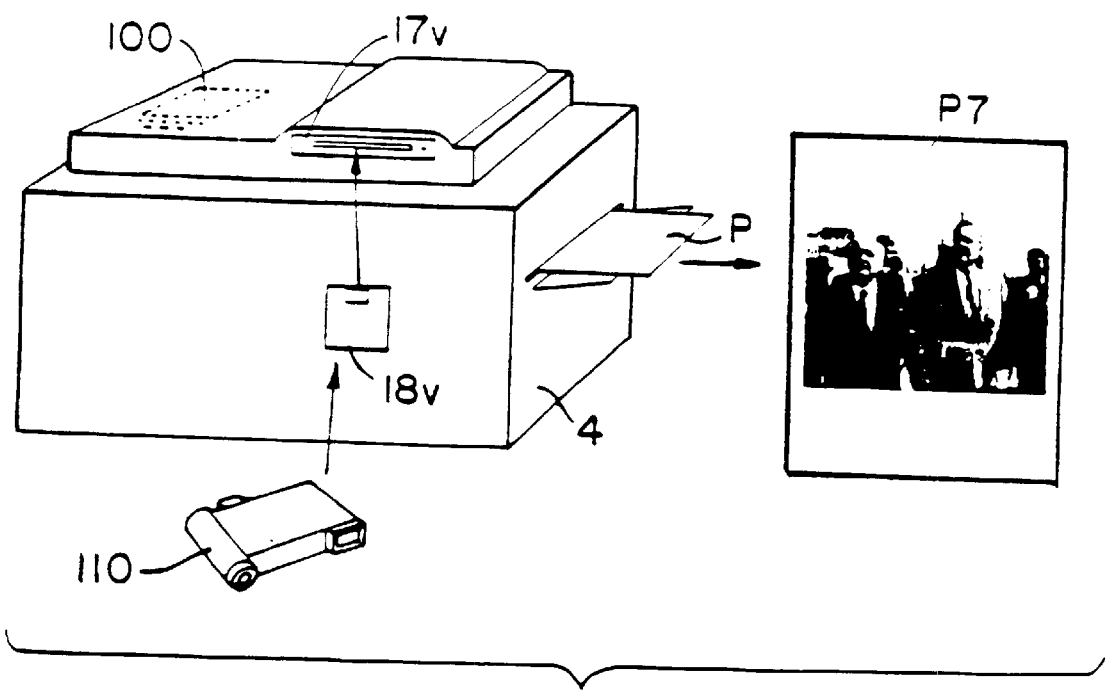

FIG. 21 illustrates an example of the use of a tablet in printing digital photographs taken by an electronic still camera.

Figure 22:
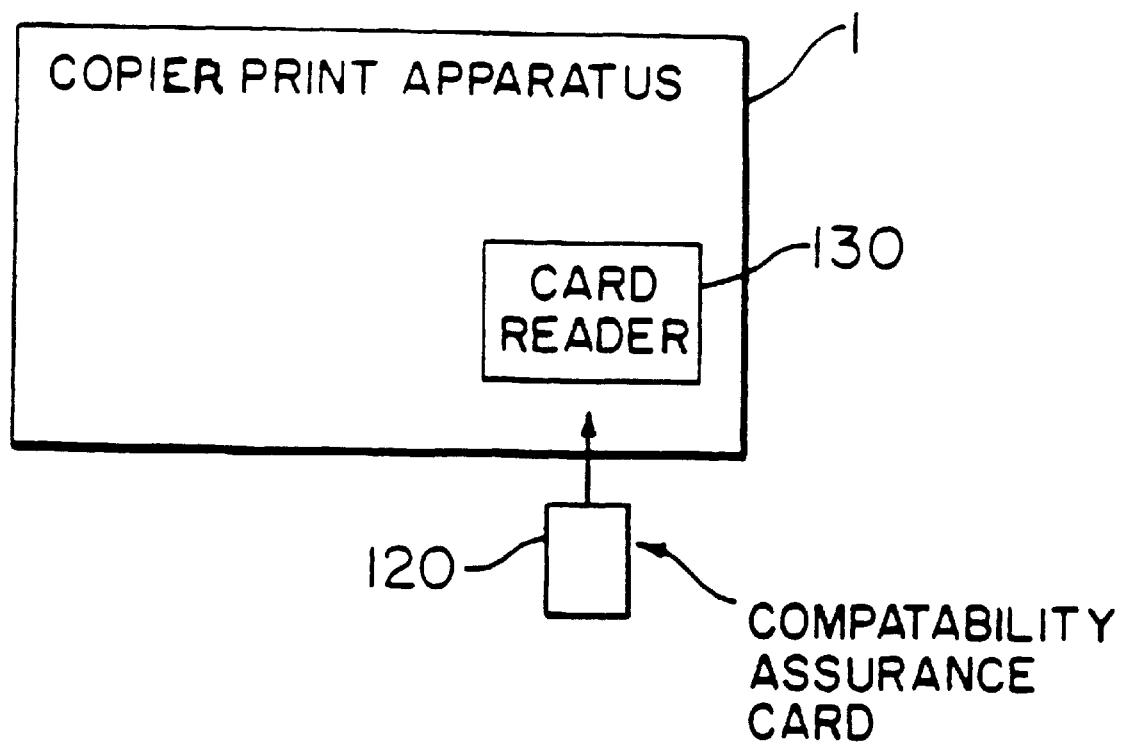

FIG. 22 illustrates an example of the incorporation of a compatibility assurance card reader into a tablet.

Figure 23:
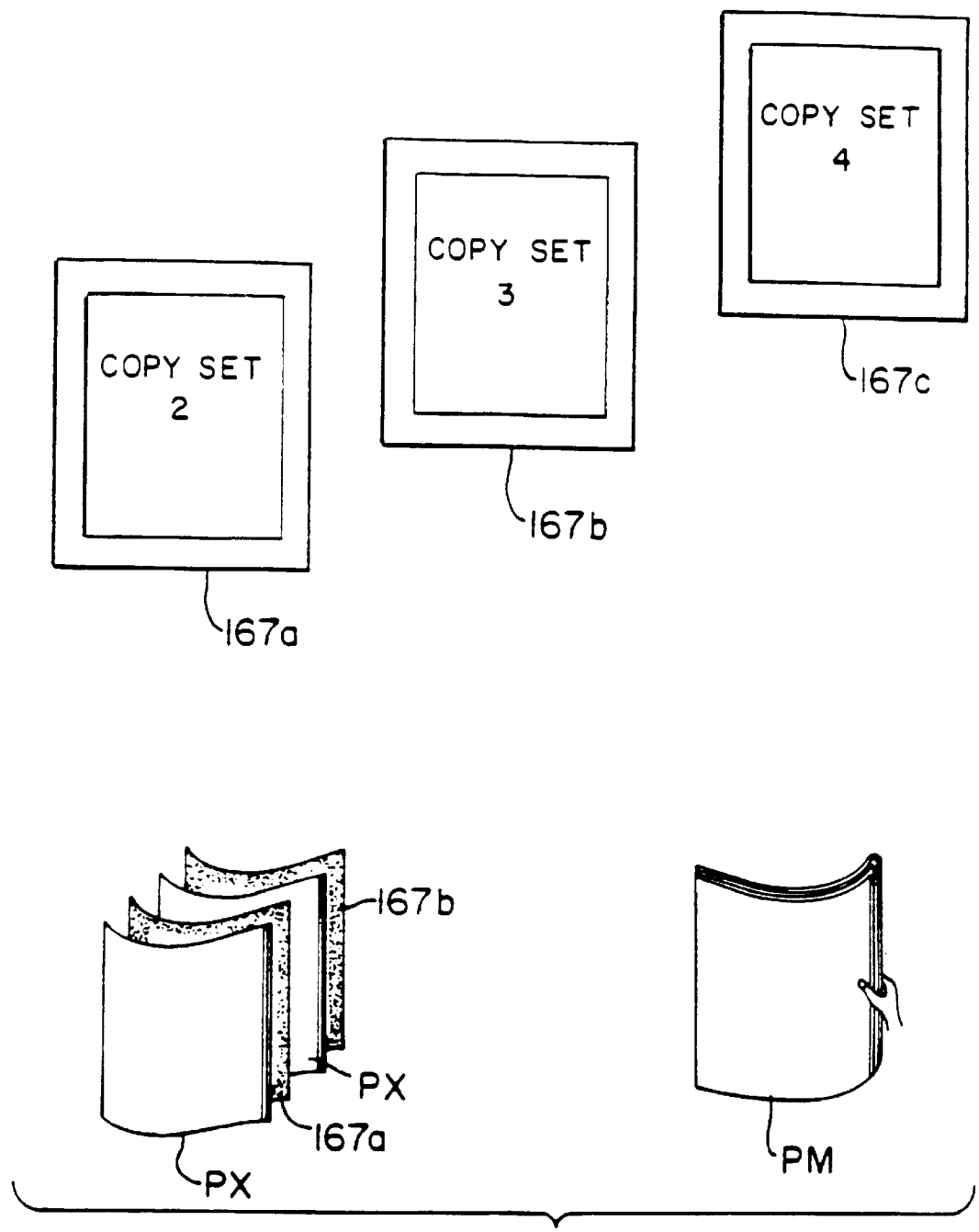

FIG. 23 illustrates an example of a feature referred to as "Pseudo-Collation".

Figure 24:
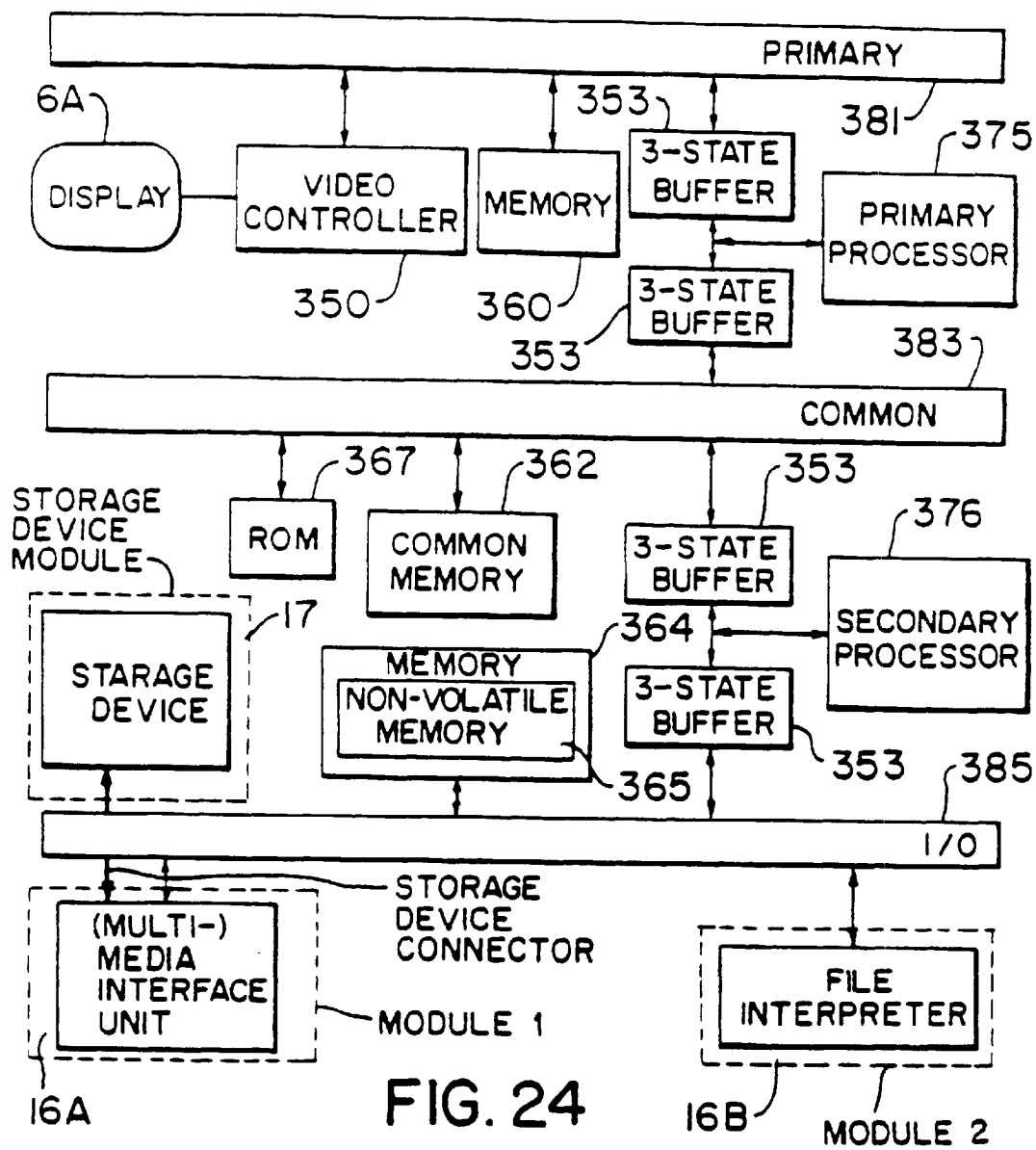

FIG. 24 illustrates an example of a hardware configuration in one embodiment of the present invention.

Figure 25:
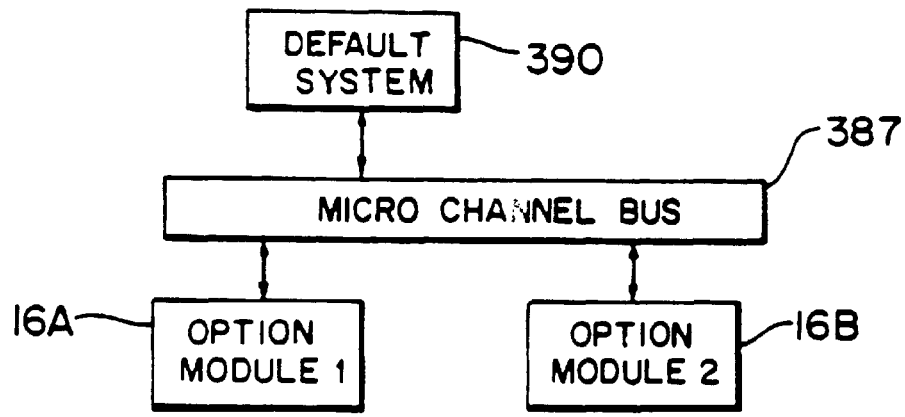

FIG. 25 illustrates an example of the application of MicroChannel Bus architecture by a tablet so that multiple masters can be effectively supported.

Figure 26:
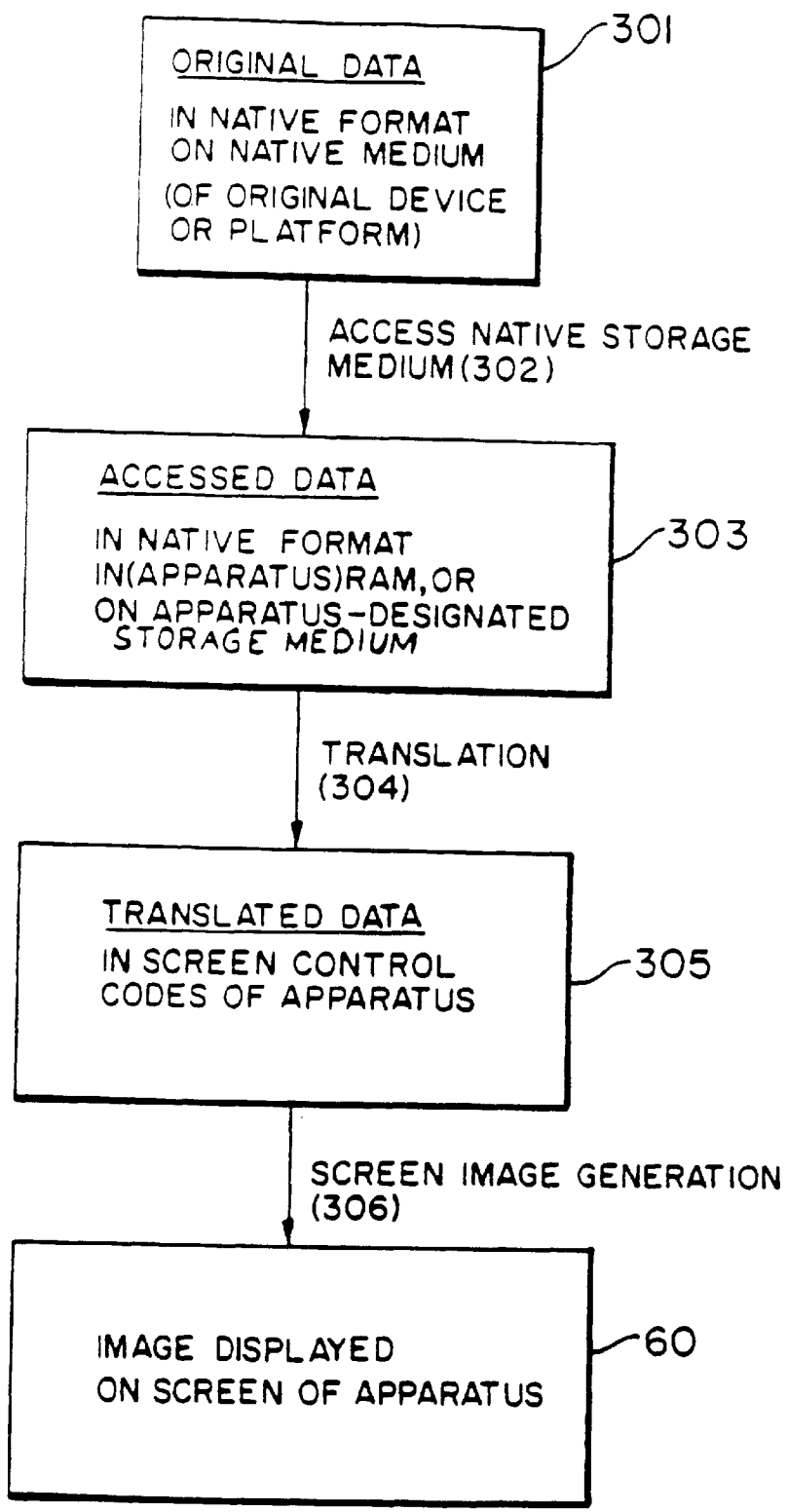

FIG. 26 illustrates an example of a process for obtaining hard copy with a tablet from data created by a software package, that is saved on a medium such as a diskette.

Figure 27:
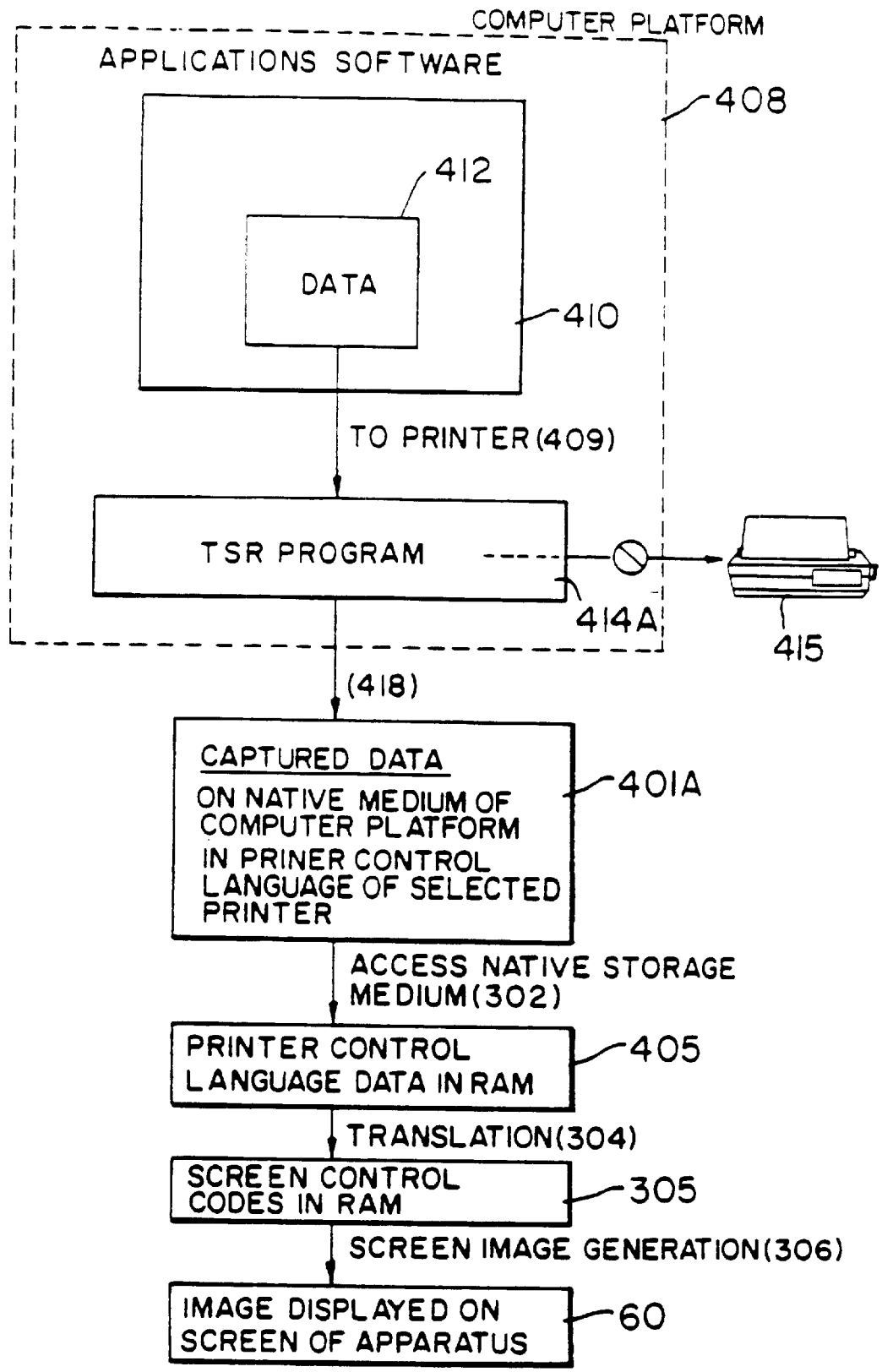
Figure 28:
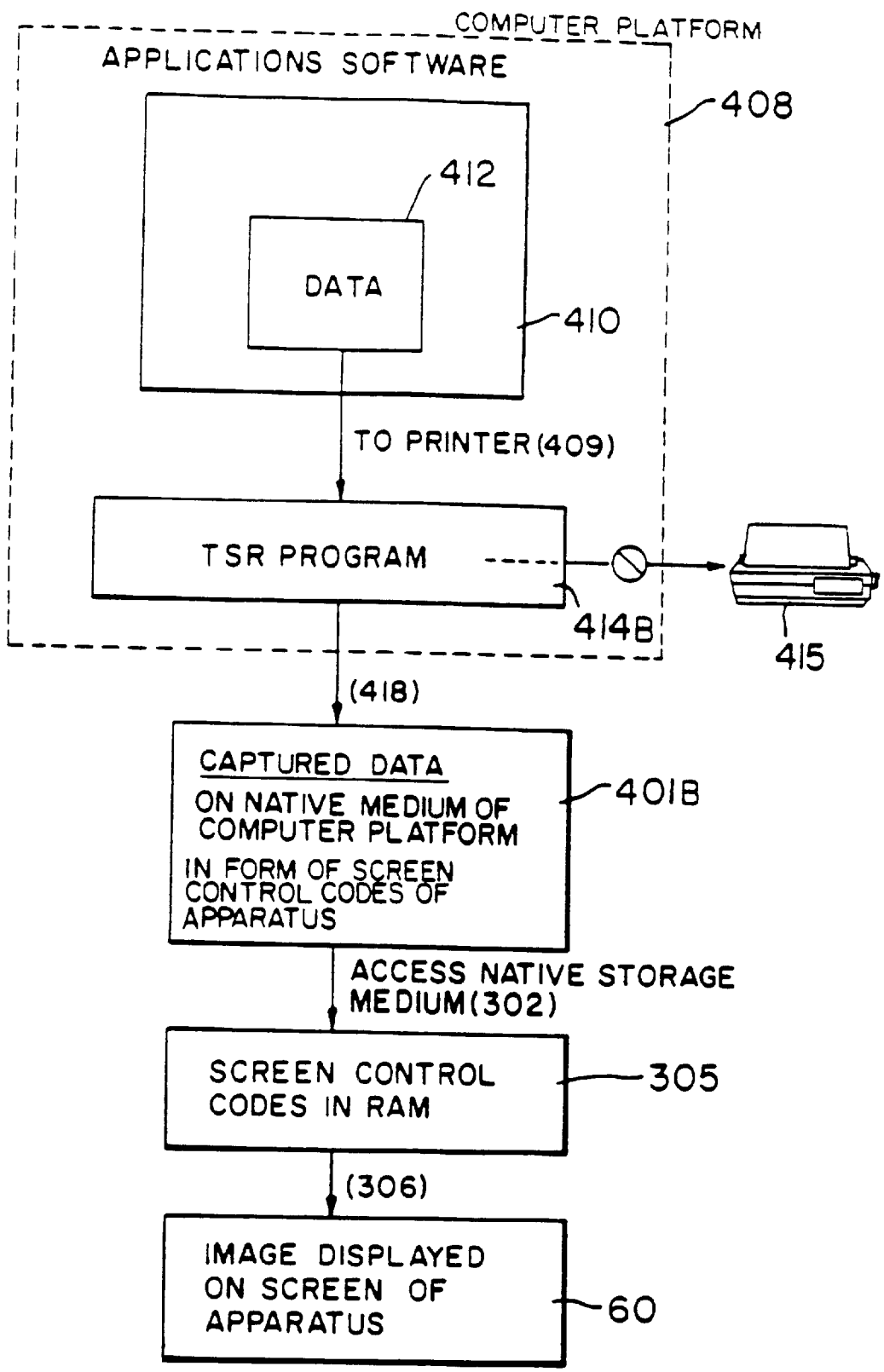

FIGS. 27 and 28 illustrate an example of an alternate method of getting data created by an applications program into a tablet.

Figure 29:
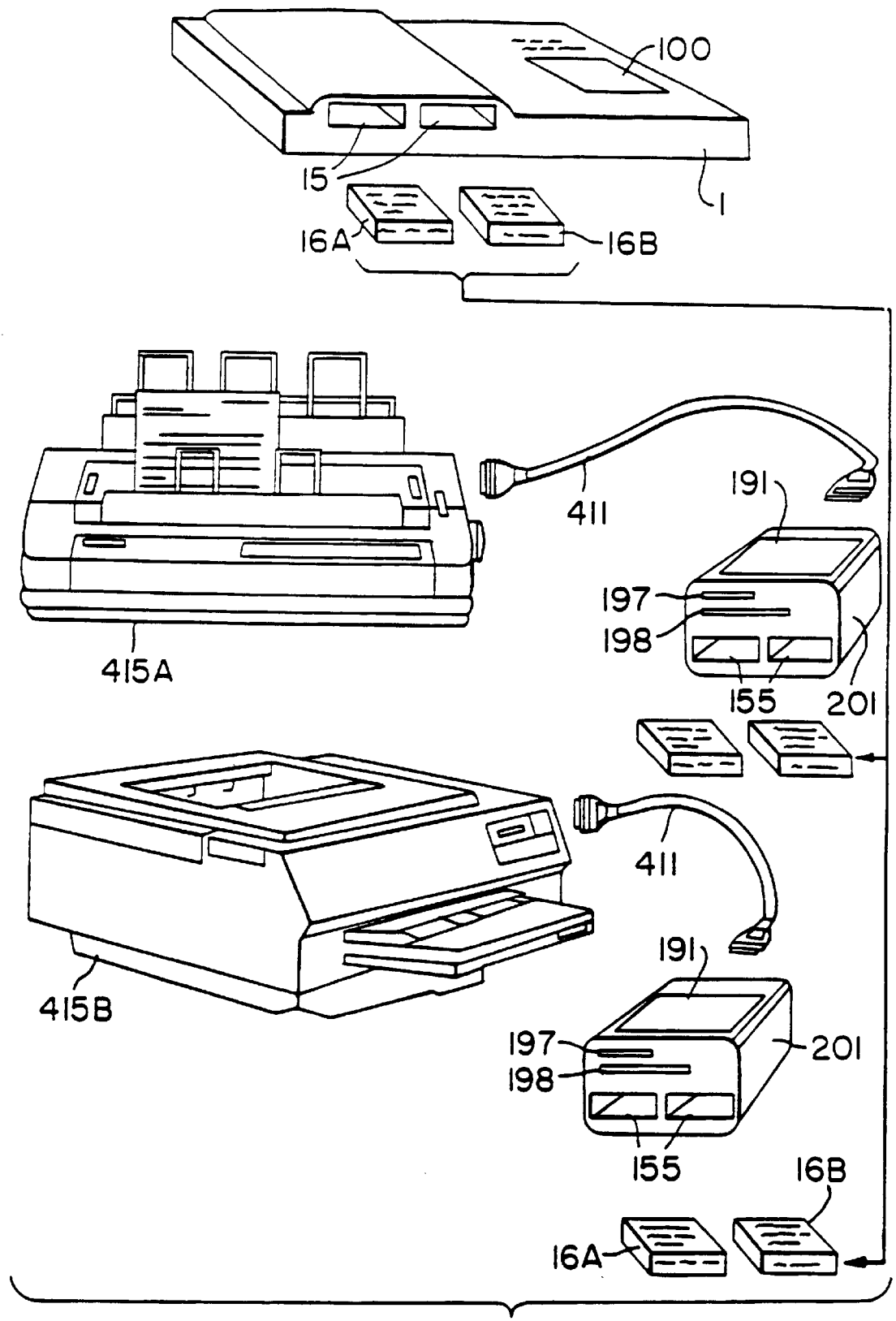

FIG. 29 illustrates an example of how a device controller module and a file interpreter module of a tablet might be "borrowed" by a conventional printer.

Figure 30A:
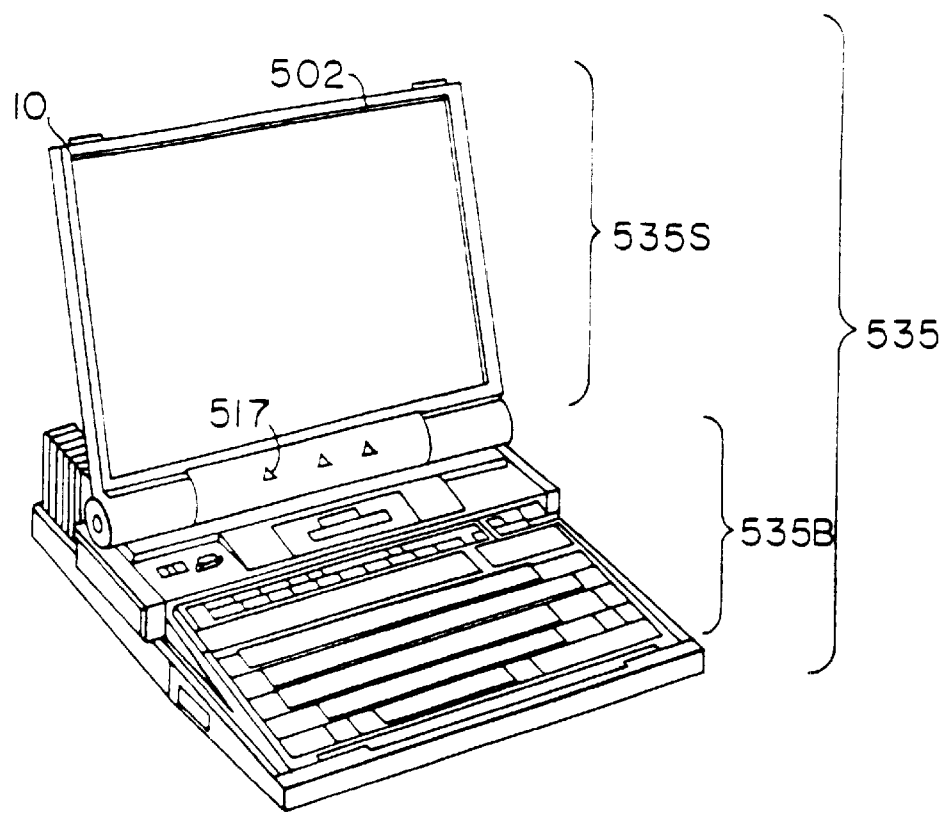

FIG. 30a shows a portable computer capable of producing hard copy using a conventional photocopier from applications software run thereon.

Figure 30B:
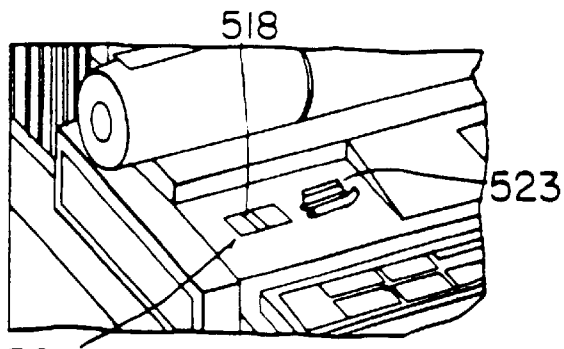

FIG. 30b shows a switch provided on the portable computer for enabling information to be printed using either a conventional photocopier, or a standard printer attached to the computer.

Figure 30C:
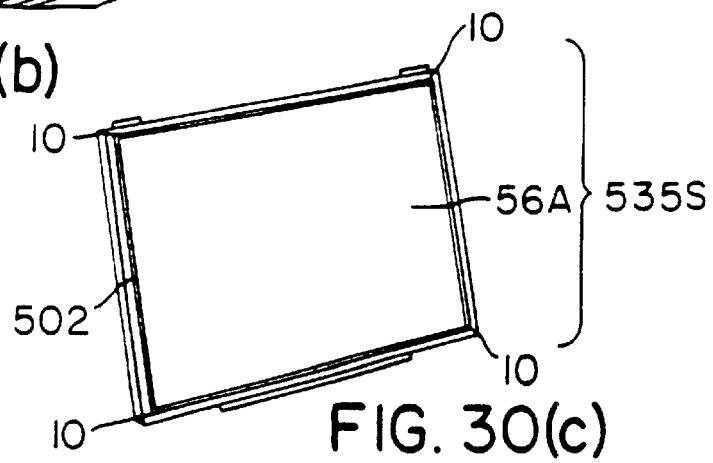

FIG. 30c shows the display screen of the portable computer, with photosensors and light gasketing.

Figure 31:
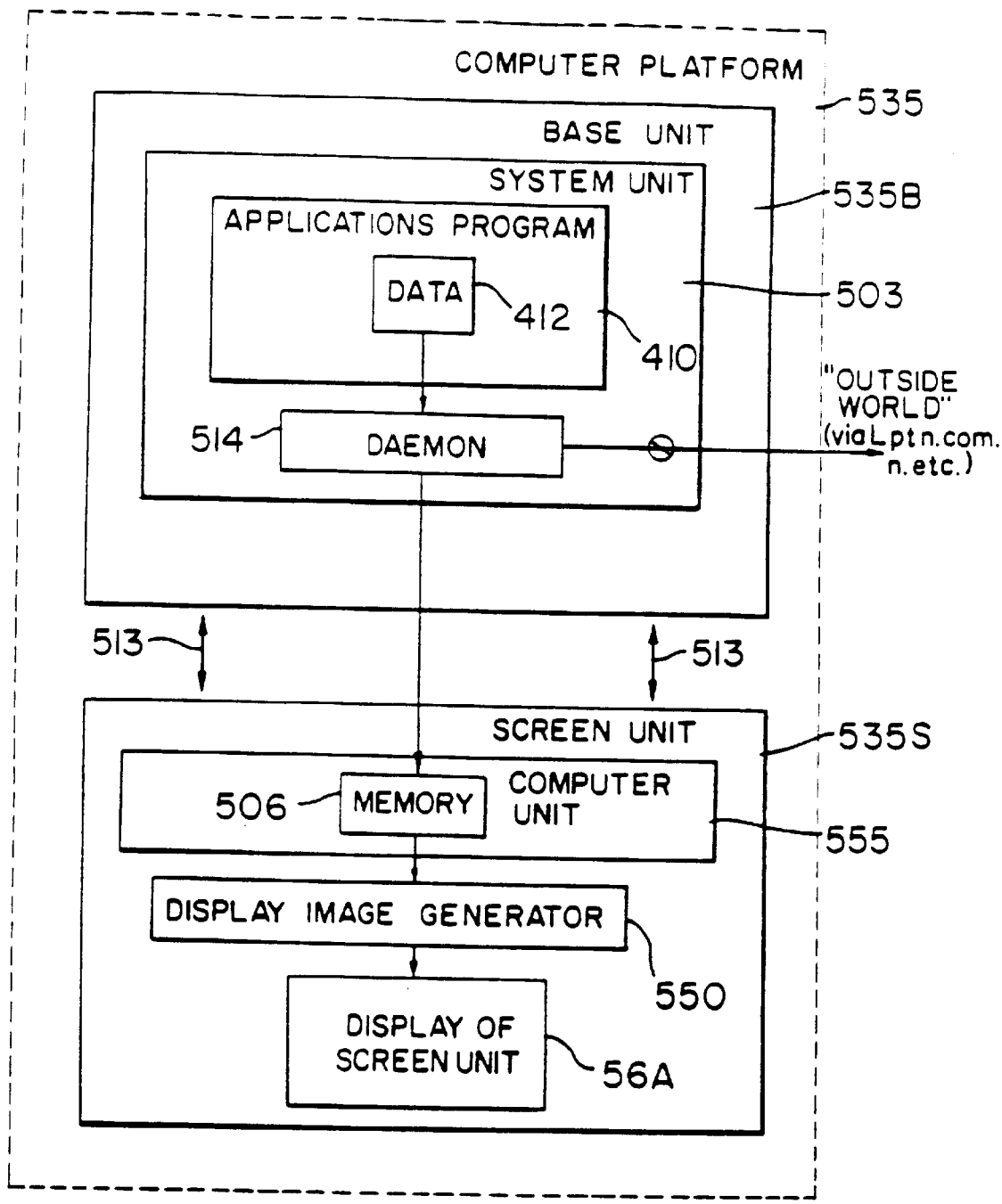
Figure 32:
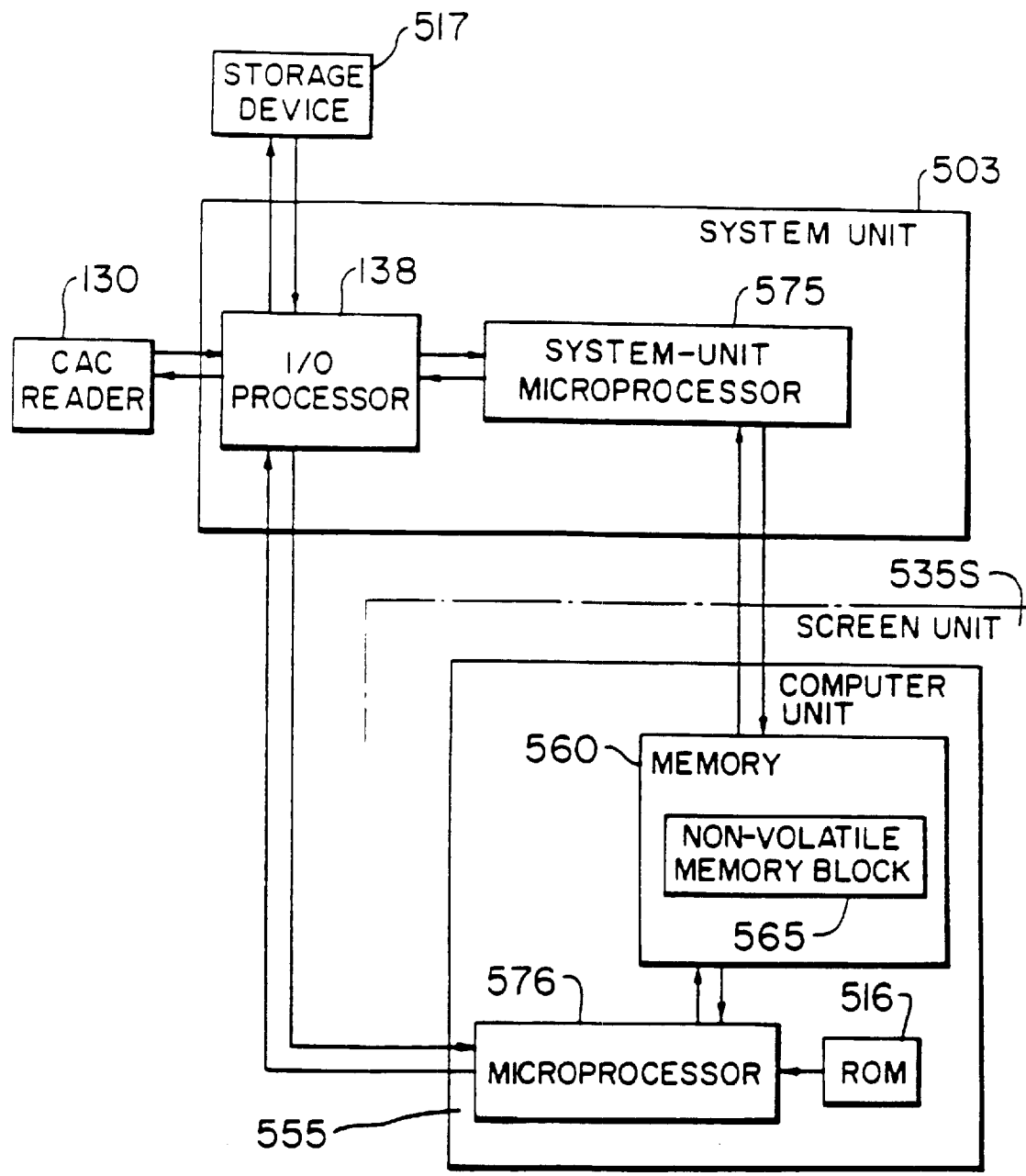

FIGS. 31 and 32 illustrate an embodiment of a portable computer constructed specifically to permit data to be "printed" by using a display screen with a copier.

Figure 33:
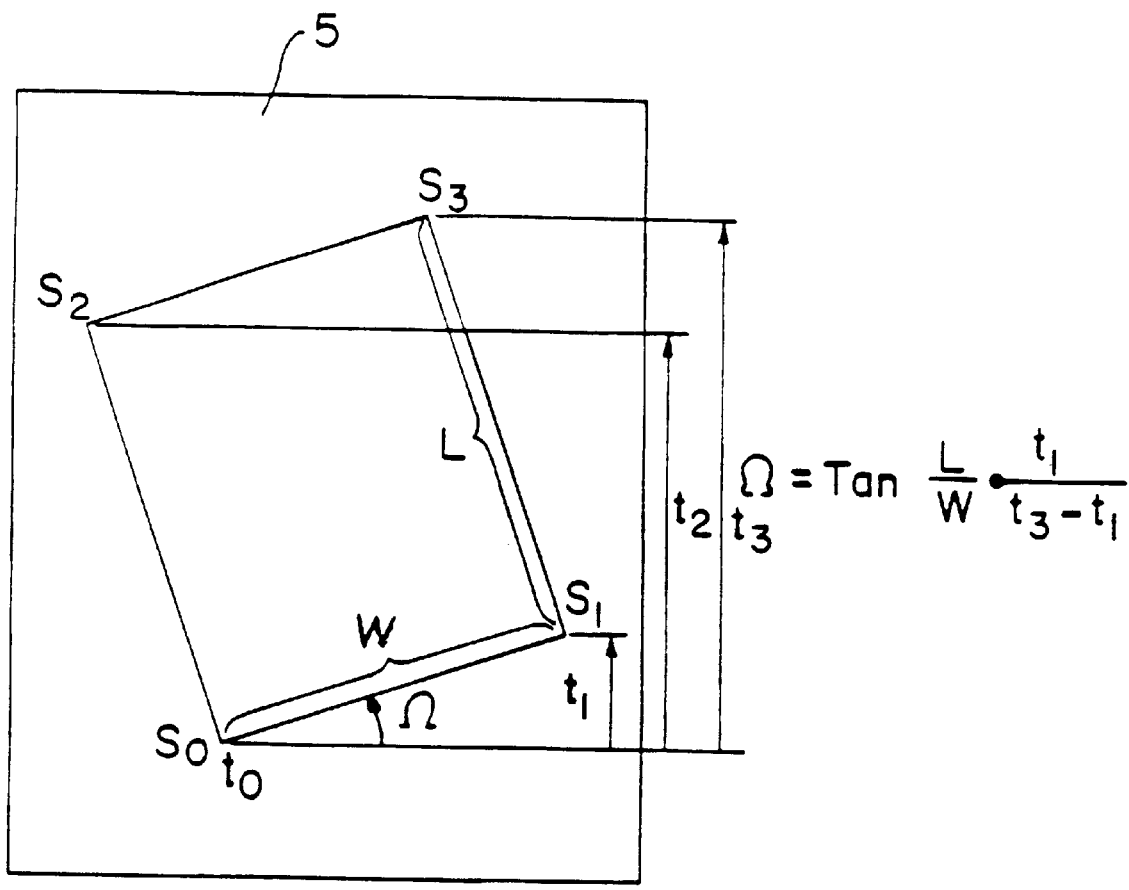

FIG. 33 illustrates an example of a system for optimizing the angular orientation of a hard copy image generated by an image display screen of a tablet.

Figure 34:
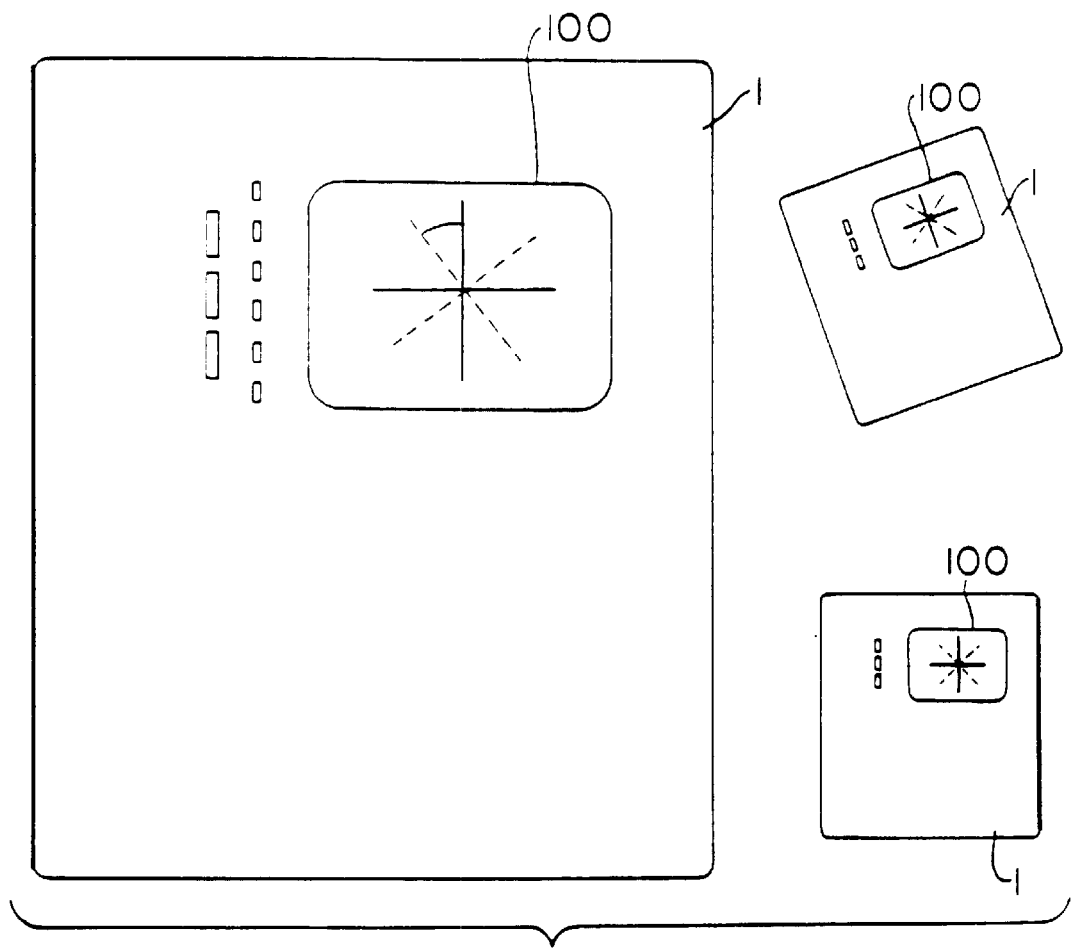

FIG. 34 illustrates an example of an operator's console screen that may be provided on the back of a tablet to visually illustrate a calculated skew angle.

Figure 35:
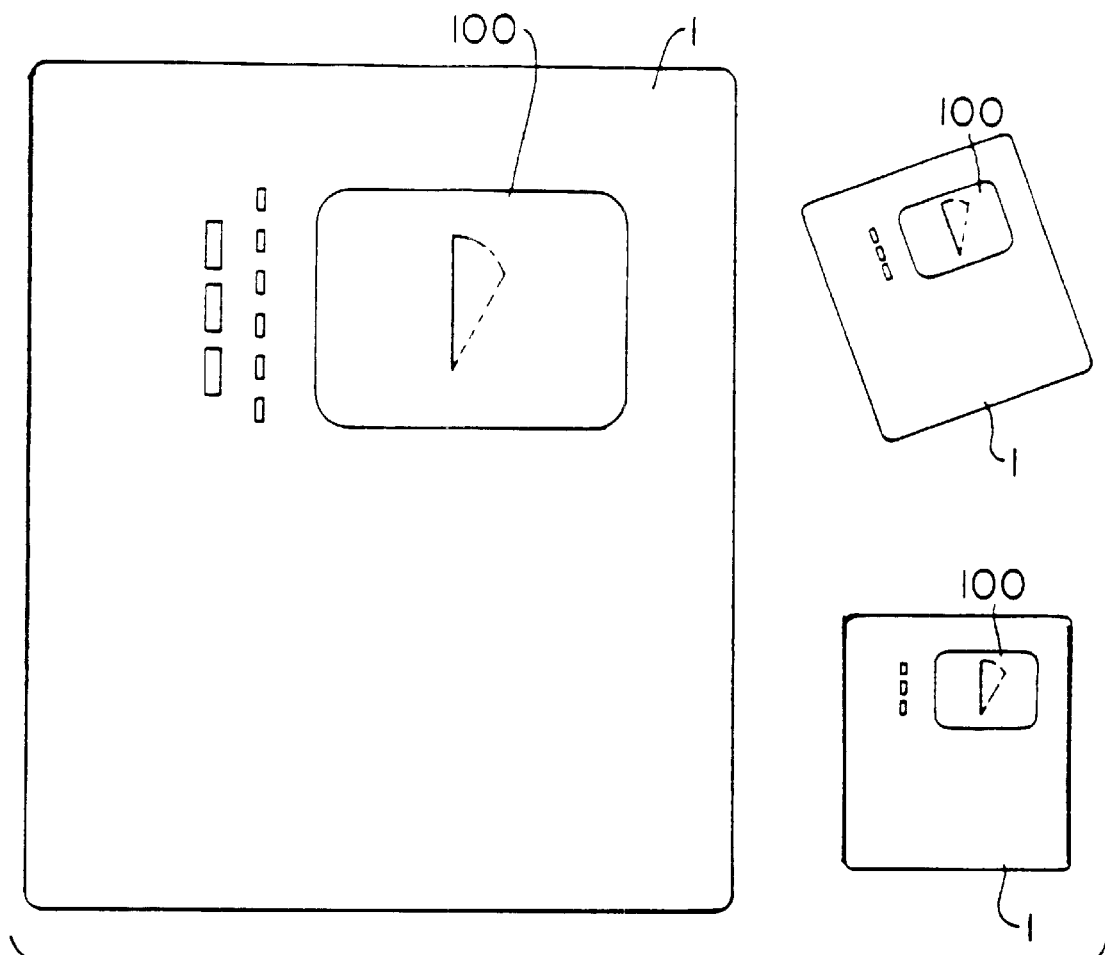

FIG. 35 illustrates an example of an alternative display in which a skew angle ÿ is depicted as an arc of a circle.

Figure 36A:
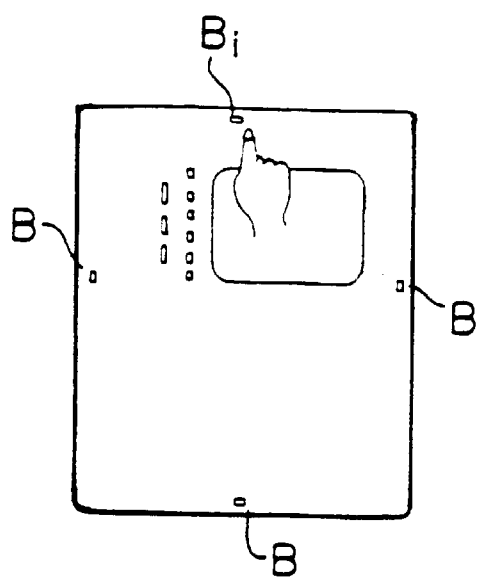

FIG. 36a shows a set of buttons used to assist in producing hard copy on a copier.

Figure 36C:
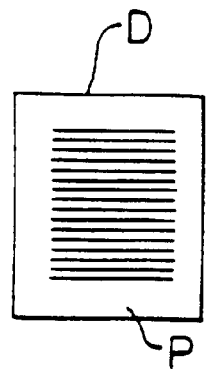
Figure 36B:
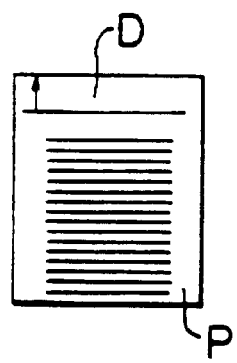

FIG. 36b shows a hard copy page with an improperly positioned image. The dot D is below the top margin of the printed sheet, so the tablet must be shifted upward.

FIG. 36c shows a hard copy page that has been correctly imaged by the copier, with alignment dot D at the upper margin of the printed sheet.

Figure 36D:
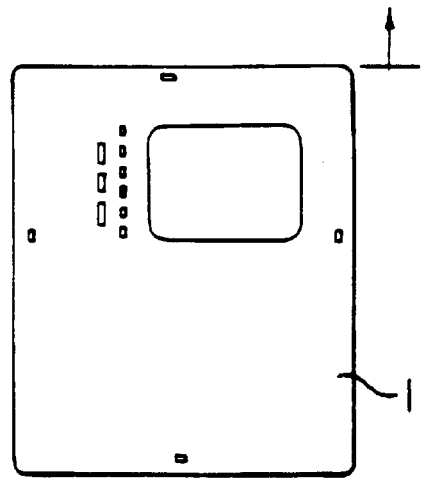

FIG. 36d shows a tablet being shifted in a direction to form a correctly aligned image by a copier.

Figure 37:
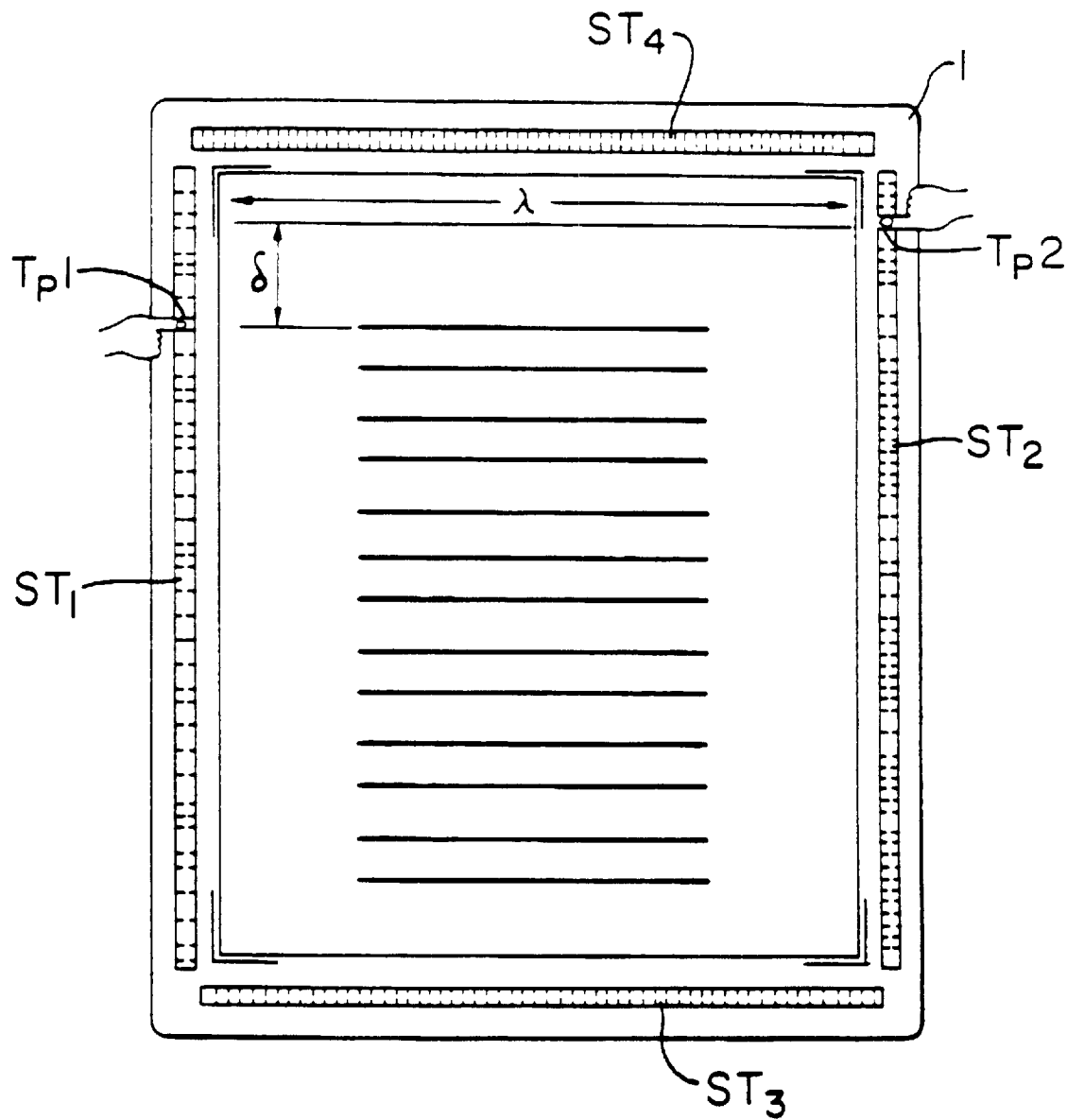

FIG. 37 illustrates an example of an alternative system for optimizing the rectilinear orientation of an image on a printed page.

Figure 38:
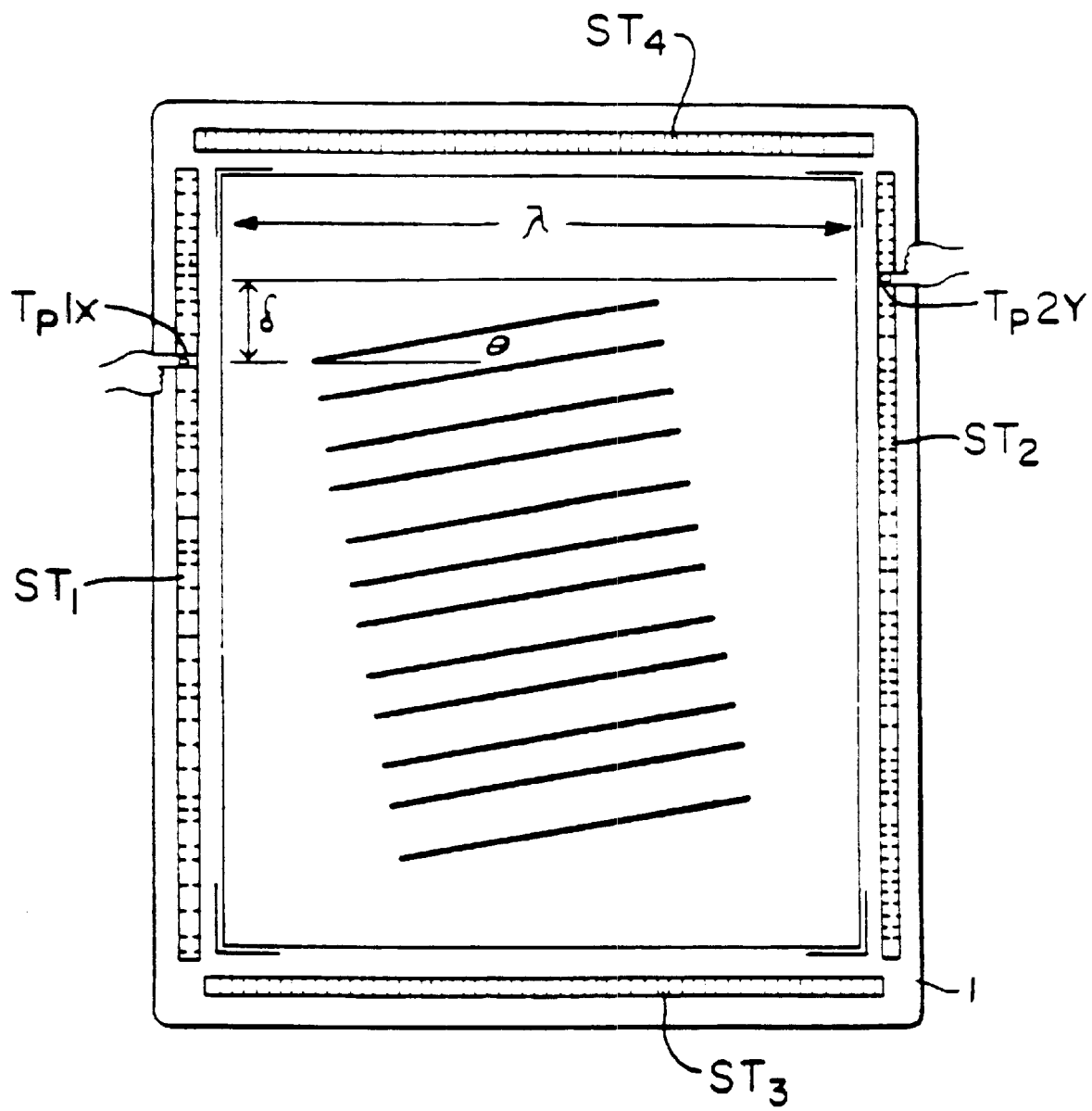

FIG. 38 illustrates an example of an alternative system for optimizing the angular orientation of an image on a printed page.

Figure 39:
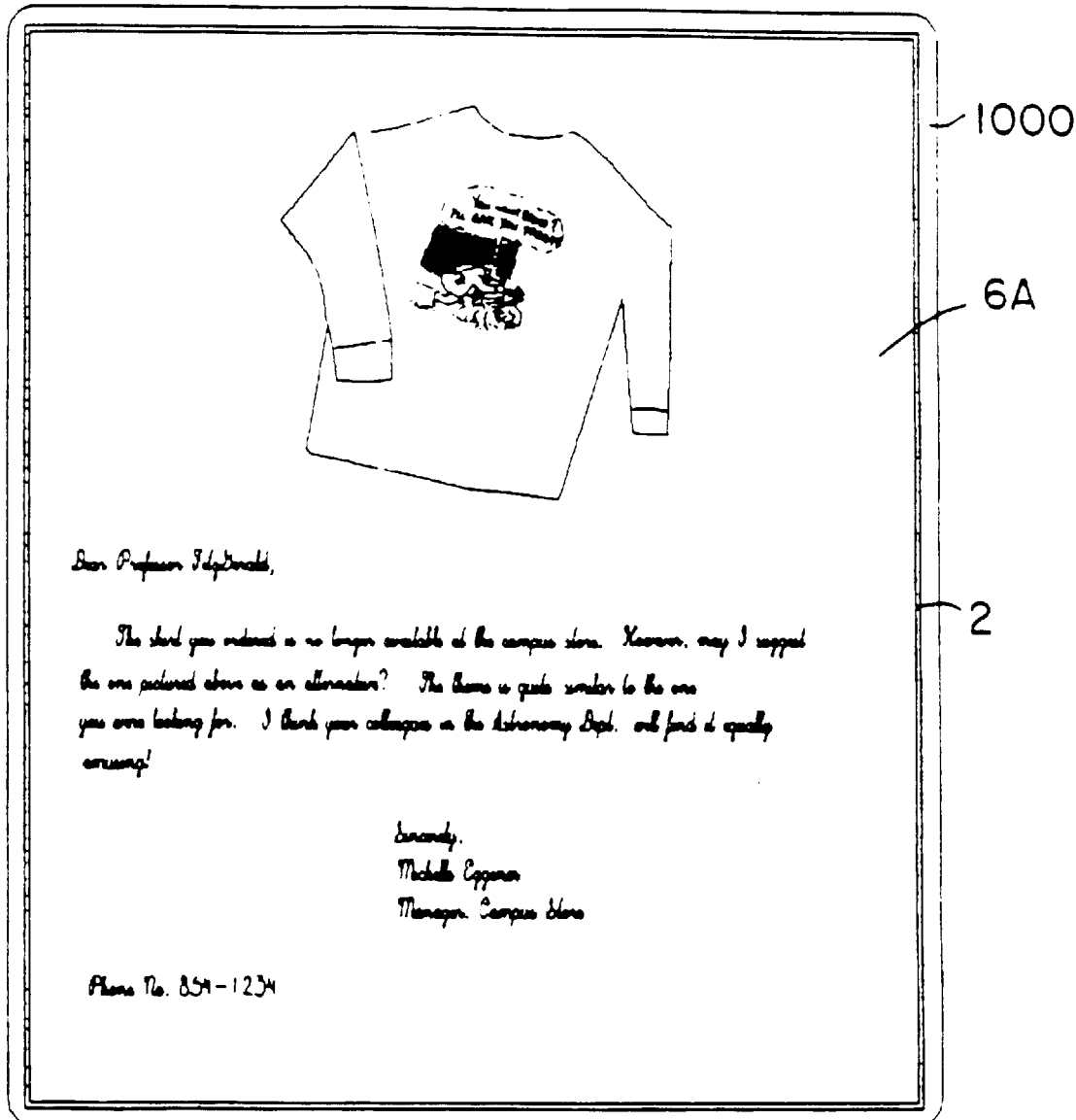

FIG. 39 illustrates an example of how a fax document might appear displayed on an image display screen of a fax tablet.

Figure 40:
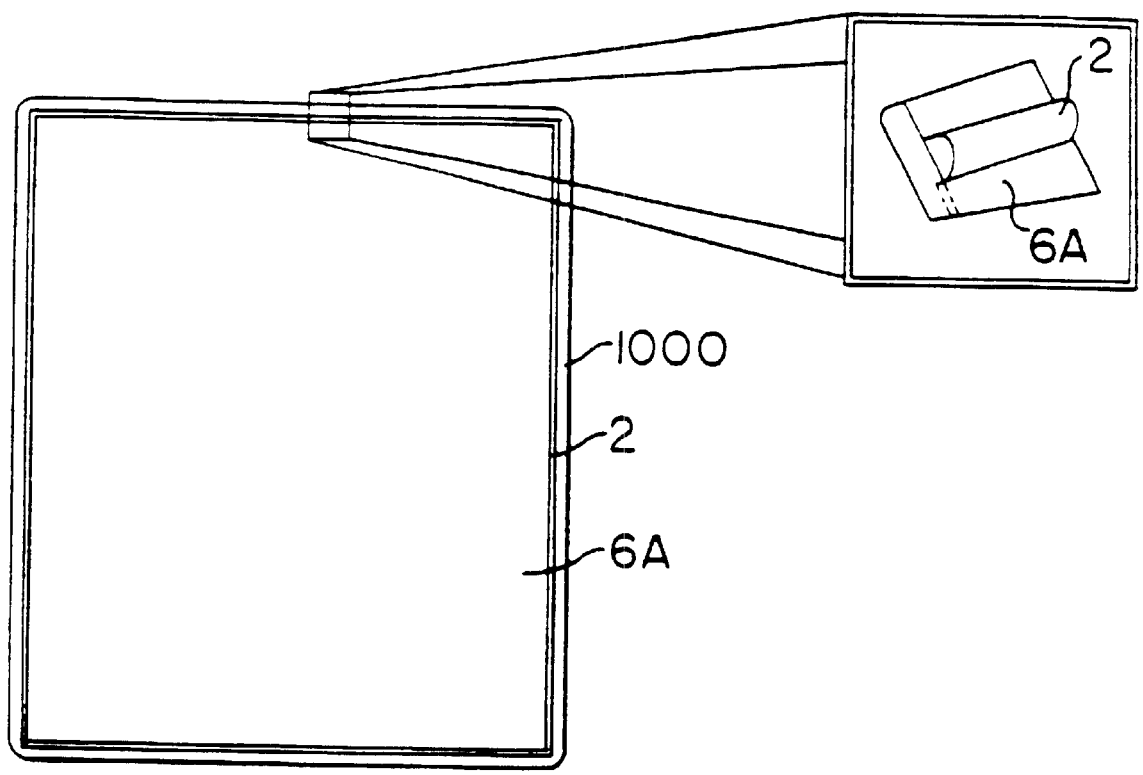

FIG. 40 illustrates an example of a light gasket of a fax tablet.

Figure 41A:
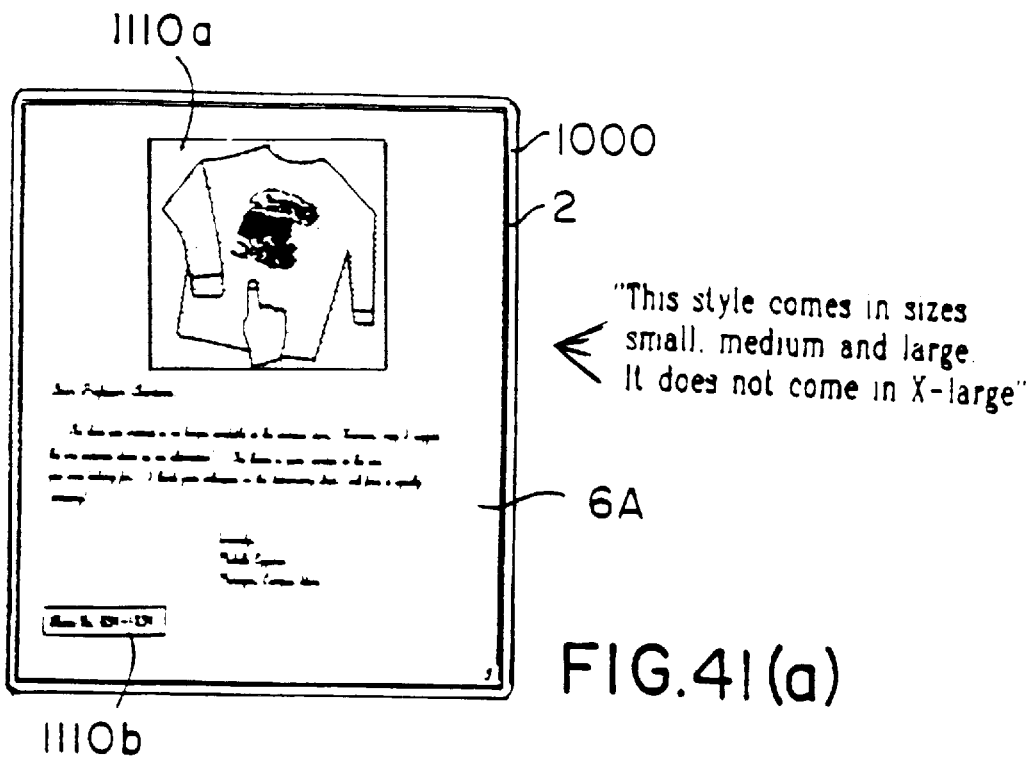

FIG. 41a shows a fax document that has been received by the apparatus. Electronic audio information linked to one portion of the document is being played back.

Figure 41B:
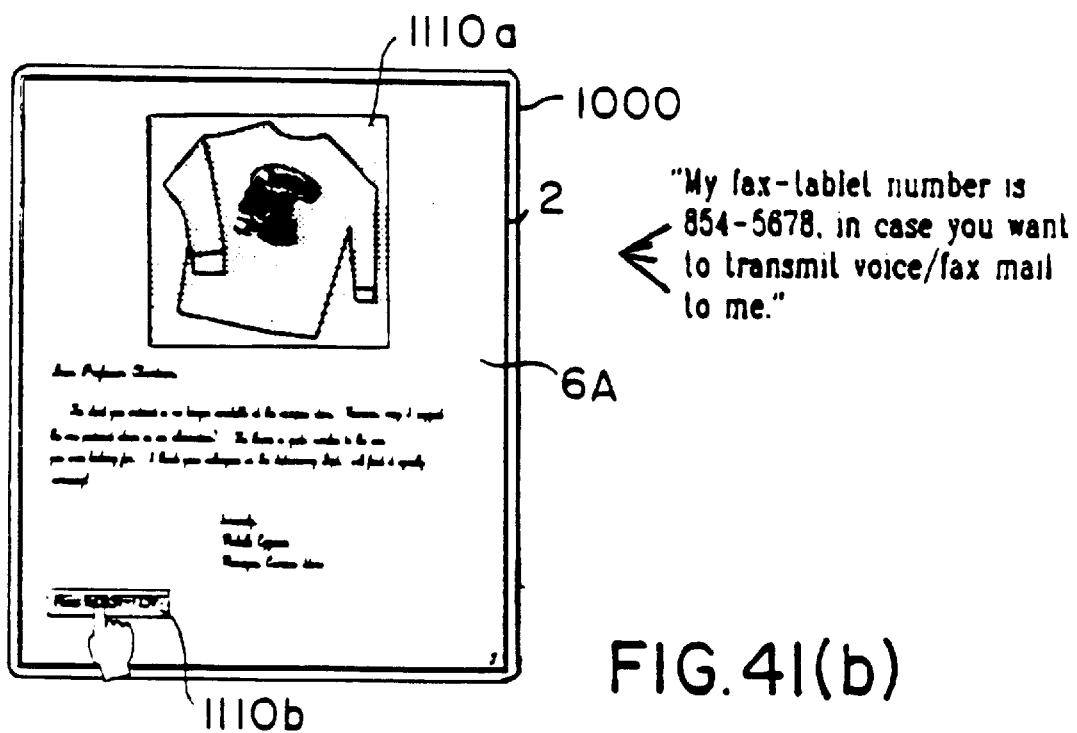

FIG. 41b shows the playback of another linked audio message.

Figure 42A:
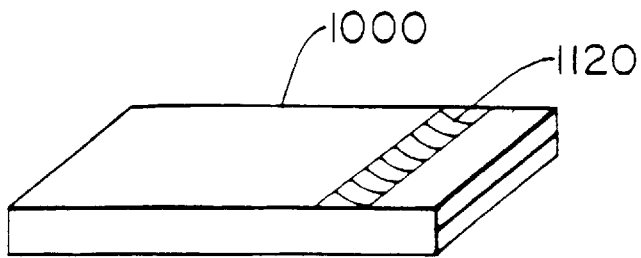

FIG. 42a shows a fax tablet equipped with a document scanner for scanning hard copy documents.

Figure 42B:
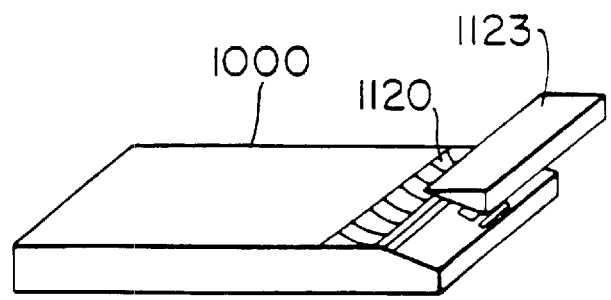

FIG. 42b shows a cutaway view of the fax tablet to reveal the scanning assembly.

Figure 42C:
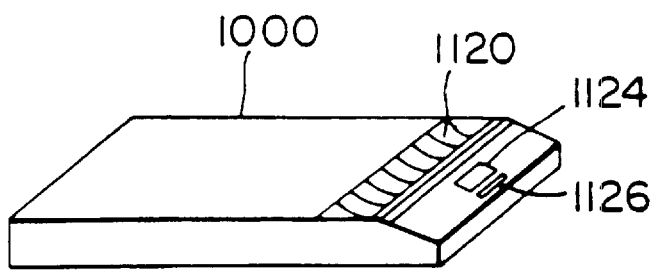

FIG. 42c shows the portion of the scanner assembly that processes electronic data storage media associated with hard copy documents.

Figure 42D:
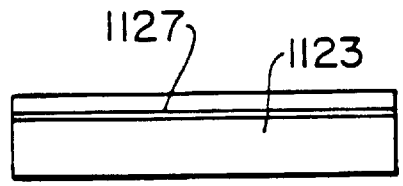

FIG. 42d shows the portion of the scanner assembly that processes the optical component of hard copy documents.

Figure 43A:
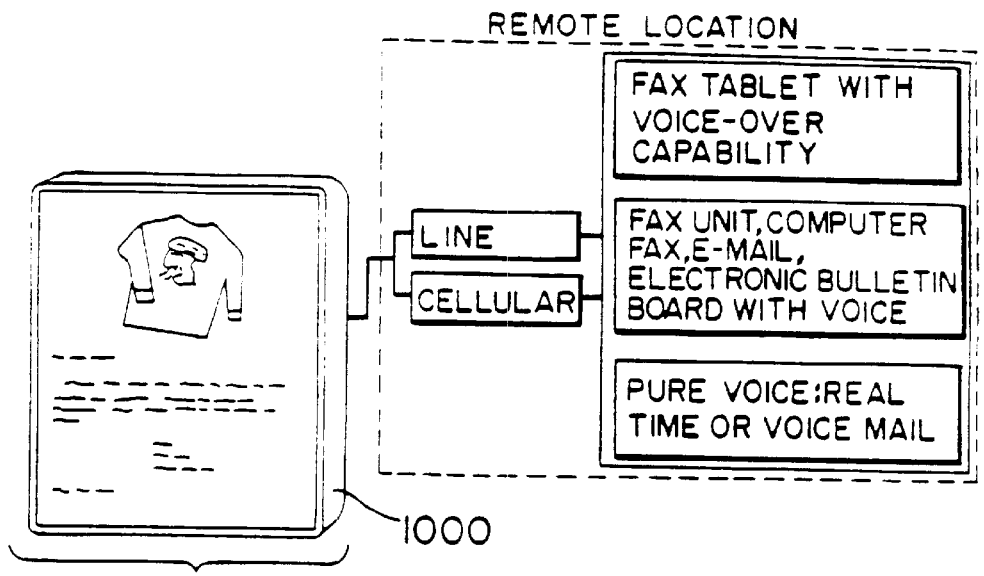

FIG. 43a shows examples of systems the apparatus may communicate with.

Figure 43B:
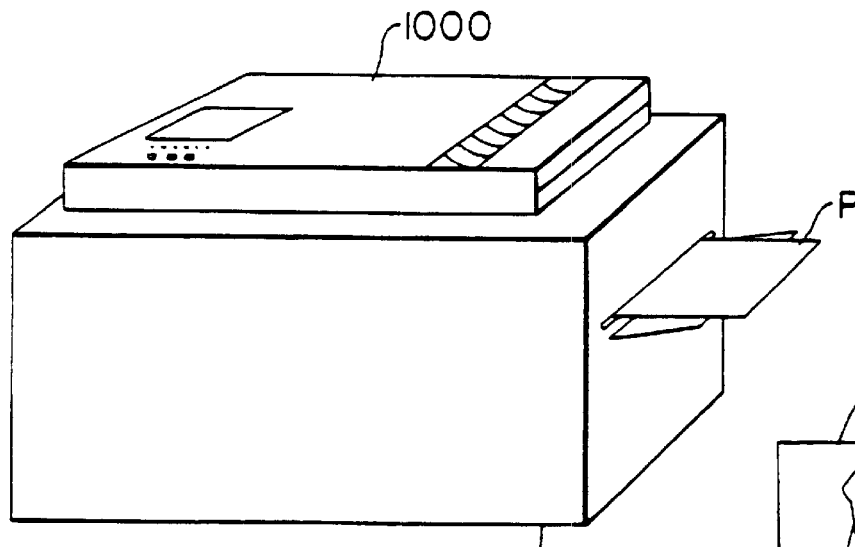

FIG. 43b shows the apparatus being used with a copier.

Figure 43C:
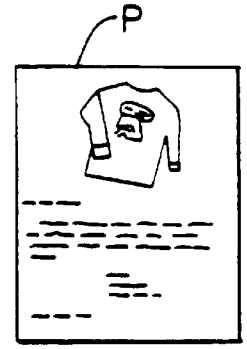

FIG. 43c shows a hard copy document produced by the apparatus with the copier.

Figure 44A:
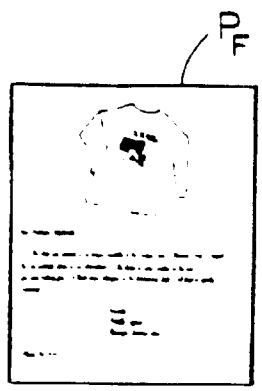

FIG. 44a shows the front face of a hard copy document produced by the apparatus.

Figure 44B:
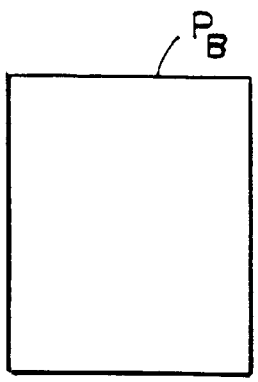

FIG. 44b shows the back face of a hard copy document produced by the apparatus.

Figure 44C:
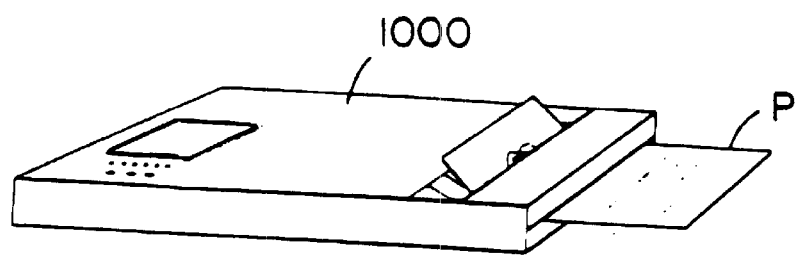

FIG. 44c shows the hard copy document of FIGS. 44a and 44b being processed by the scanner assembly of the apparatus.

Figure 44D:
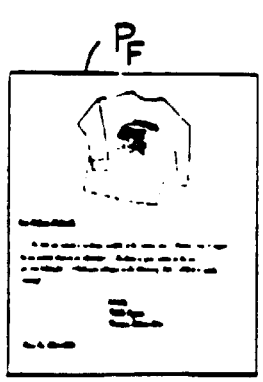

FIG. 44d shows the front face of the hard copy document after it has been processed by the apparatus.

Figure 44E:
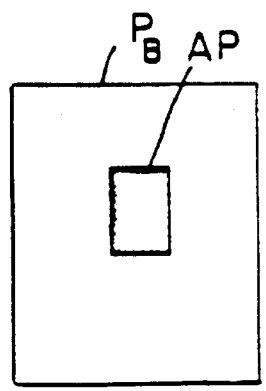

FIG. 44e shows the back face of the hard copy document after it has been processed by the apparatus, with an electronic data storage medium applied thereto.

Figure 45A:
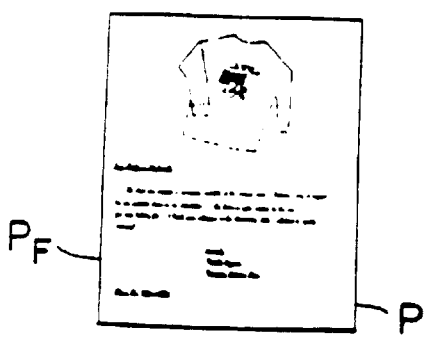

FIG. 45a shows the front face of a hard copy document, which already has an electronic data storage medium.

Figure 45B:
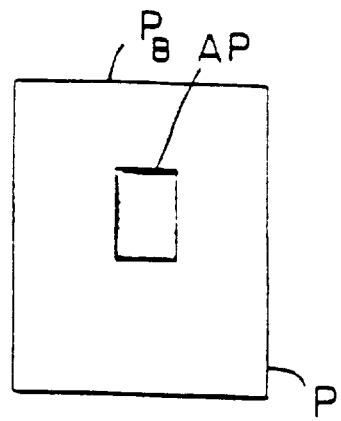

FIG. 45b shows the back face of a hard copy document which already has an electronic data storage medium.

Figure 45C:
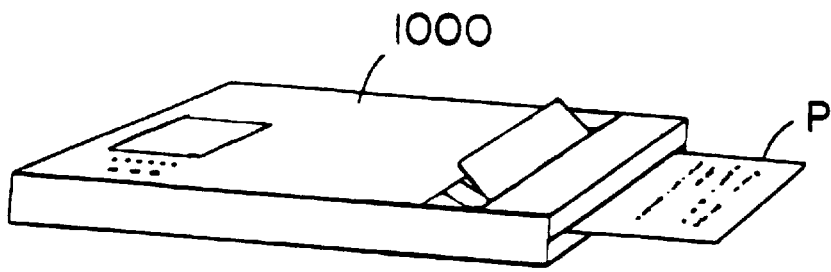

FIG. 45c shows the apparatus processing a hard copy document which already has an electronic data storage medium.

Figure 45D:
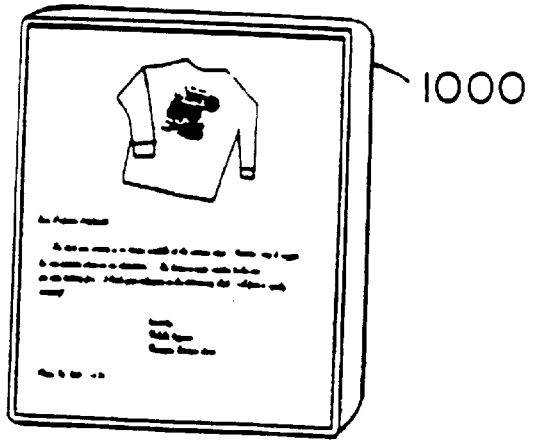

FIG. 45d shows an image on the display screen of the apparatus, which corresponds to the image on the front face of the hard copy document processed by the apparatus.

Figure 45E:
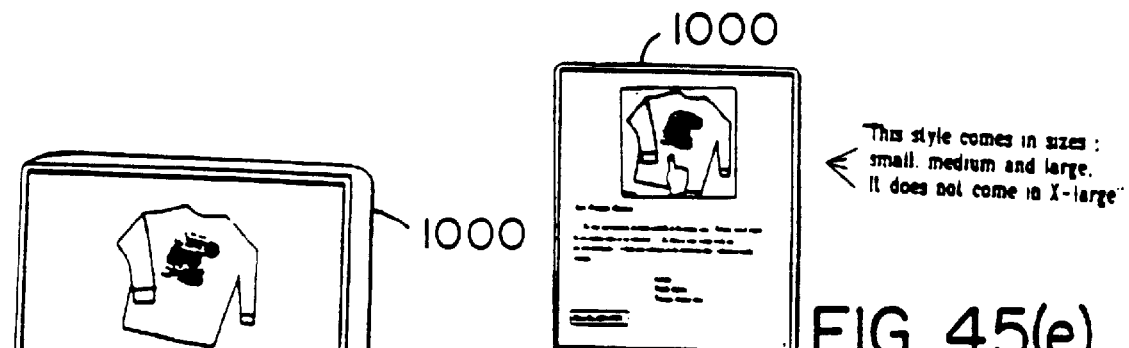

FIG. 45e shows access of one piece of linked electronic reference information.

Figure 45F:
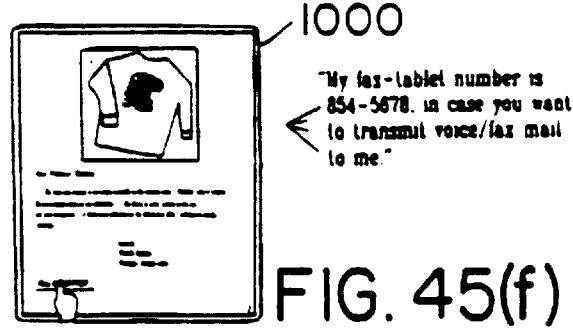

FIG. 45f shows access of another piece of linked electronic reference information.

Figure 46A:
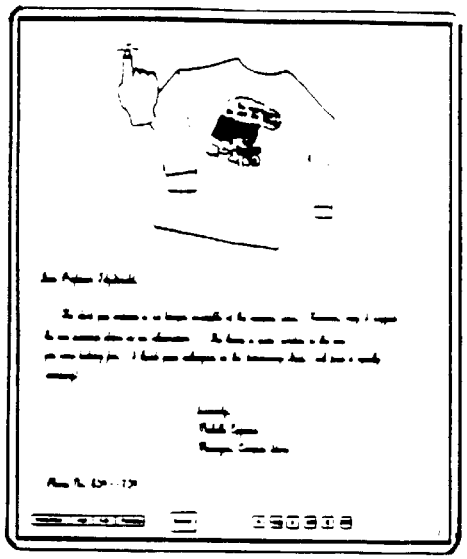

FIG. 46a shows a document to which audio messages may be added.

Figure 46B:
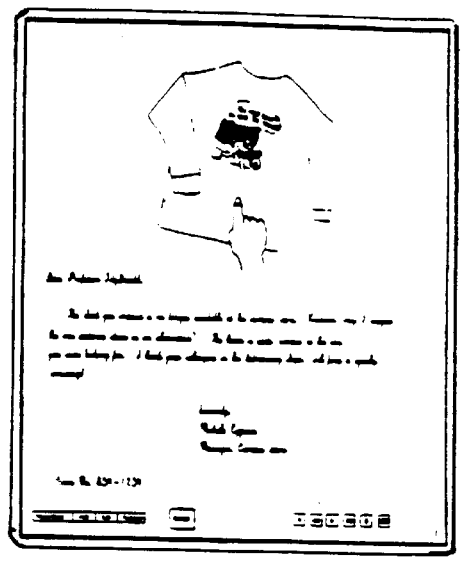

FIG. 46b shows defining a highlight box enclosing a portion of the document to which an audio passage may be added.

Figure 46C:
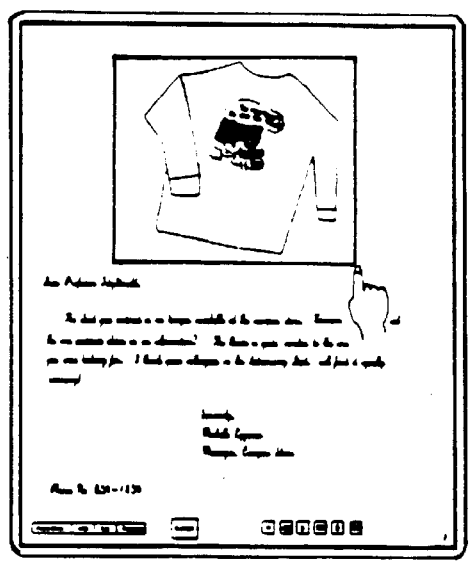

FIG. 46c shows a highlight box enclosing a portion of the document to which an audio passage may be added.

Figure 46D:
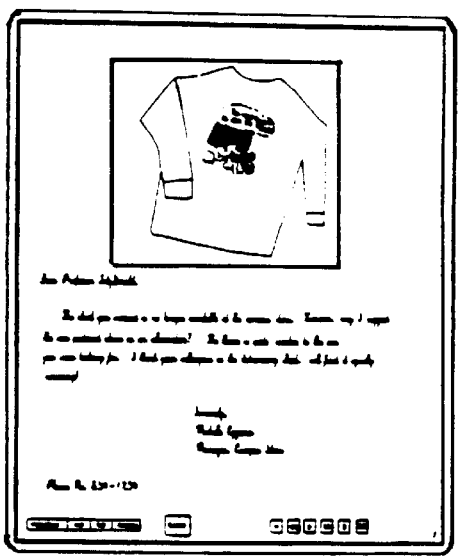

FIG. 46d shows a completed highlight box.

Figure 47A:
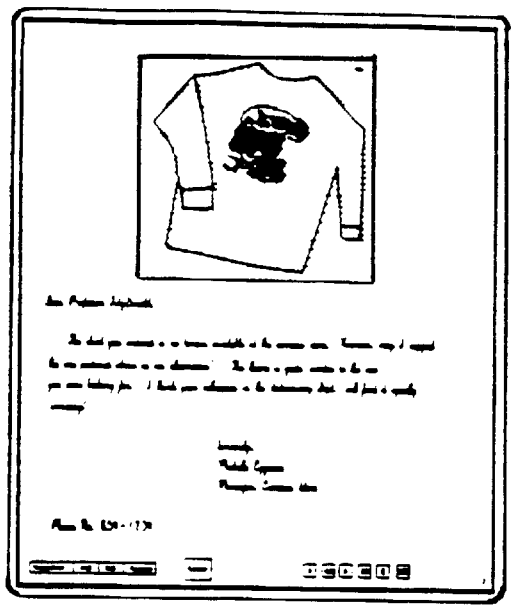

FIG. 47a shows a highlight box that is ready to be linked to an audio passage.

Figure 47B:
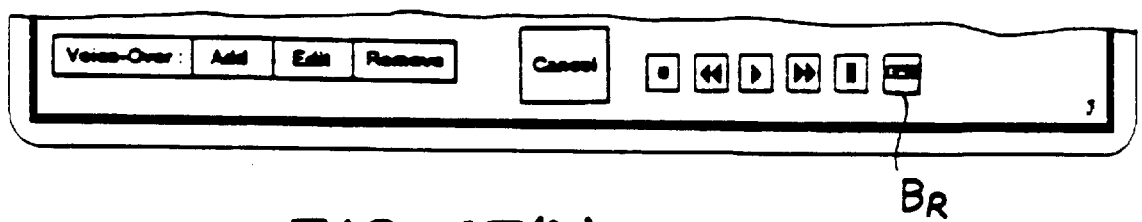

FIG. 47b shows buttons used in connection with audio passages.

Figure 48:
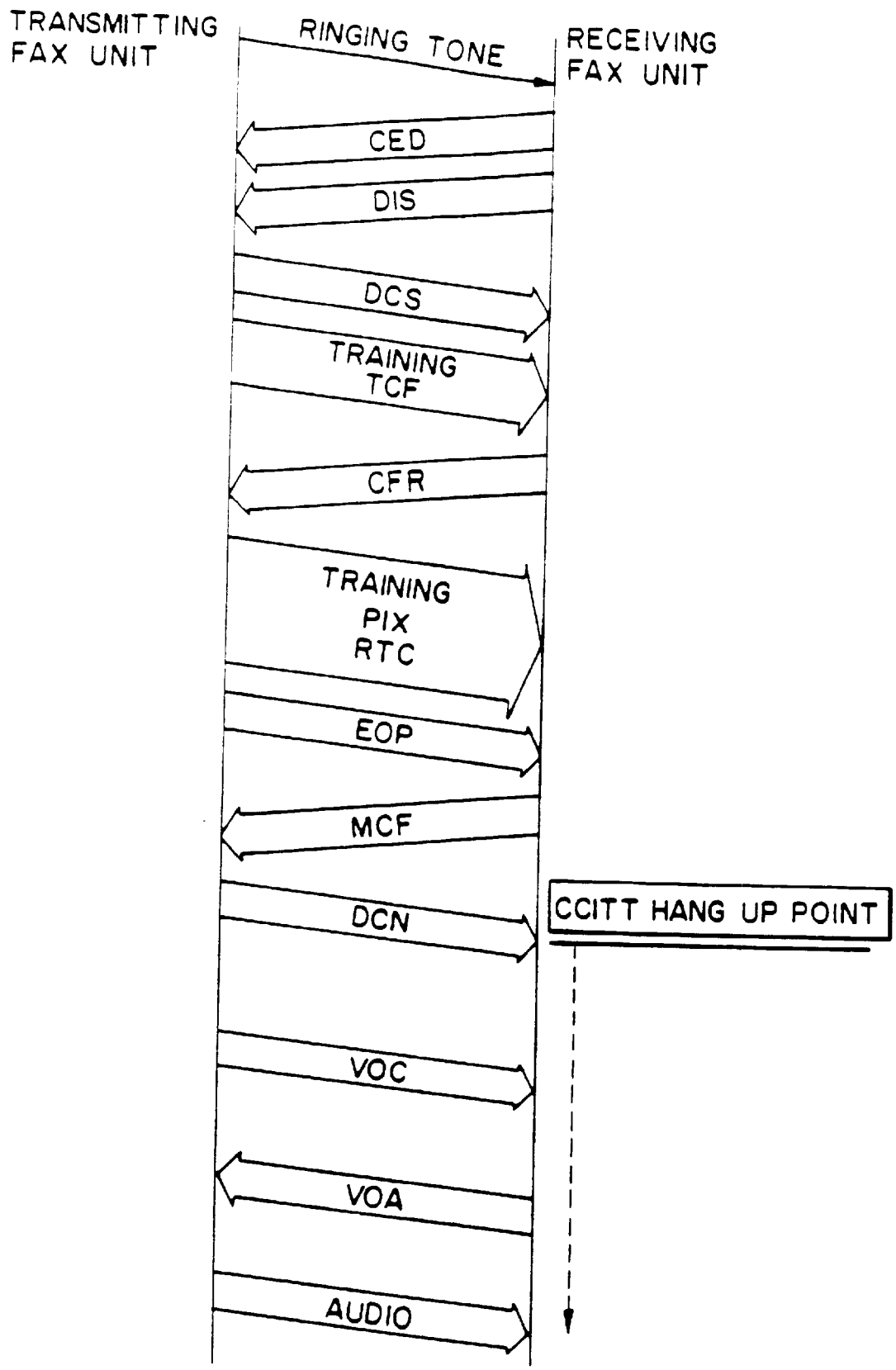

FIG. 48 illustrates an example of a communications protocol for fax transmission.

Figure 49A:
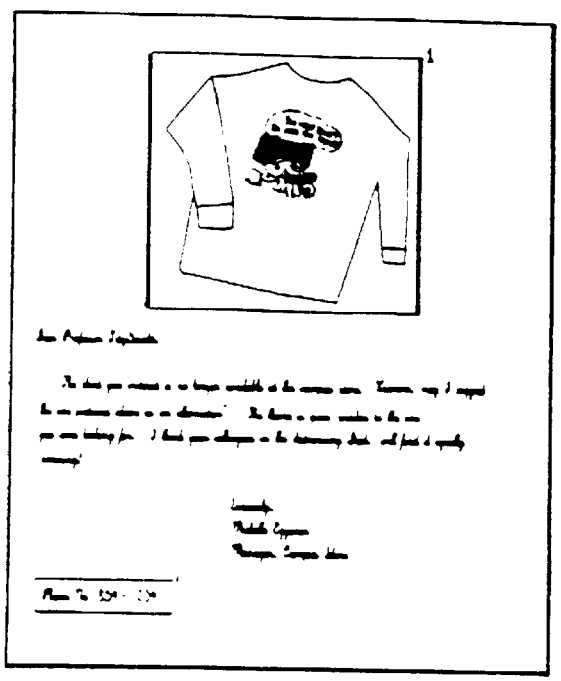

FIG. 49a shows a document having frames and numerals to indicate the linked portions.

Figure 49B:
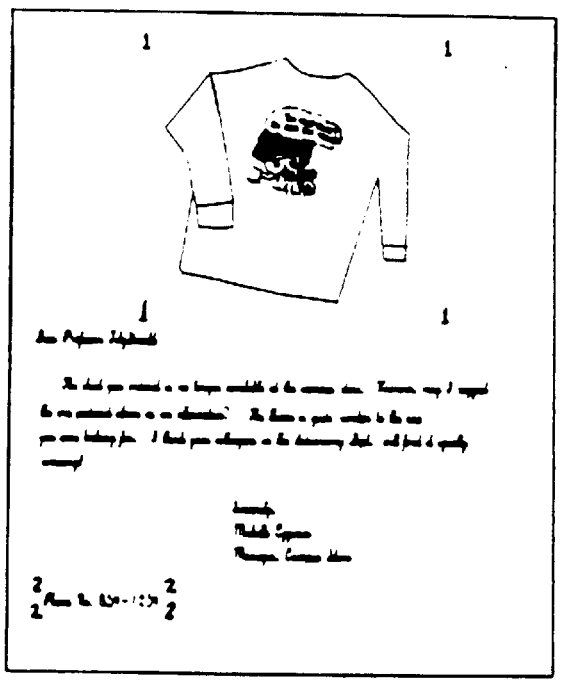

FIG. 49b shows a document having numerals delimiting the linked portions.

FIG. 50 illustrates an example of a voice capable desktop fax unit containing an image display screen that is not touch sensitive.

Figure 51:
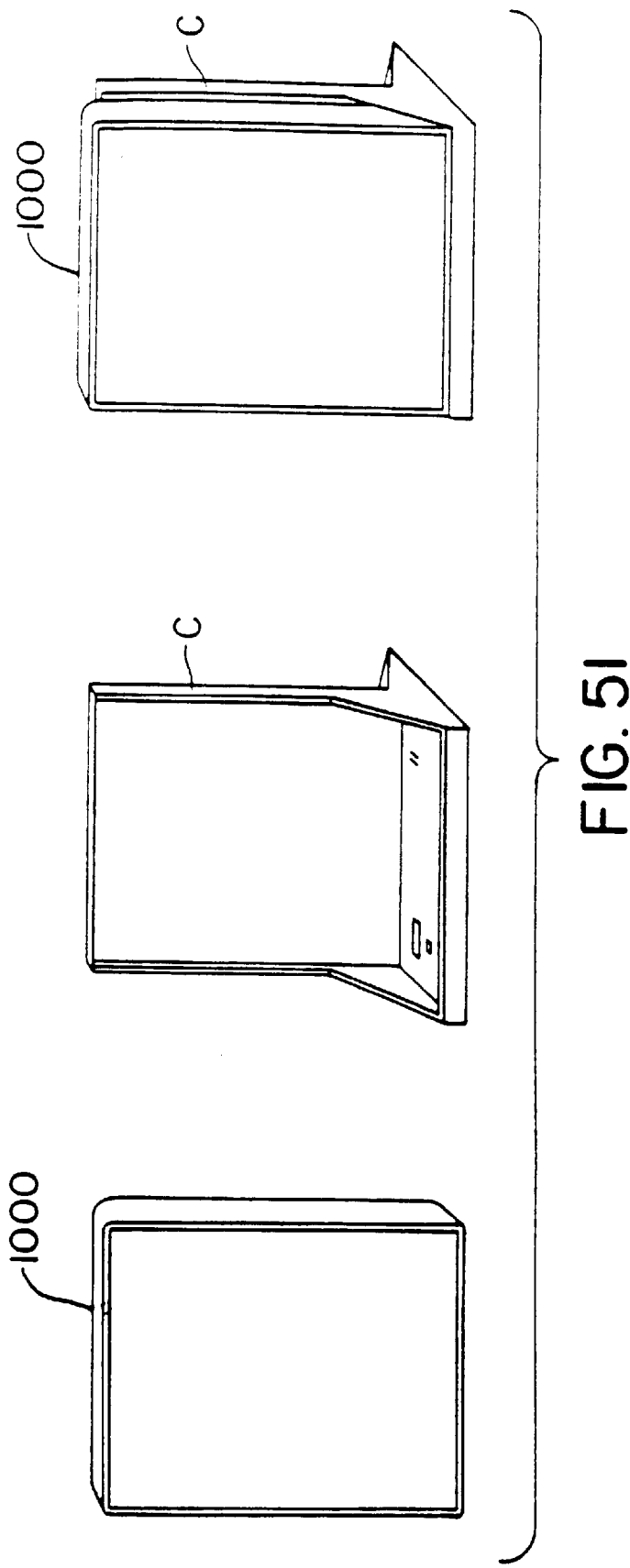

FIG. 51 illustrates an example of a cradle into which a fax tablet may be placed.

Figure 52:
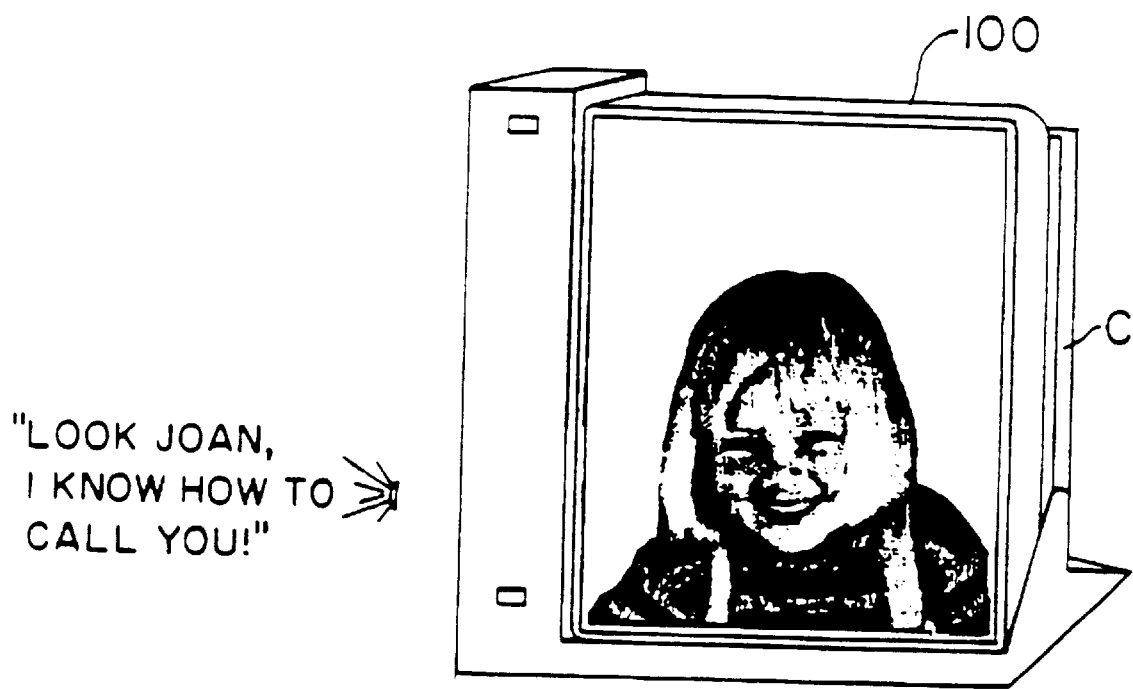

FIG. 52 illustrates an example of a cradle equipped with a video camera which enables the fax tablet docked in the cradle to send, receive and display video images.

Figure 53:
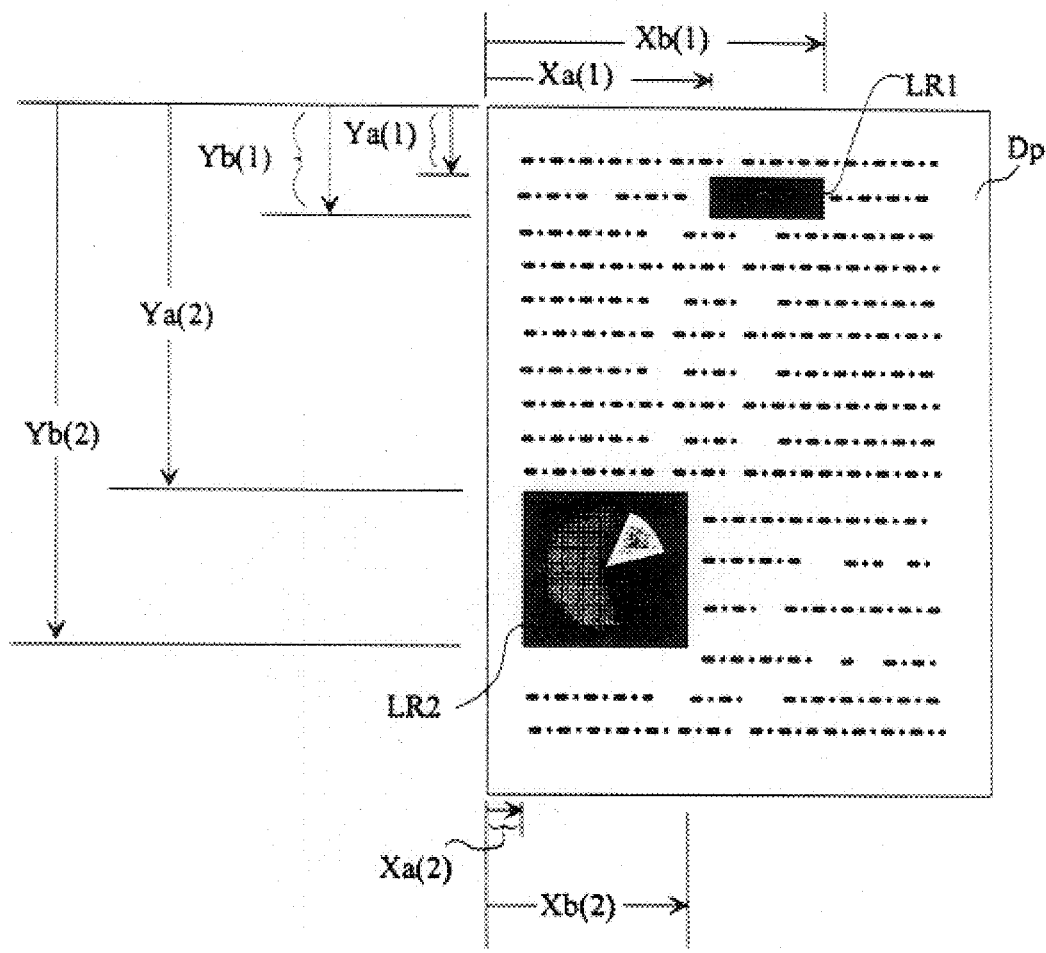

FIG. 53 illustrates the use of coordinates to identify positions of link regions contained in a document having electronically linked electronic reference information associated therewith.

FIG. 54a illustrates a predetermined attribute of a document image in the form of numerals delimiting linked portions of the document.

FIG. 54b illustrates the step of electronically scanning the electronic representation of the document image to locate the linked portion of the document.

FIG. 54c illustrates the recording of the positions in the document where the predetermined attribute has been detected through scanning.

FIG. 54d illustrates the identified link regions in a document based on the portions of the document image found to have the predetermined attribute.

Figure 55:
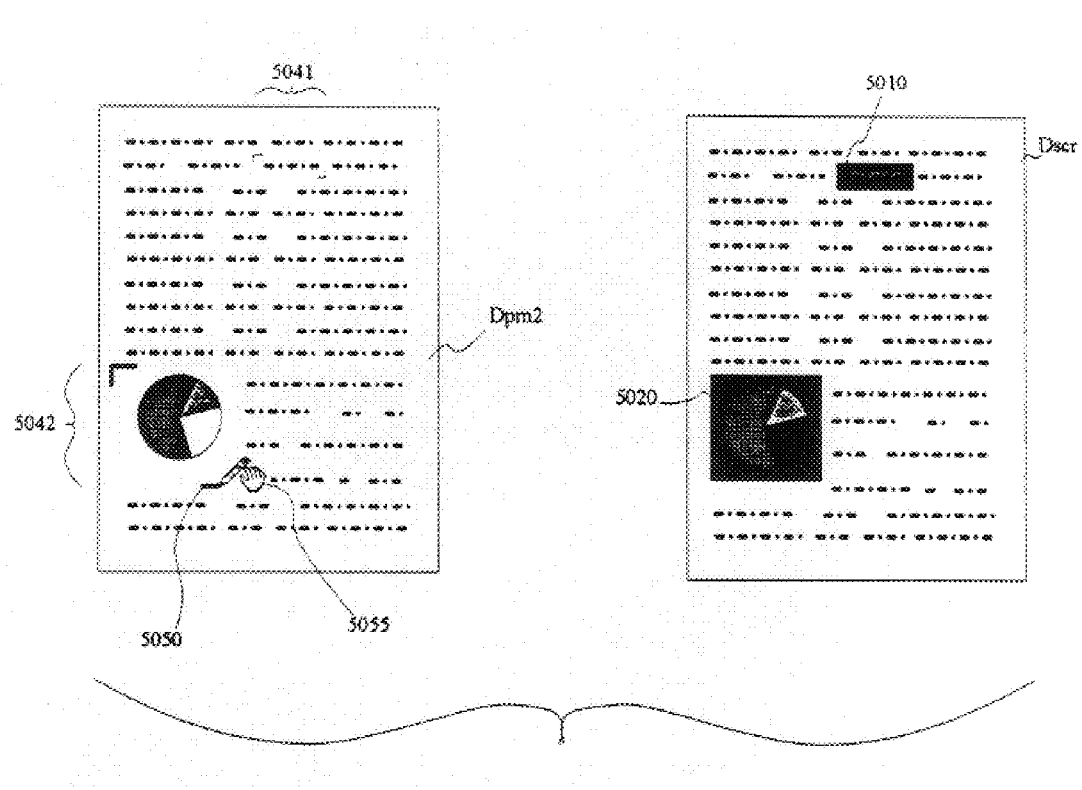

FIG. 55 illustrates the manual inscription of graphical identifiers in a document to designate portions of the document to be linked to electronic reference information and the resulting document with link regions where the graphical identifiers were manually placed.

Figure 56A:
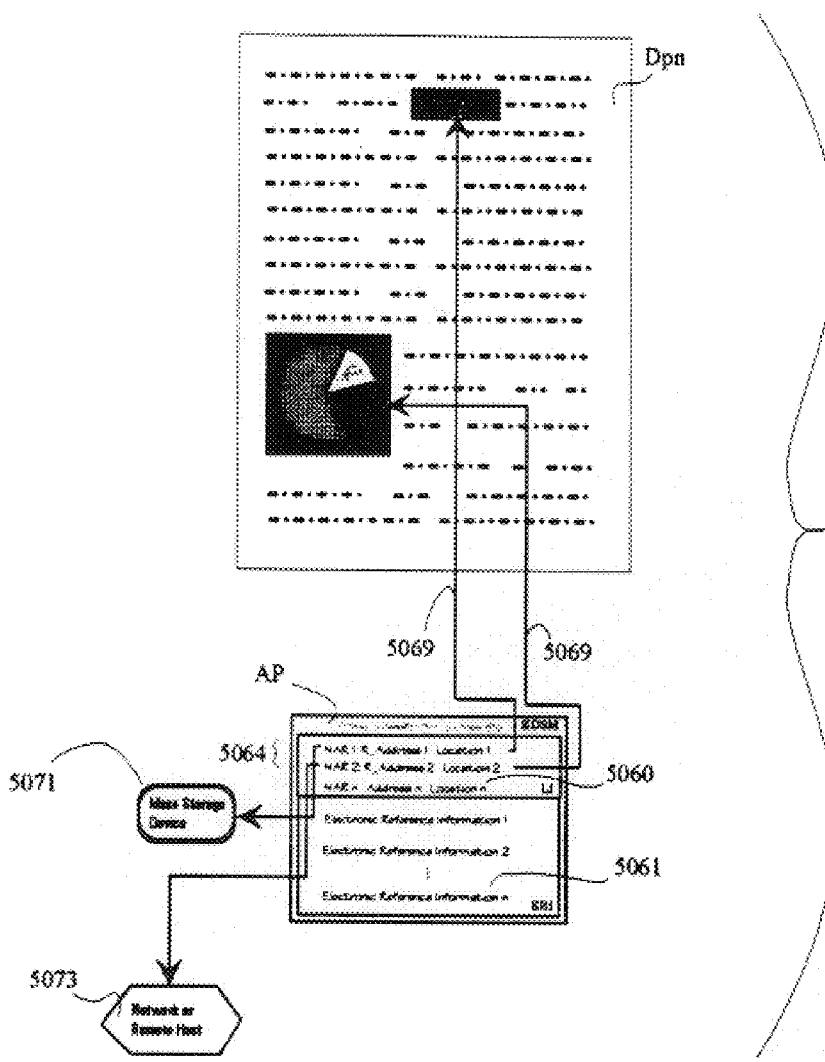

FIGS. 56(a) and (b) illustrate the concept of a remote link, and ways of storing this information in an electronic data storage medium capable of being included on a printed document.

Figure 57:
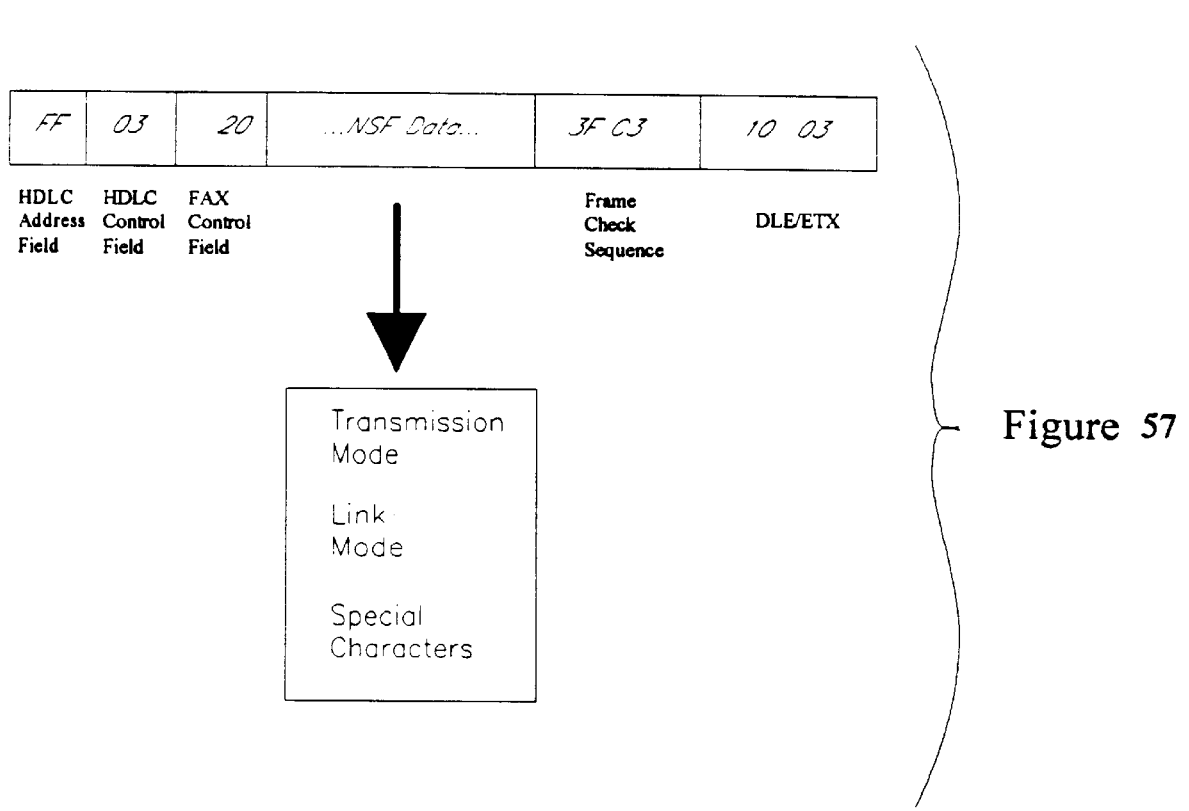

FIG. 57 illustrates the use of a non-standard facilities frame to modify a facsimile transmission for transmitting linked electronic reference information.

FIGS. 58(a–d) illustrate the communications scheme of FIG. 48 in greater detail.

Figure 59:
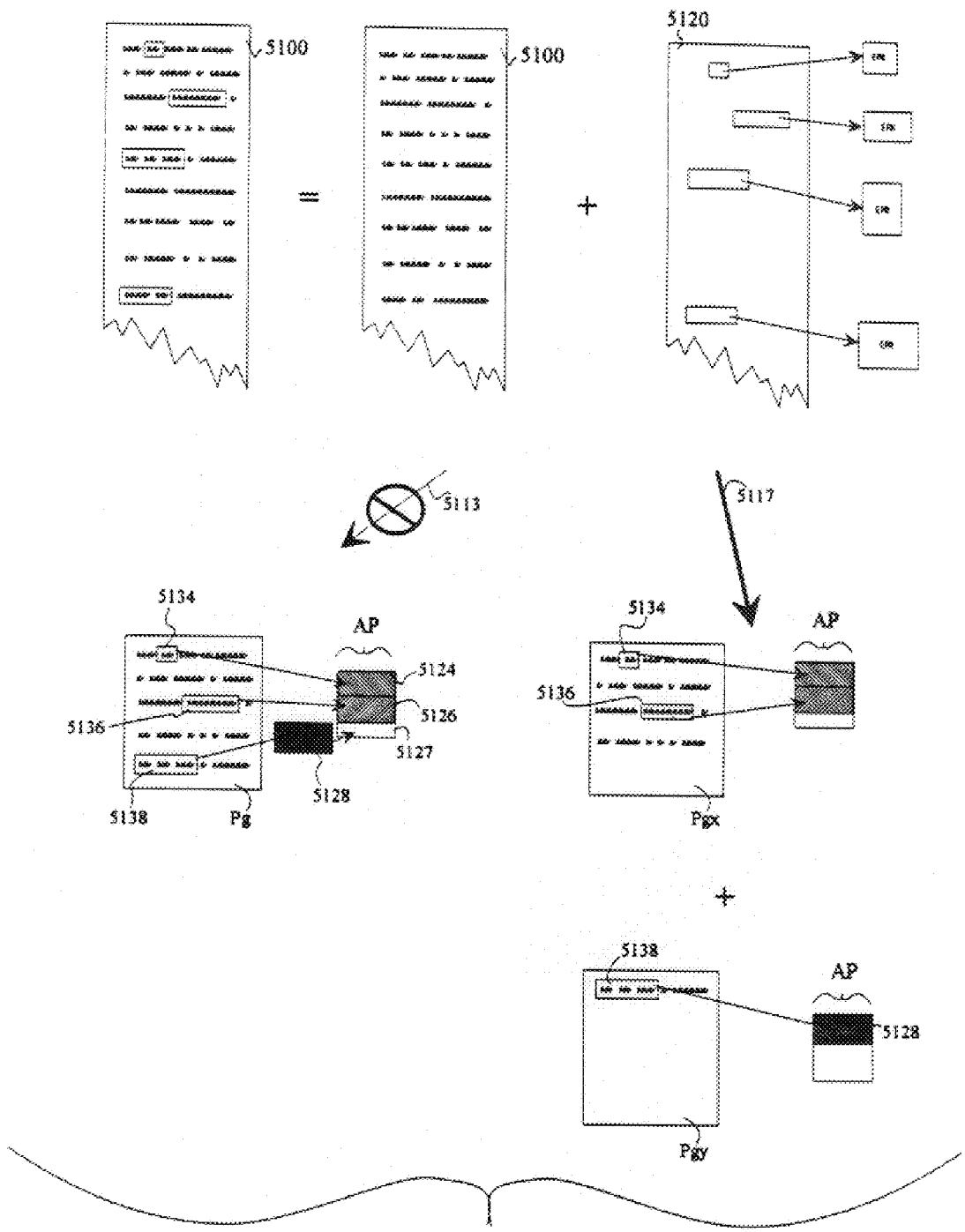

FIG. 59 illustrates the benefit of synchronizing the formatting of the hard copy document with the storage of information to an EDSM (5117) and the potential result if synchronization is not utilized (5113).

Figures 60A, 60B:
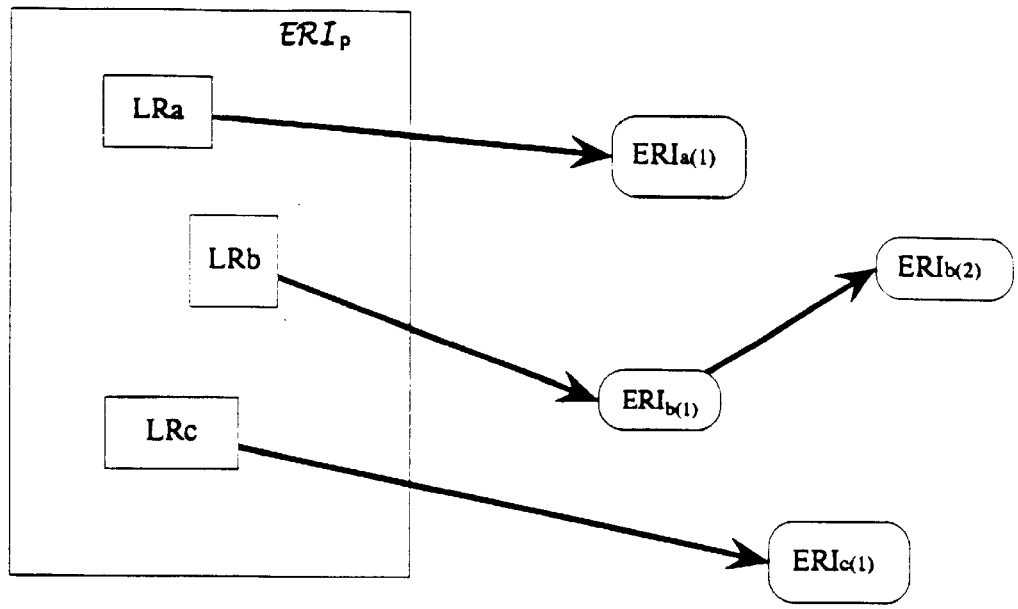

FIGS. 60(a) and (b) illustrate the organization of linked electronic reference information for convenient and independent accessibility.

Figure 61A:
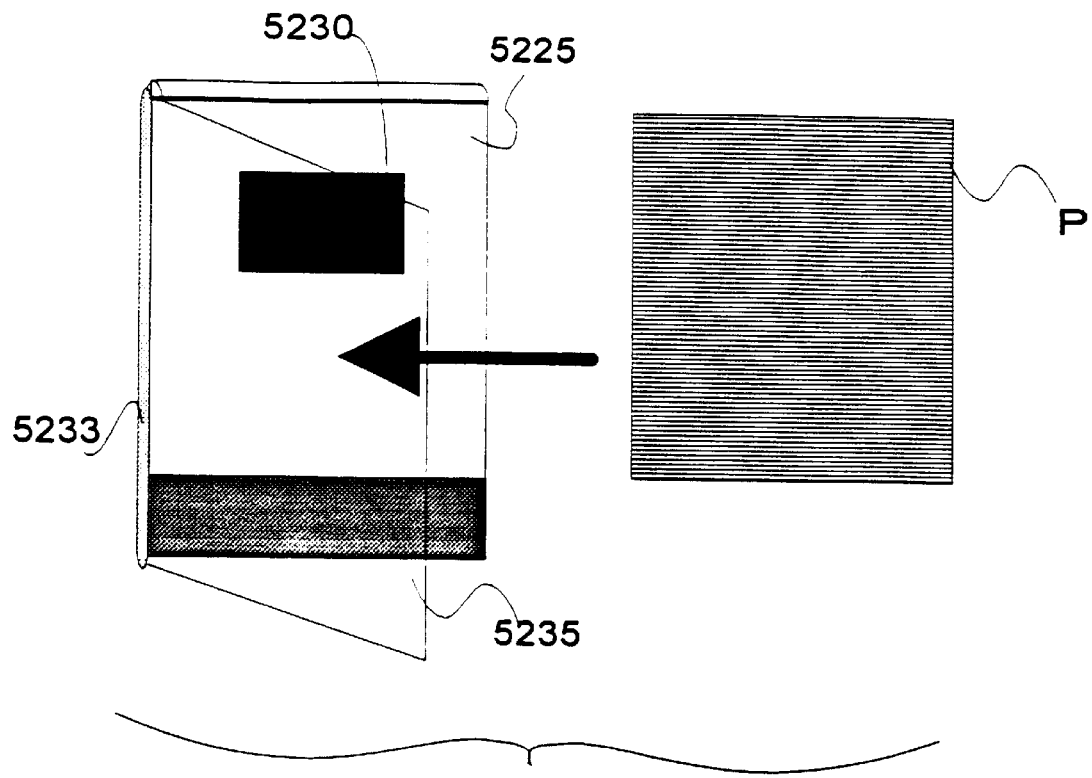

FIGS. 61(a) and (b) illustrate an apparatus for playing documents having linked electronic reference information.

Figure 62:
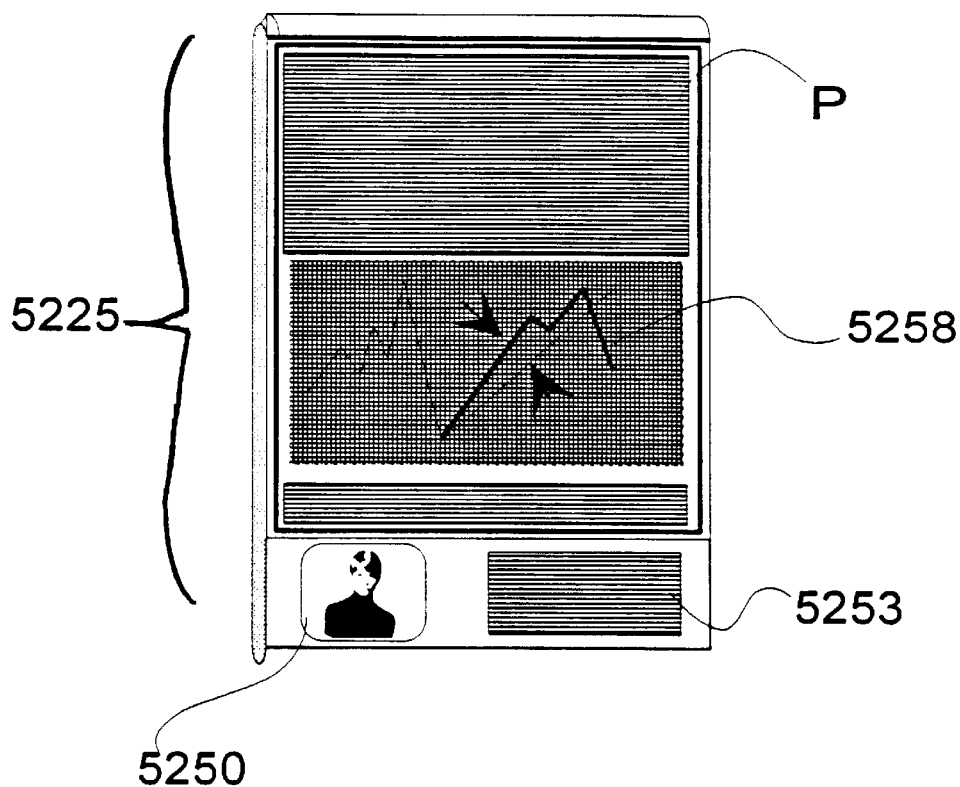

FIG. 62 illustrates the dynamic interaction between electronic reference information and printed information appearing on a page for documents retaining electronic links to electronic reference information.

FIG. 63 shows a hardcopy document that will be transmitted by a conventional facsimile machine using a standard fax transmission protocol (i.e. CCITT Group 3) as a monochrome bi-level bitmap.

Figure 63A:
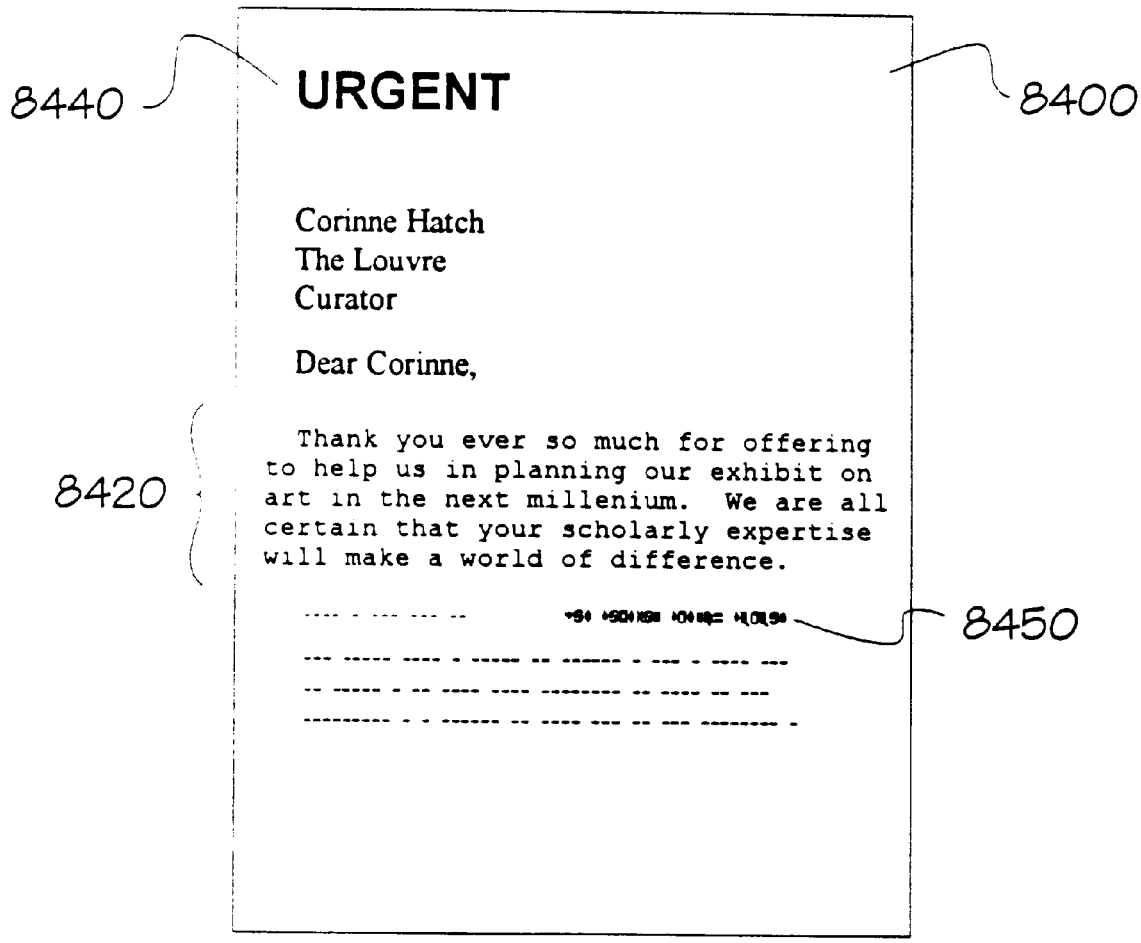
Figure 63B:
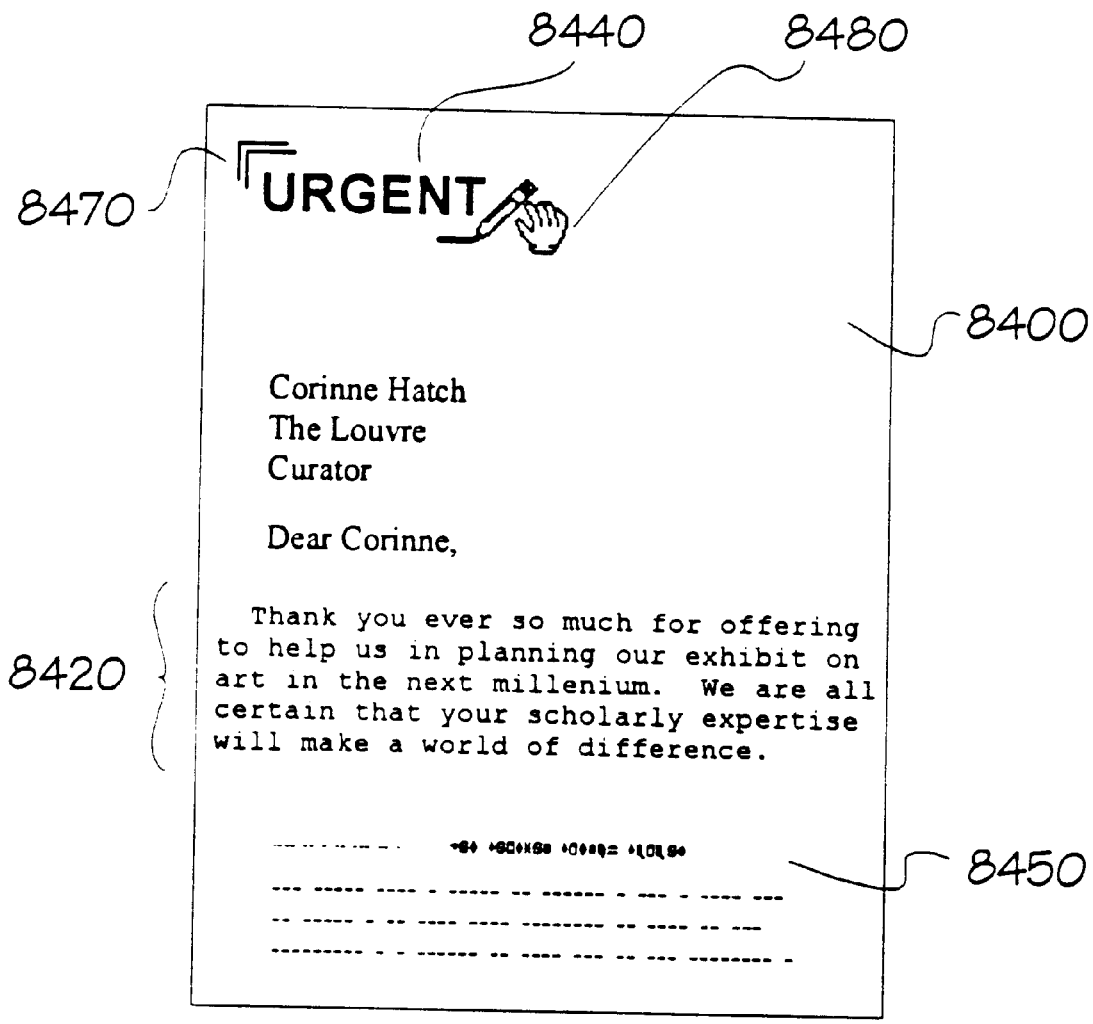
Figure 64:
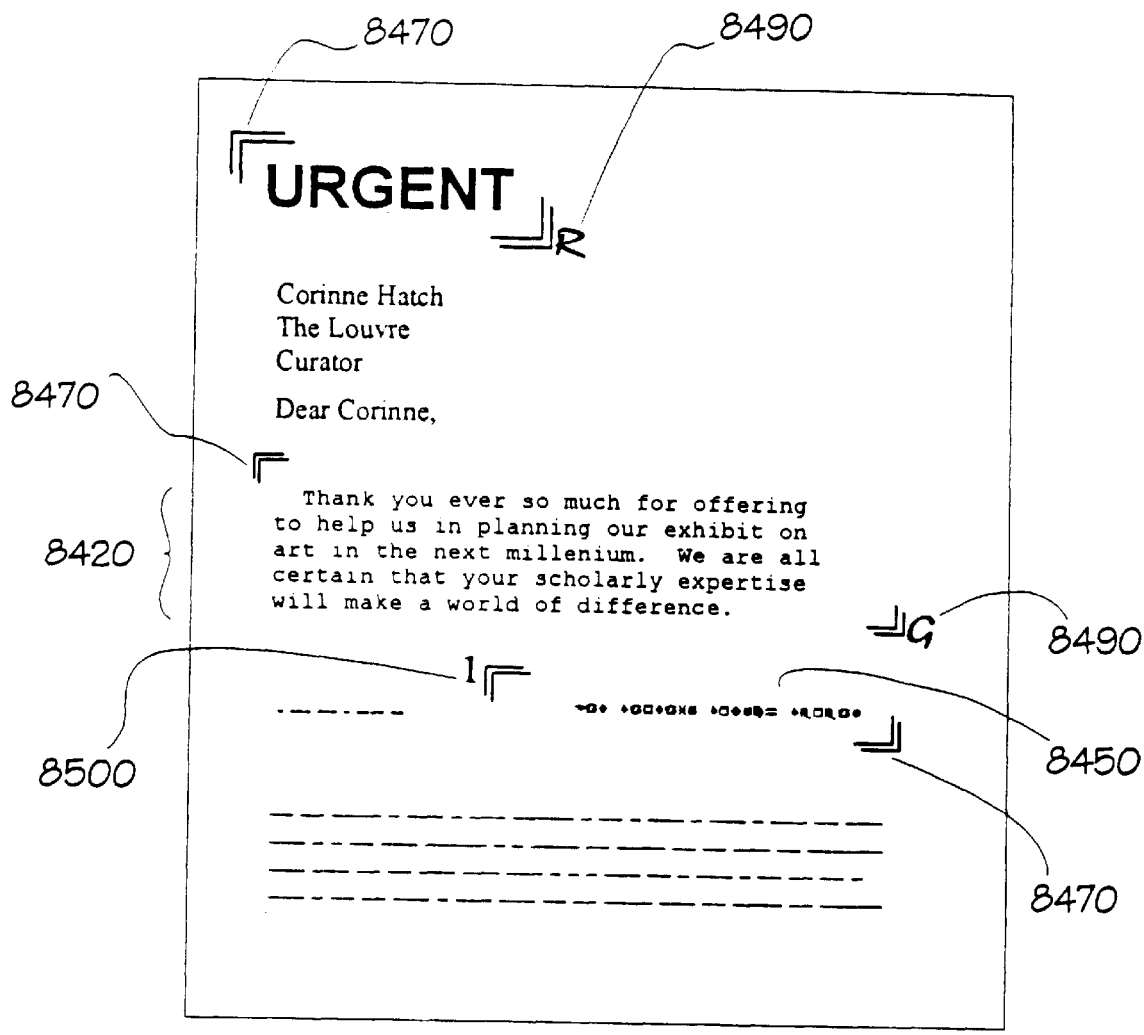

FIG. 64 shows the hardcopy document of FIG. 63 after graphical identifiers have been added by hand to appropriate portions. The page shown in FIG. 64 represents the first of a two page document to be transmitted to the receiving apparatus of the present invention.

Figure 65:
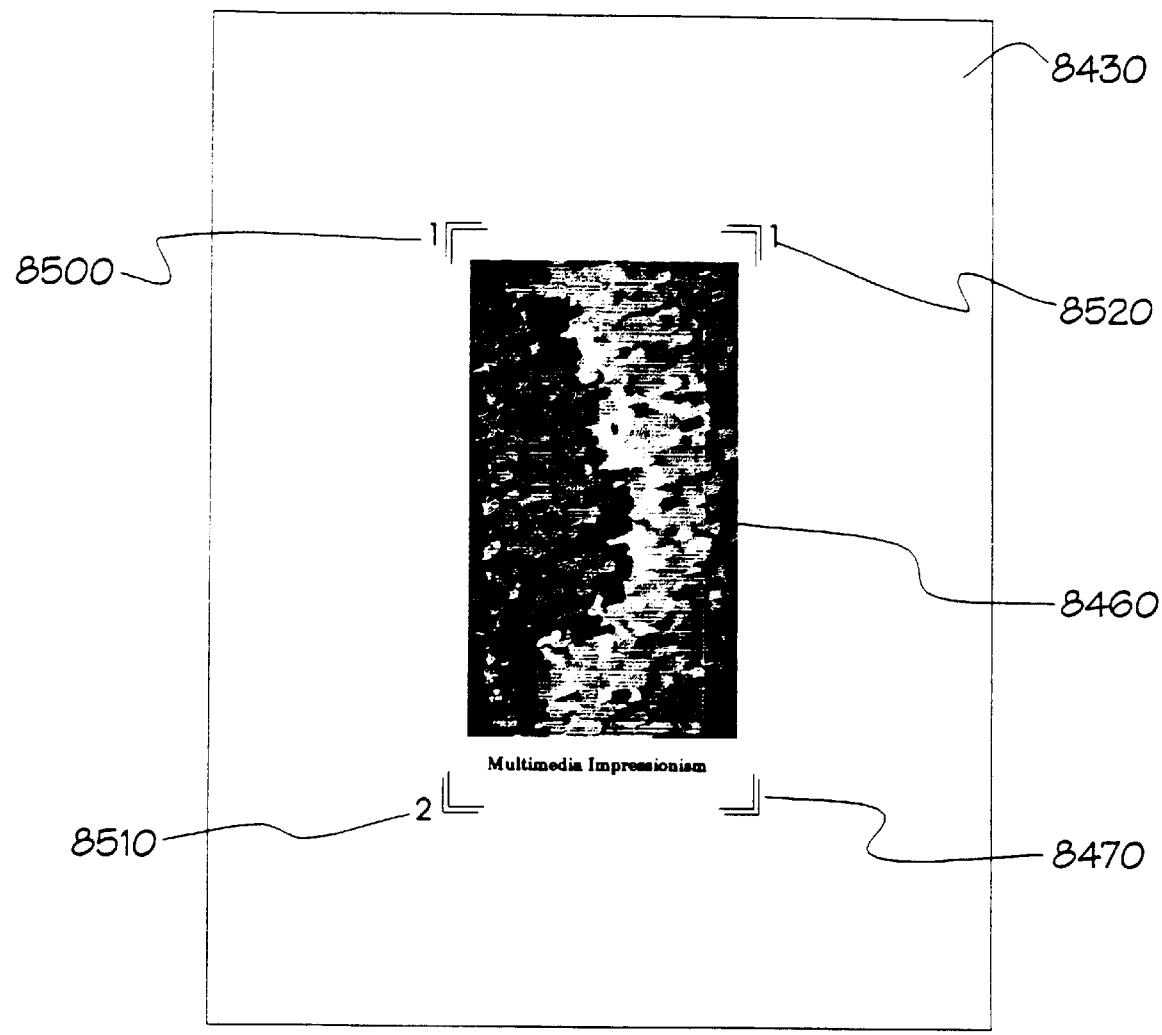

FIG. 65 shows the second of two pages to be transmitted. The delimited portion of the page shown in FIG. 65 is also to be electronically linked to electronic reference information comprising audio signals.

Figure 66:
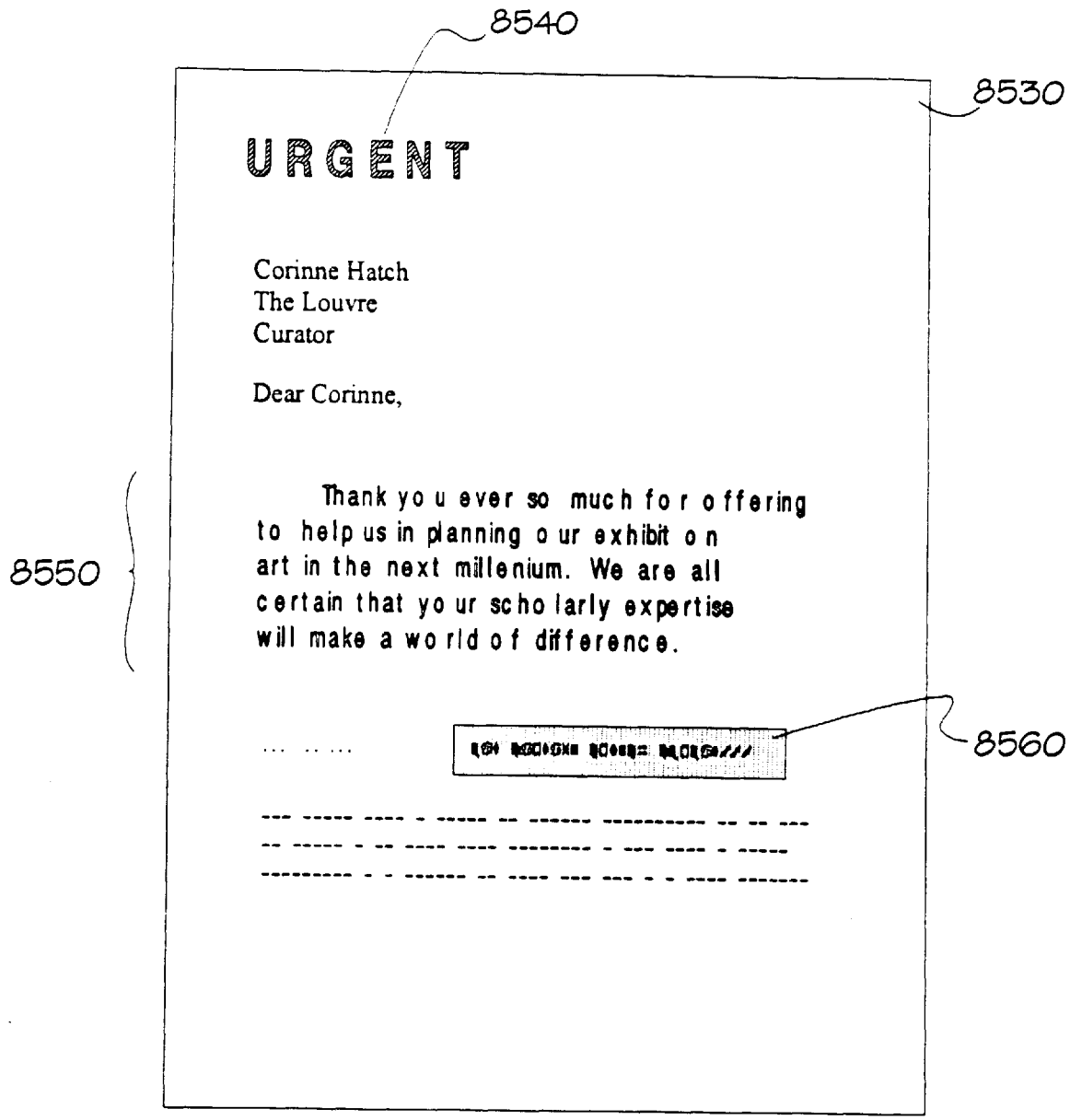

FIG. 66 is the electronic rendition of the hardcopy page in FIG. 64, on an image display device of the receiving apparatus of the present invention. Portions of the displayed page are in color, even though those very same portions were transmitted in black and white by the sending station.

Figure 67:
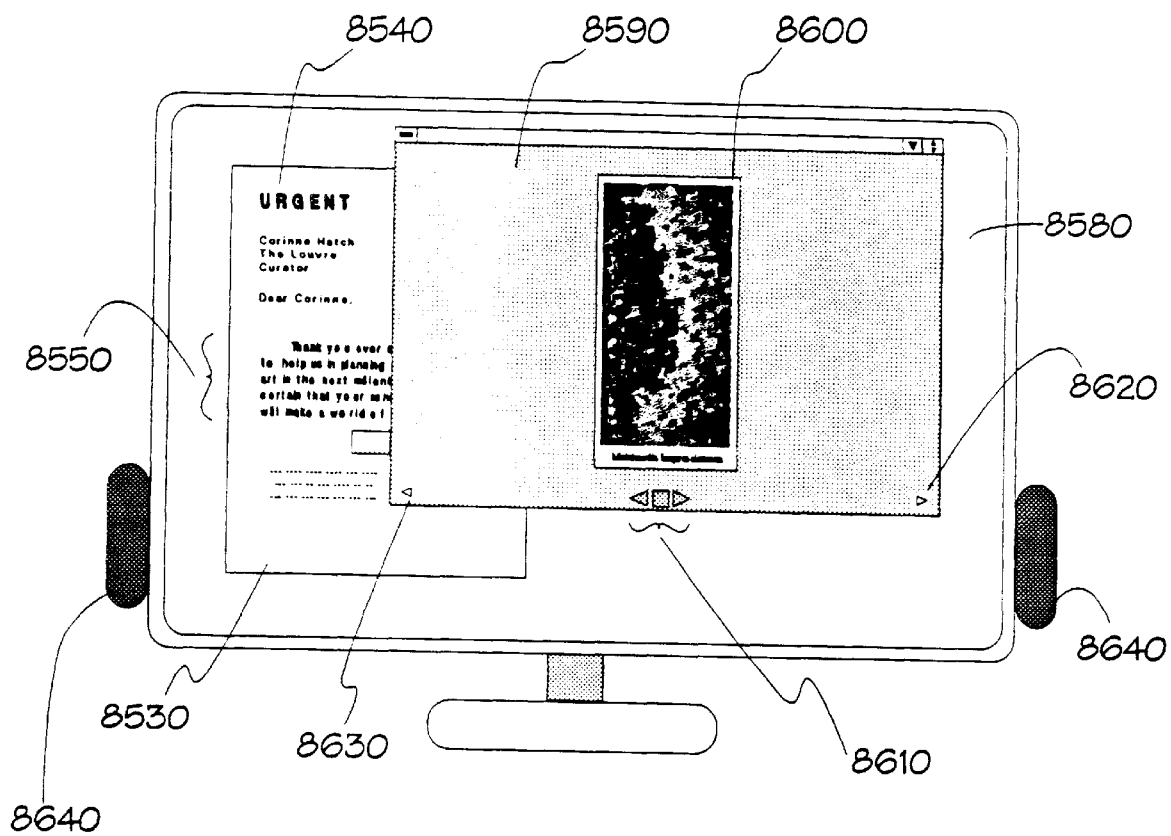

FIG. 67 shows a window containing a document portion that is electronically linked to another document portion. It is also electronically linked to electronic reference information in the form of an audio passage.

Figure 68A:
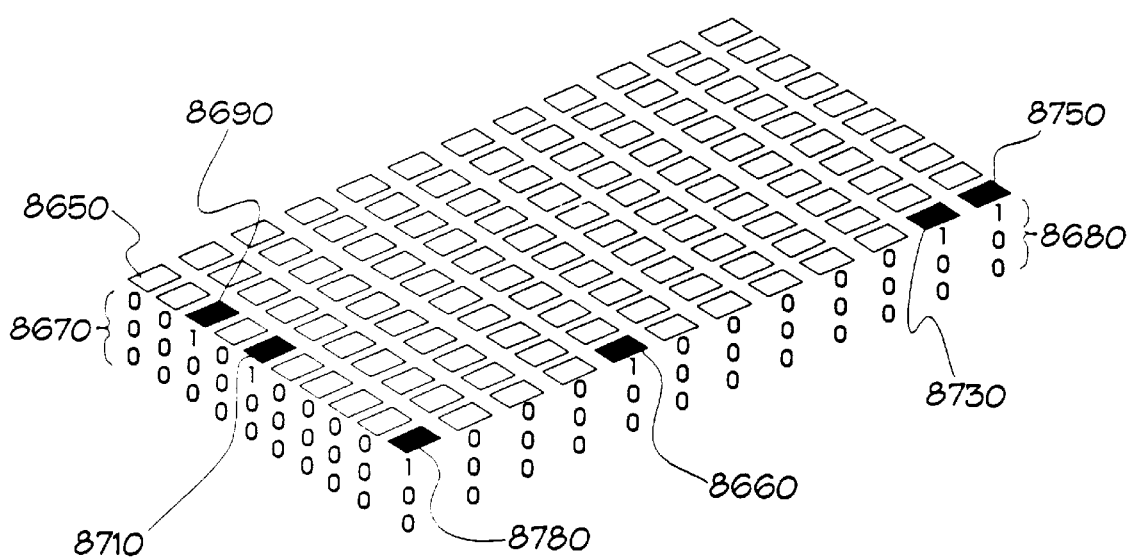
Figure 68:
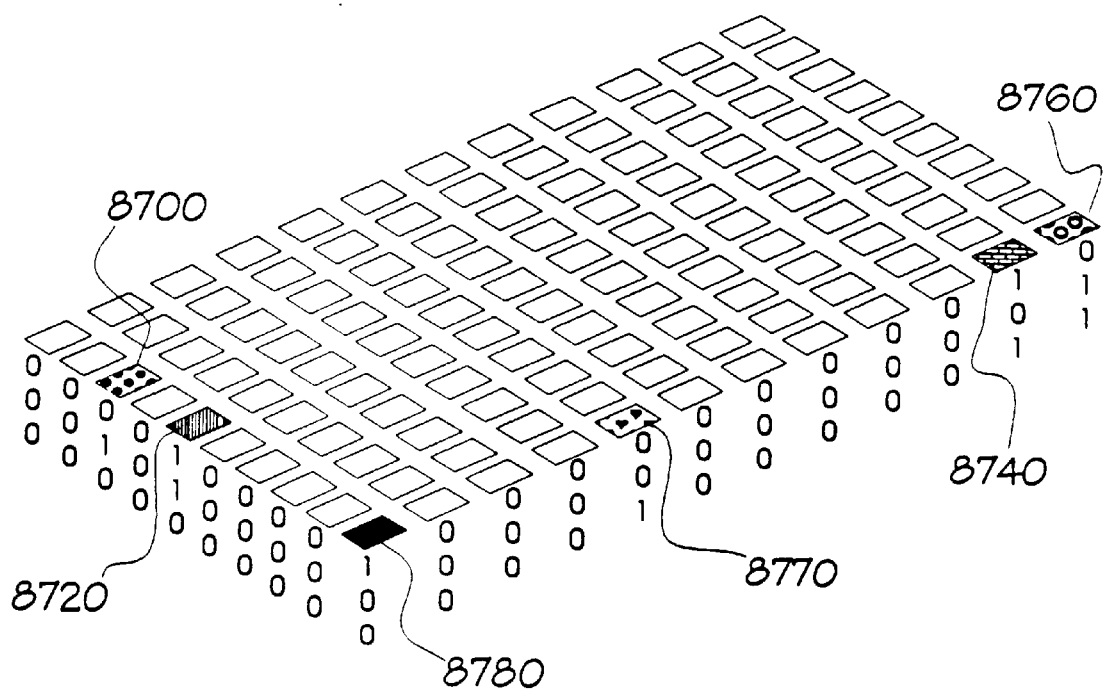

FIG. 68 illustrates how data associated with each pixel of a received document image is translated from a first form to a second form, to pixel-wise cause the image attributes to be re-mapped.

FIG. 69 shows pixel-wise image data translation applied to collections of pixels.

Figure 70:
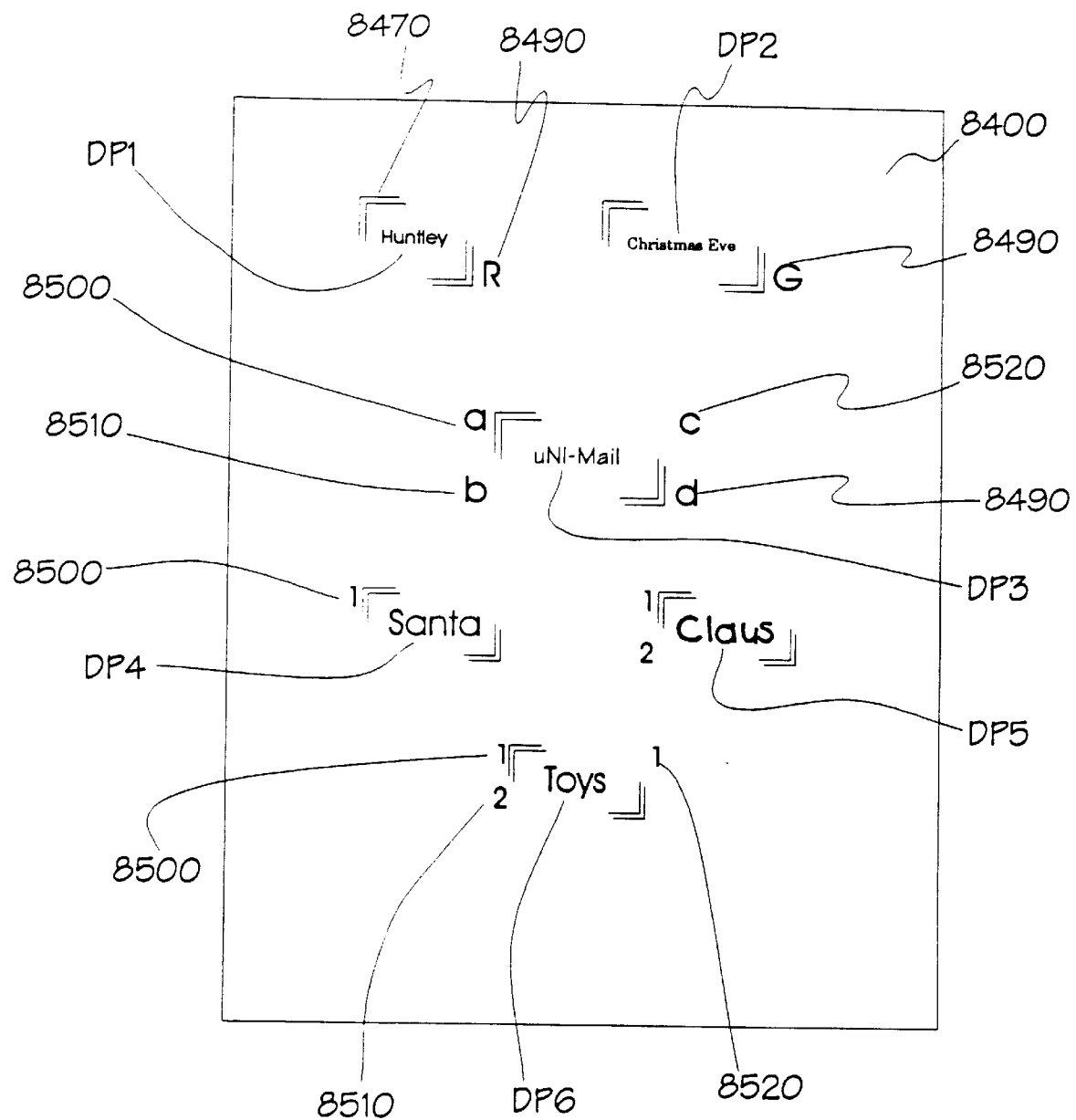

FIG. 70 shows some grammatical examples of one syntactical flavor of a document image processing language used by the present invention.

Figure 71:
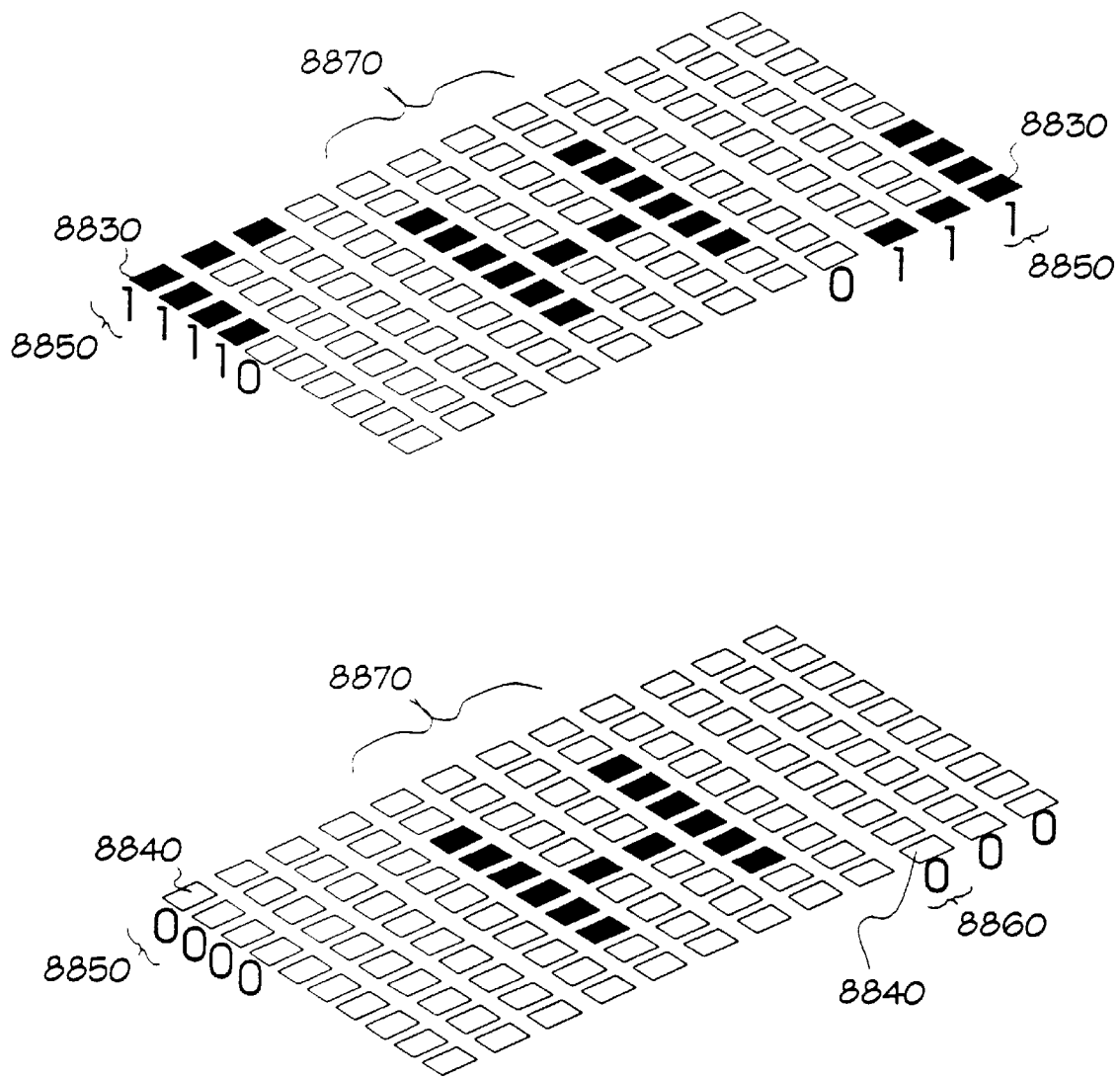

FIG. 71 shows the electronic erasure of the pixels that make up the graphical identifiers graphically added to the document image.

Figure 72:
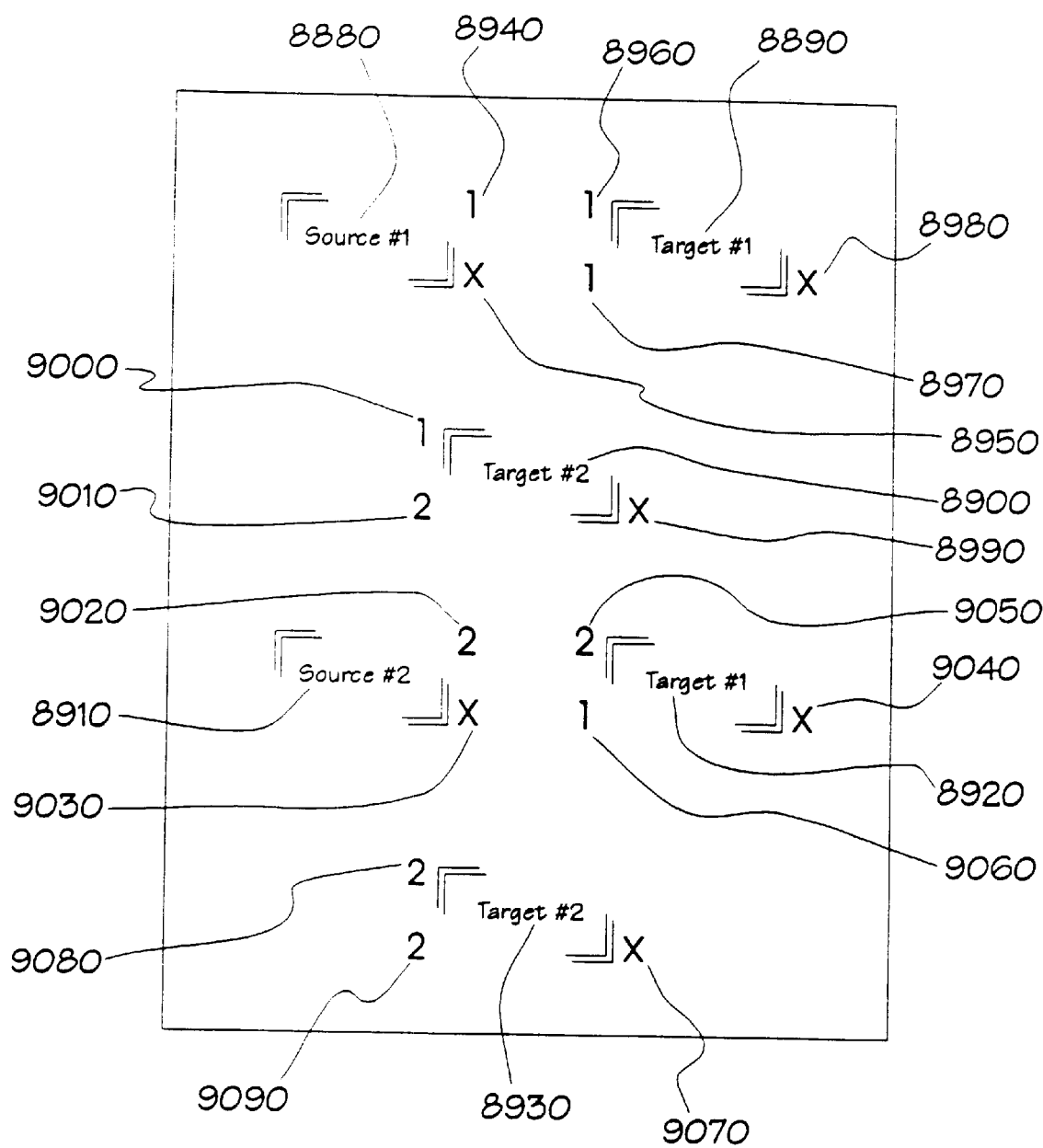

FIG. 72 shows examples of how optically encoded data may be specified in a transmitted document.

FIG. 73 shows a handwritten hardcopy document containing portions to be electronically linked to electronic reference information, being fed into the scanner of a conventional facsimile apparatus for transmission.

Figure 74:
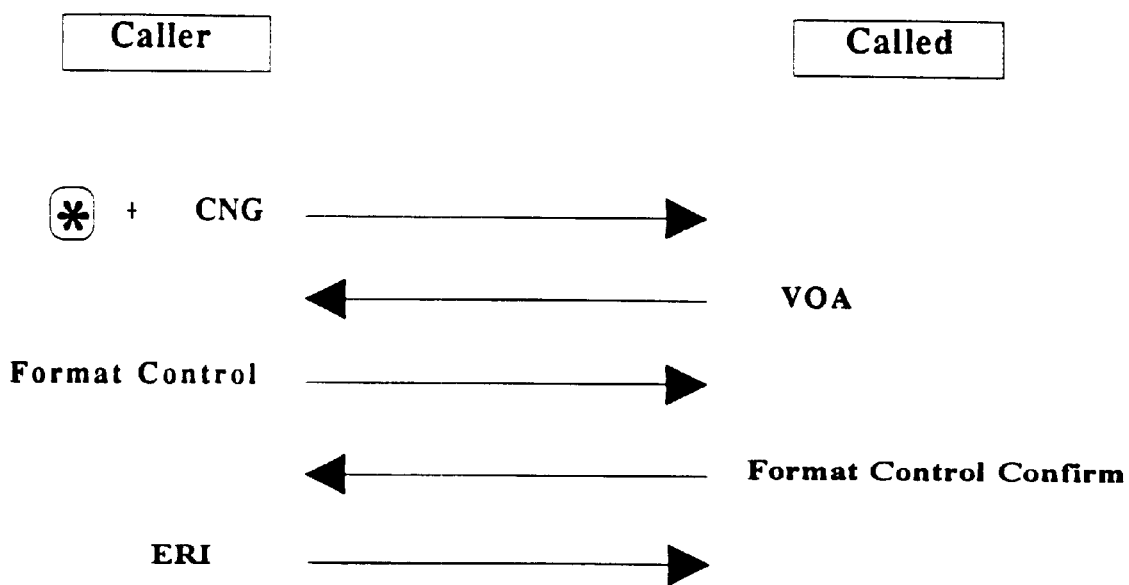

FIG. 74 shows one embodiment of a fall-back contingency for providing backwards compatibility between different versions of the present invention.

Figure 75:
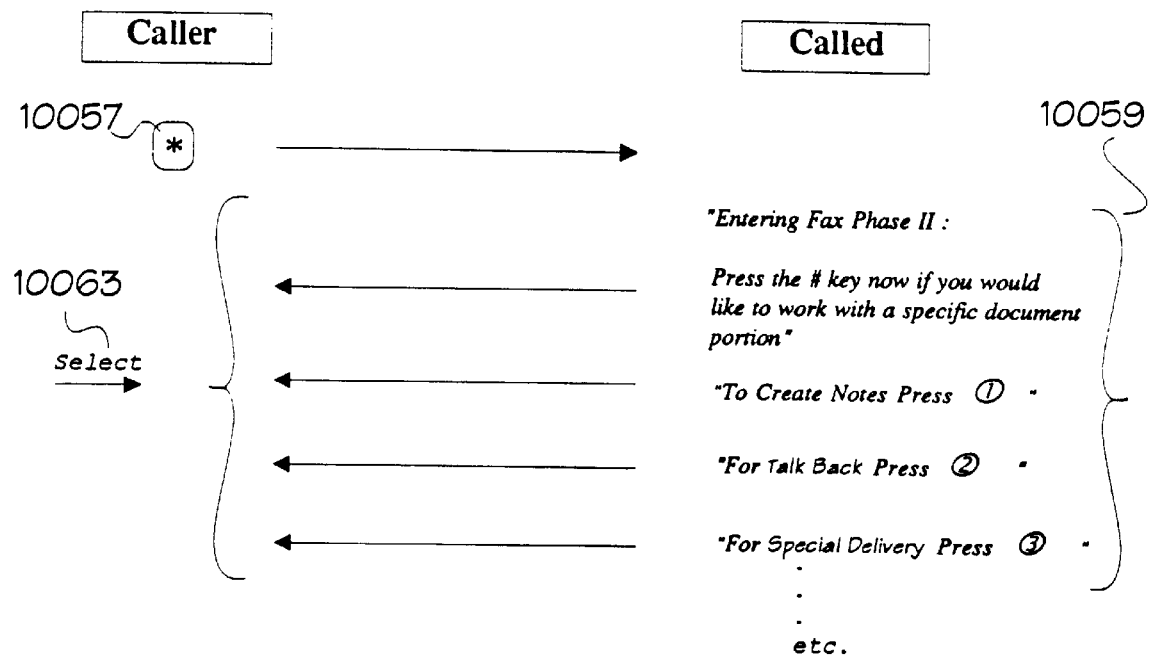

FIG. 75 shows another embodiment of a fall-back contingency for providing backwards compatibility between different versions of the present invention.

Figure 76:
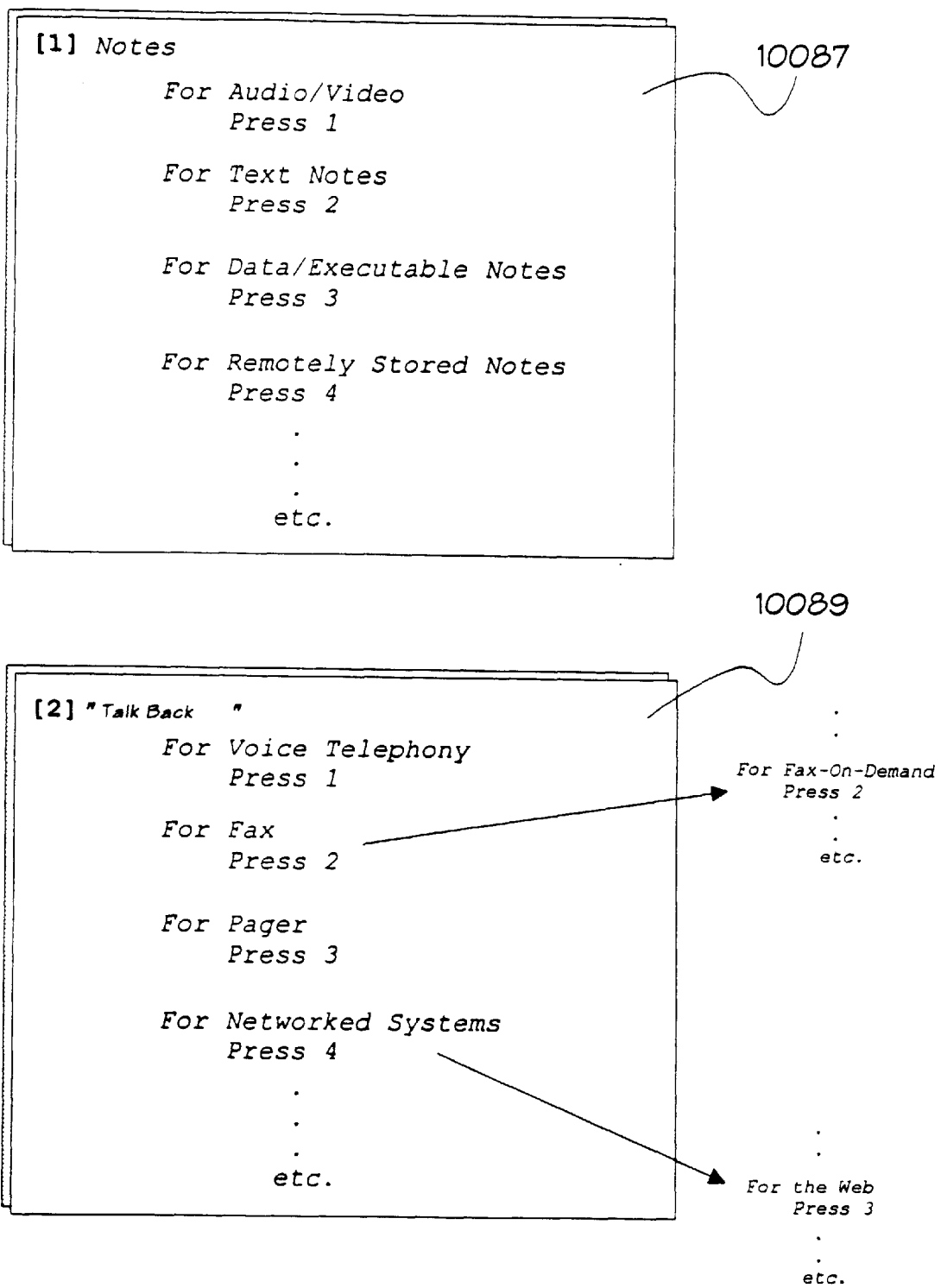

FIG. 76 shows some of the choices offered by the voice menu of the receiving apparatus, for setting up the exchange of electronic reference information between sending and receiving stations.

Figure 77:
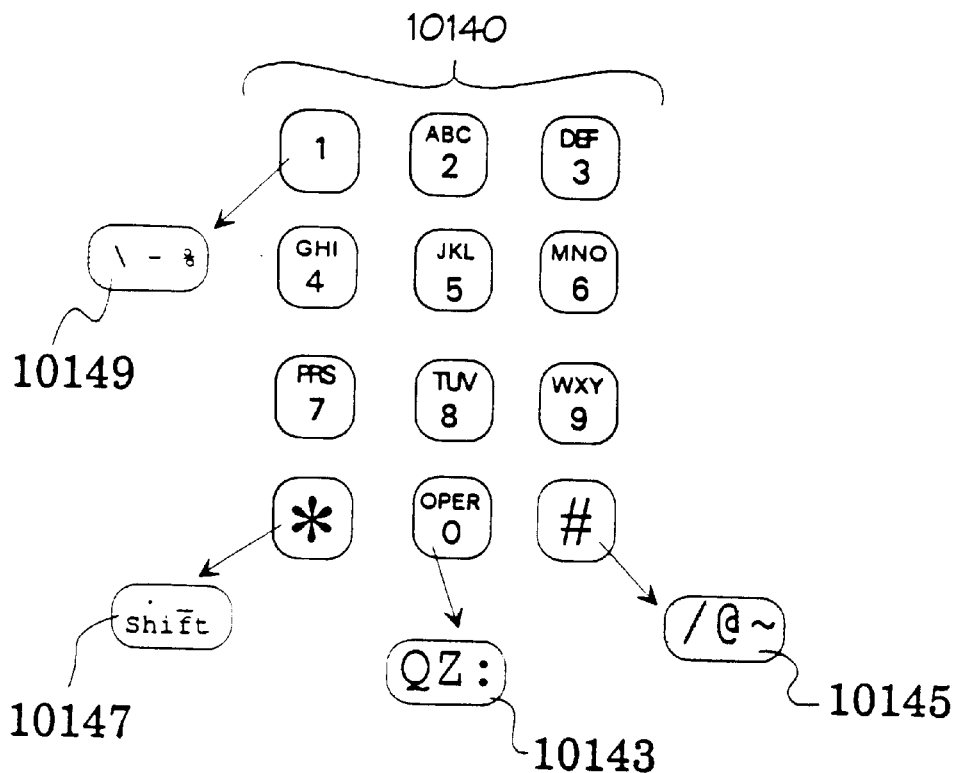

FIG. 77 shows some examples of the use of a telephone keypad to enter alphanumeric information.

Figure 78:
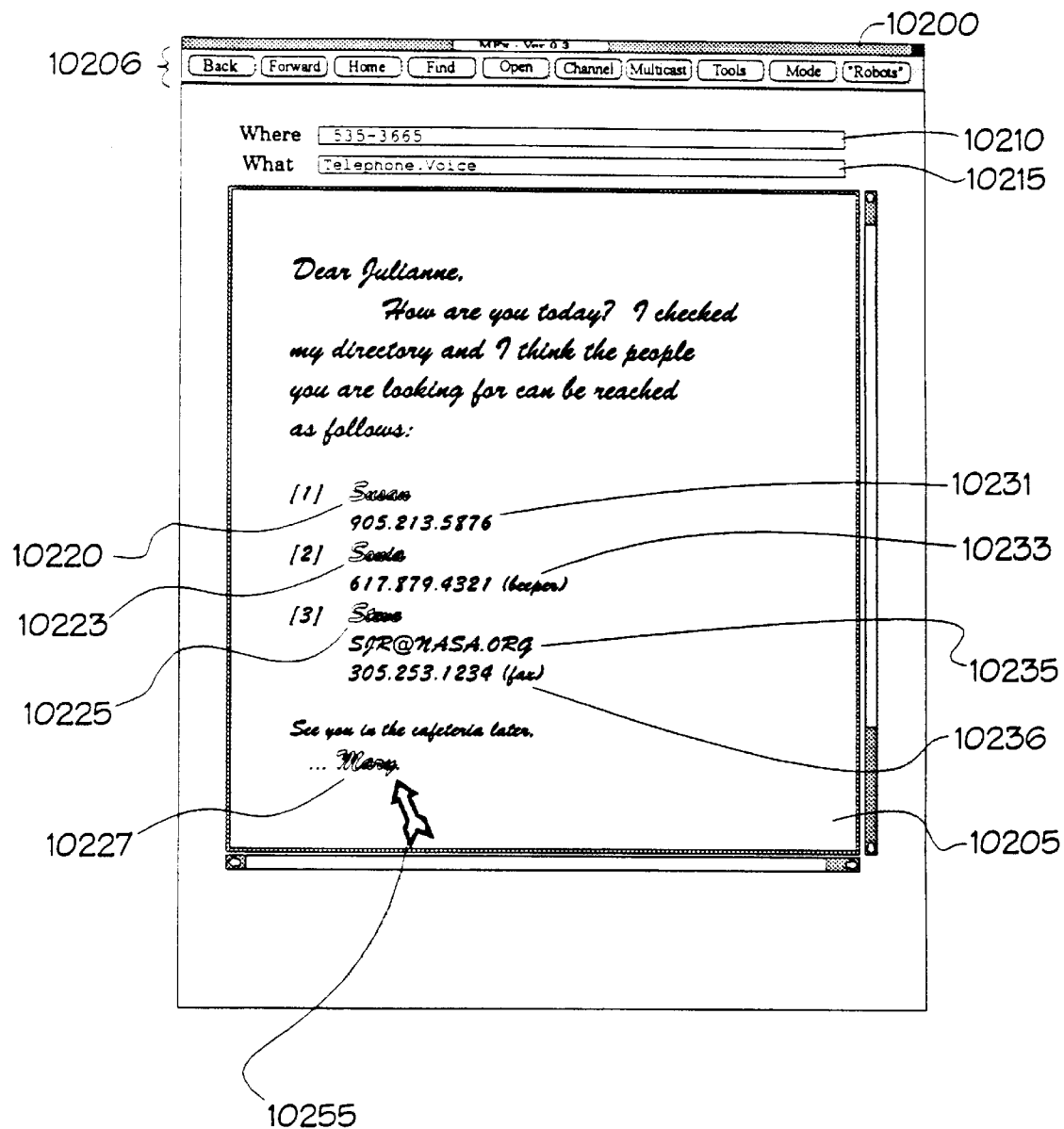

FIG. 78 shows the handwritten hardcopy document 10010 of FIG. 73 after it has been received by the receiving apparatus.

Figure 79:
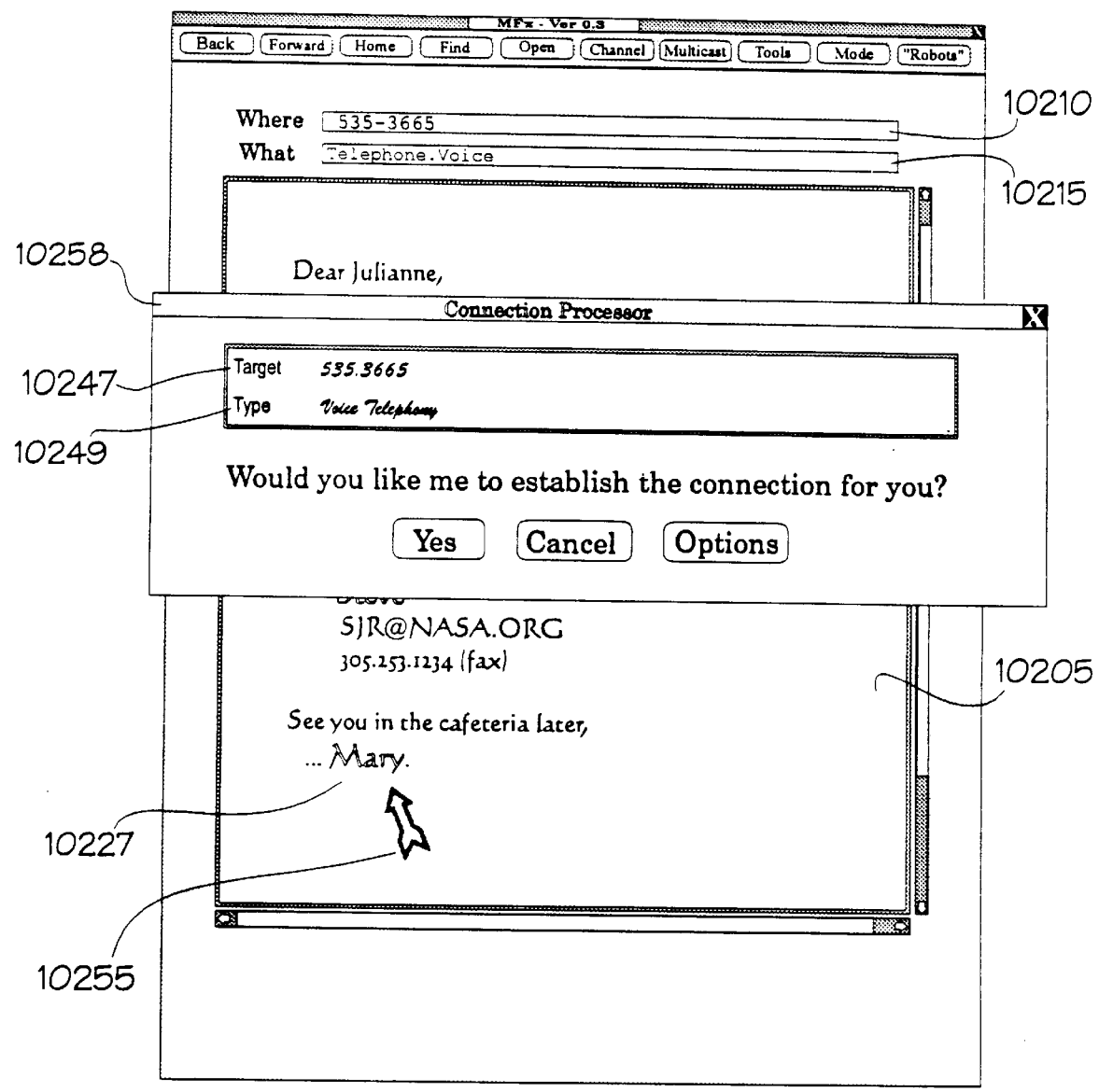

FIG. 79 shows a receiving apparatus constructed in accordance with the present invention establishing contact with a voice telephone number.

Figure 80:
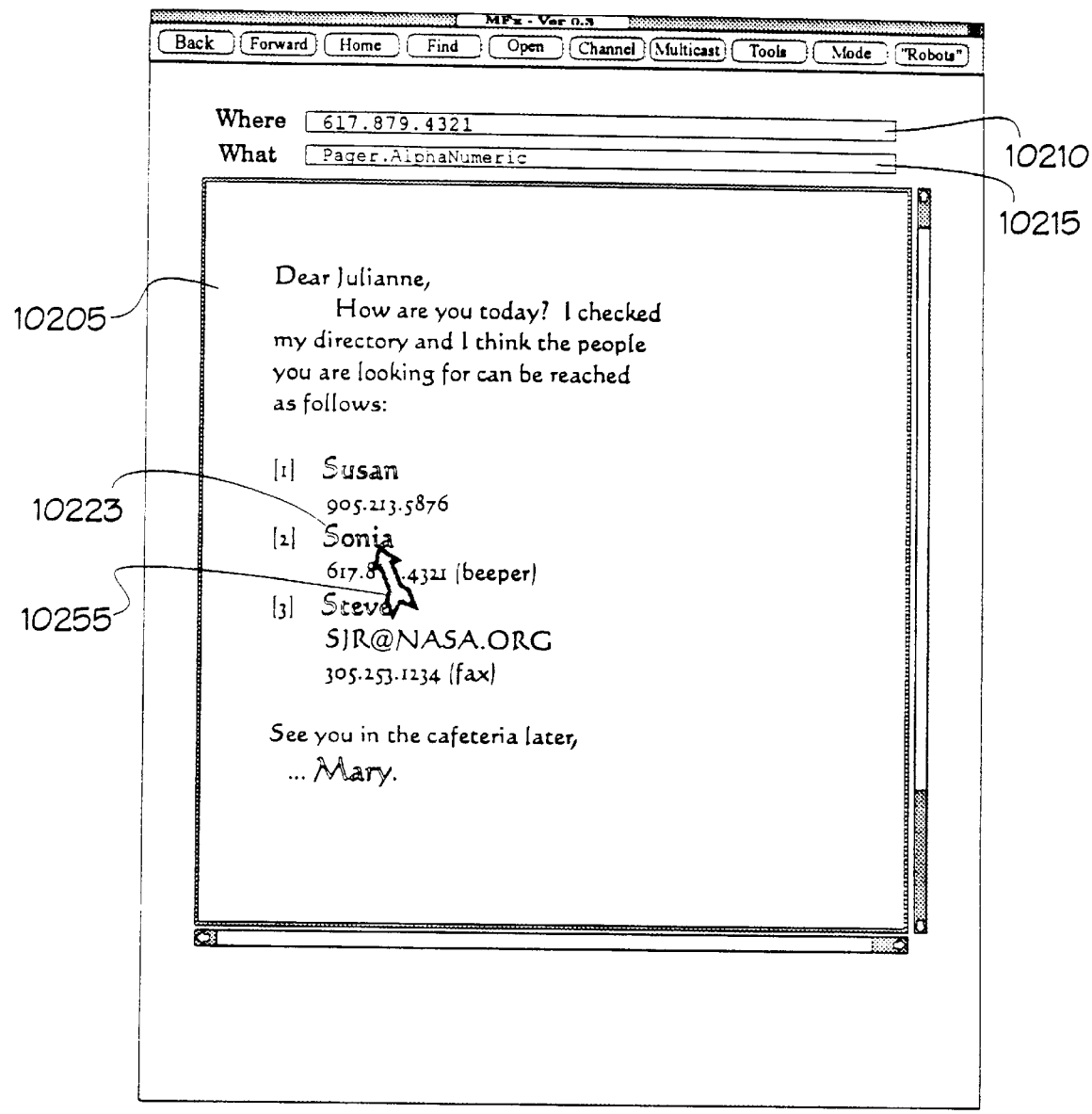

FIG. 80 shows a fax document received from a conventional fax machine that has a link to electronic reference information permitting an alphanumeric paging unit to be automatically contacted.

Figure 81:
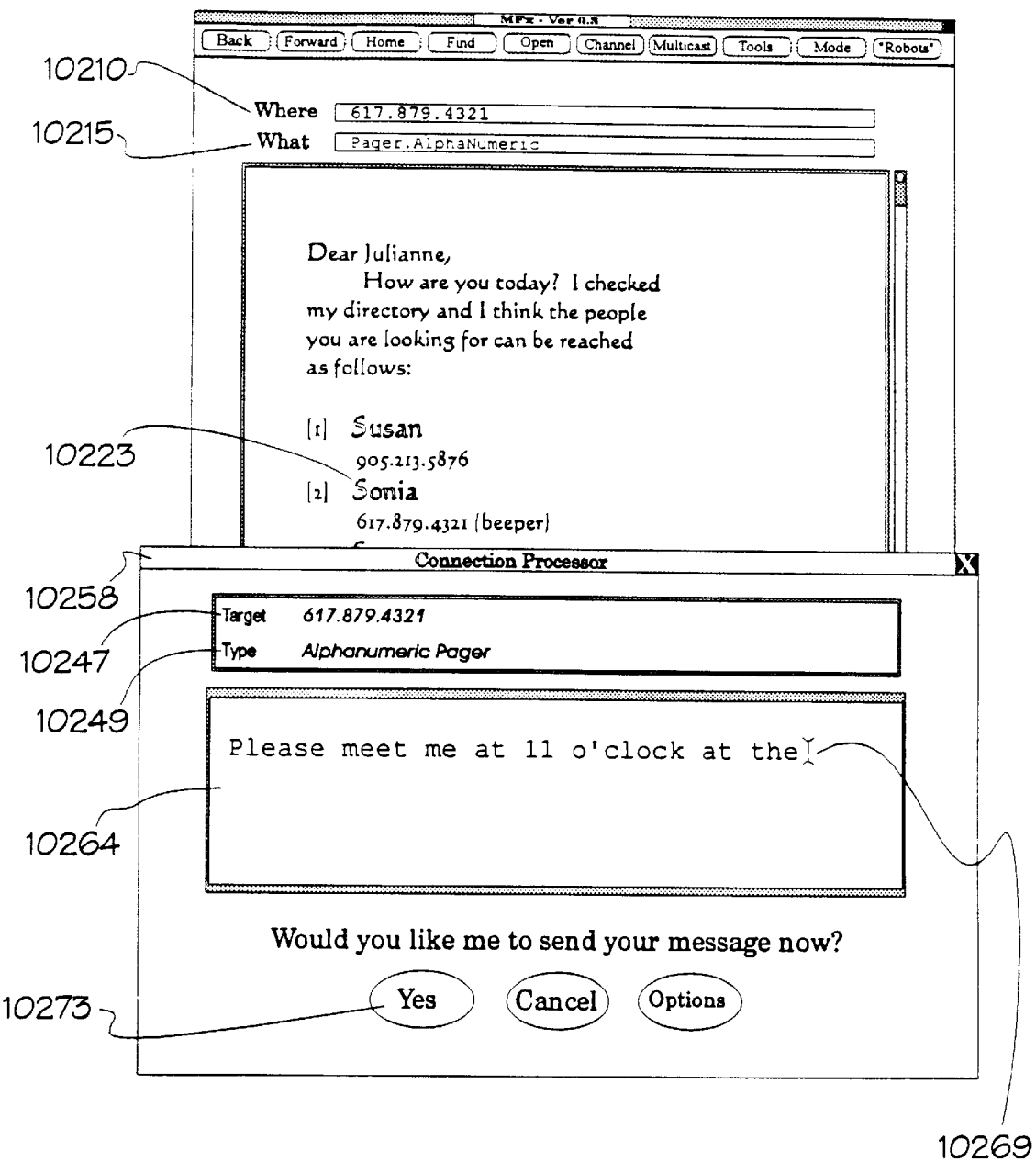

FIG. 81 shows the entry of a text message that will be sent to an alphanumeric paging unit.

Figure 82:
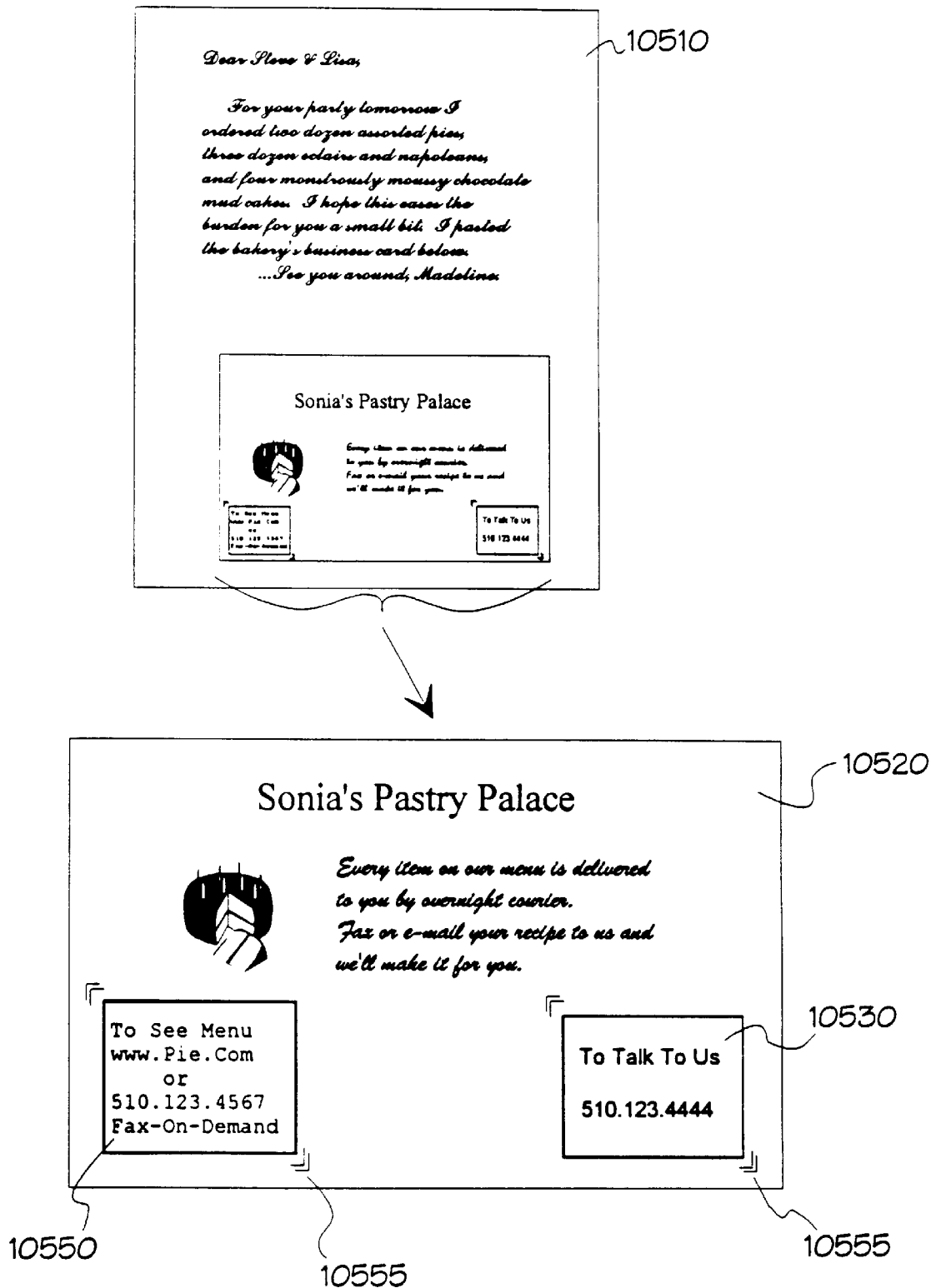

FIG. 82 shows a handwritten letter that will contain a link to a Web site when it is received by the apparatus of the present invention from a conventional fax machine.

Figure 83A:
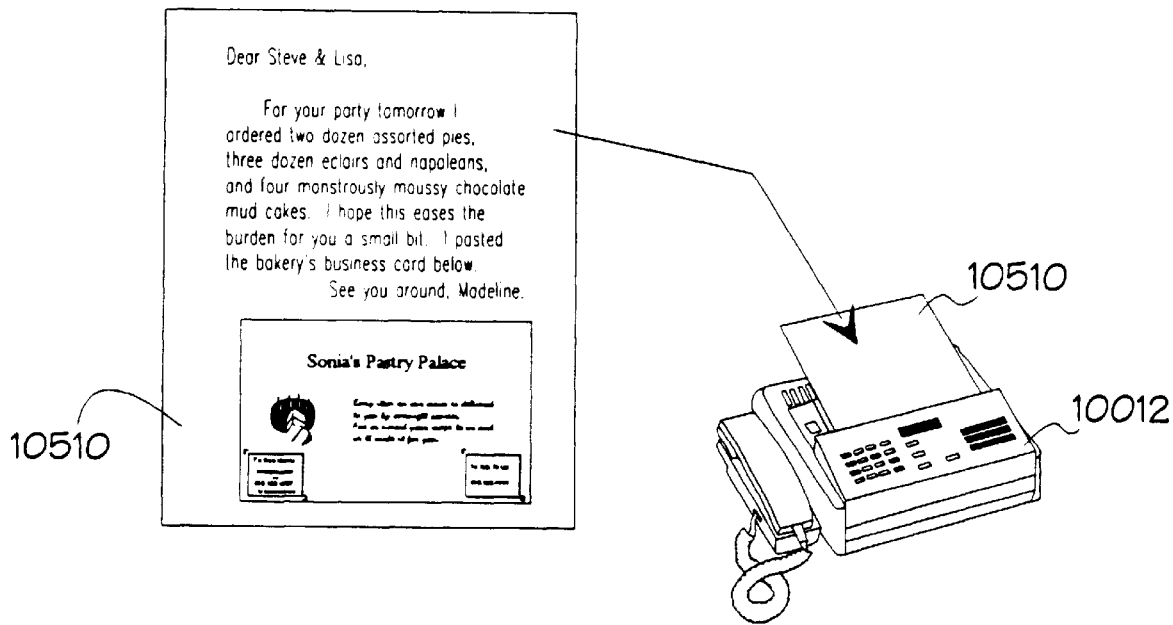

FIG. 83 shows how a telephone keypad may be used to communicate information such as Web addresses.

Figure 84:
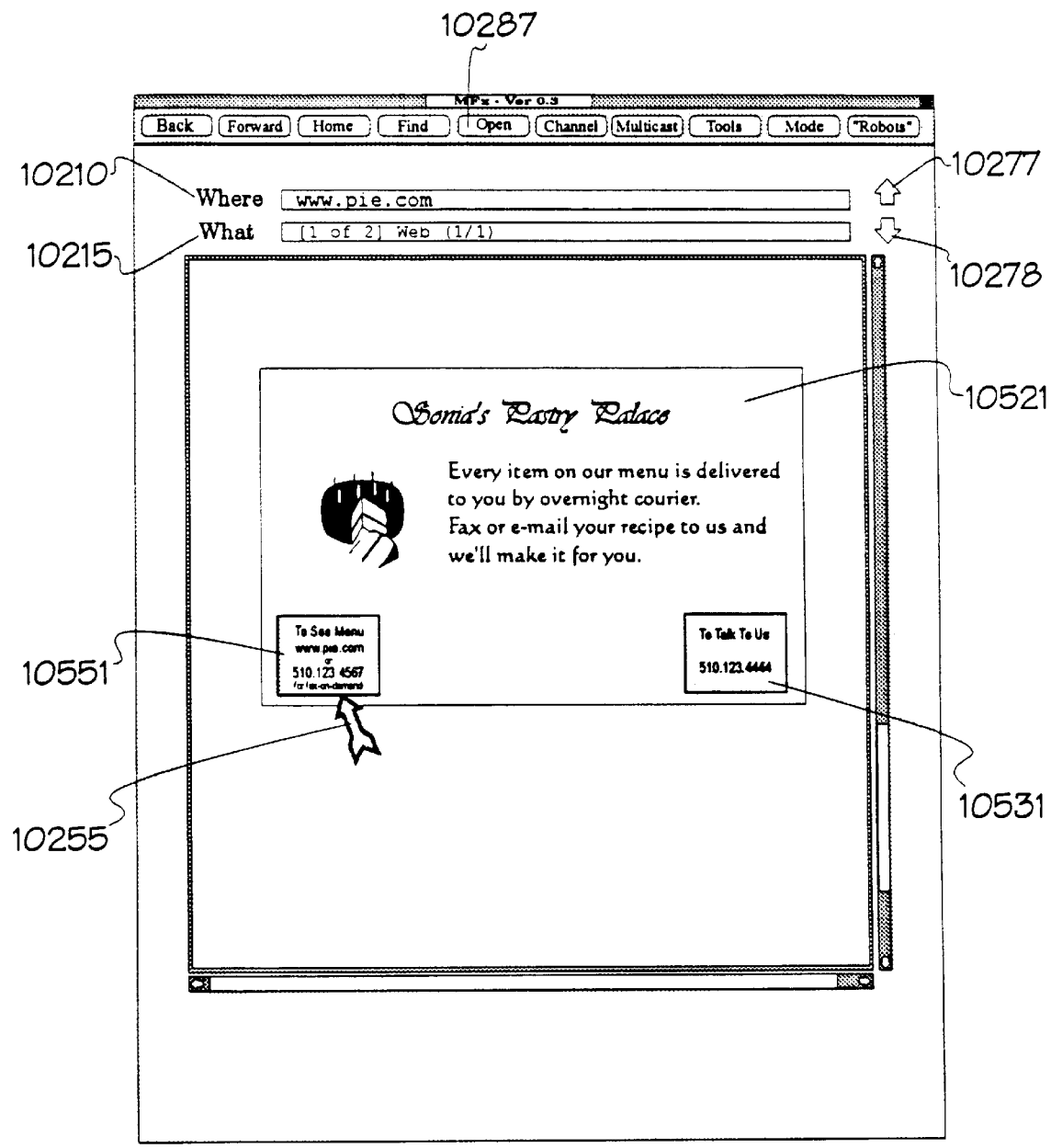

FIG. 84 shows how a received fax document can be used to contact a Web site automatically.

Figure 85:
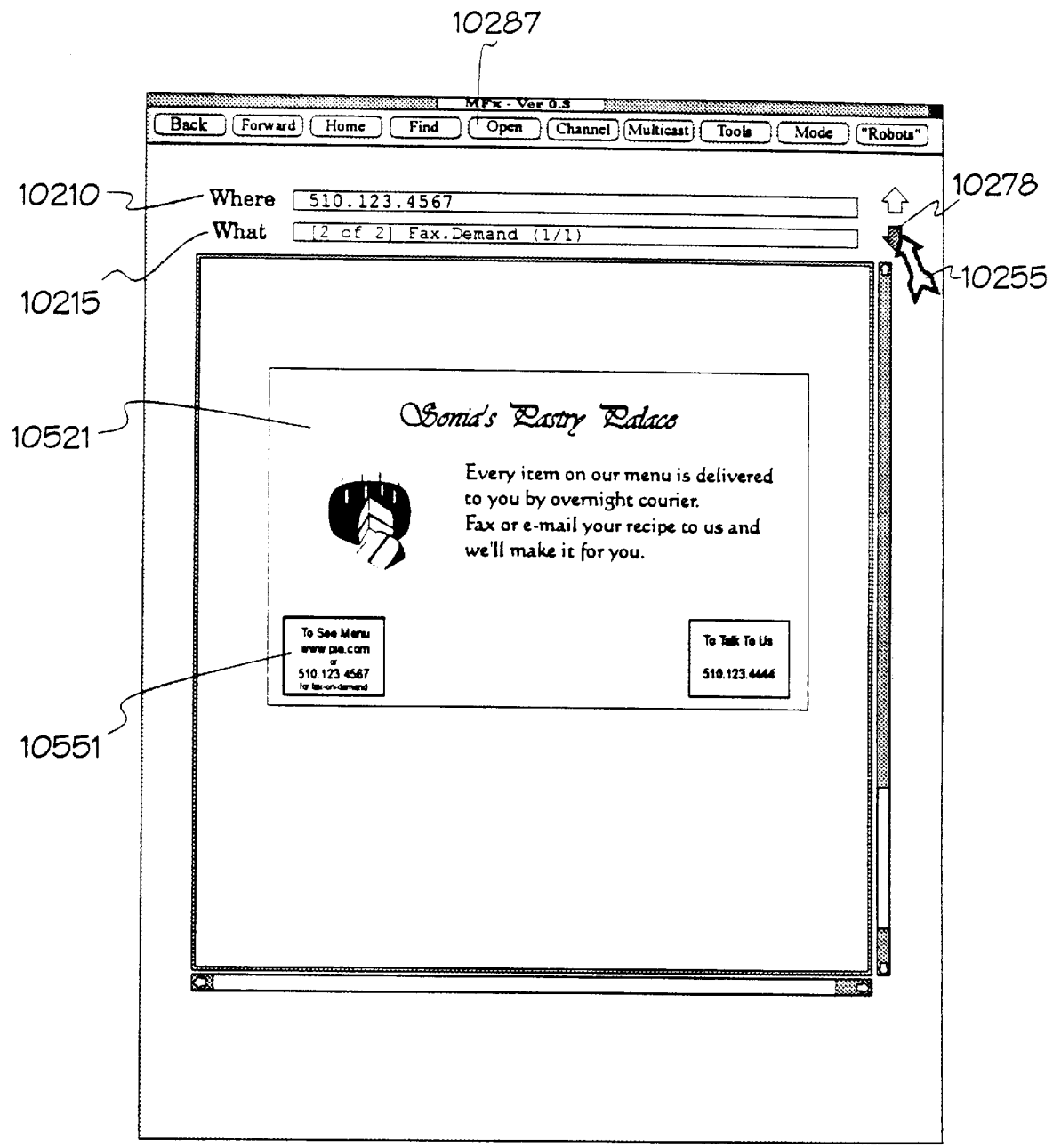

FIG. 85 shows how a document received from a conventional fax machine may be used to contact a fax-on-demand server automatically.

Figure 86:
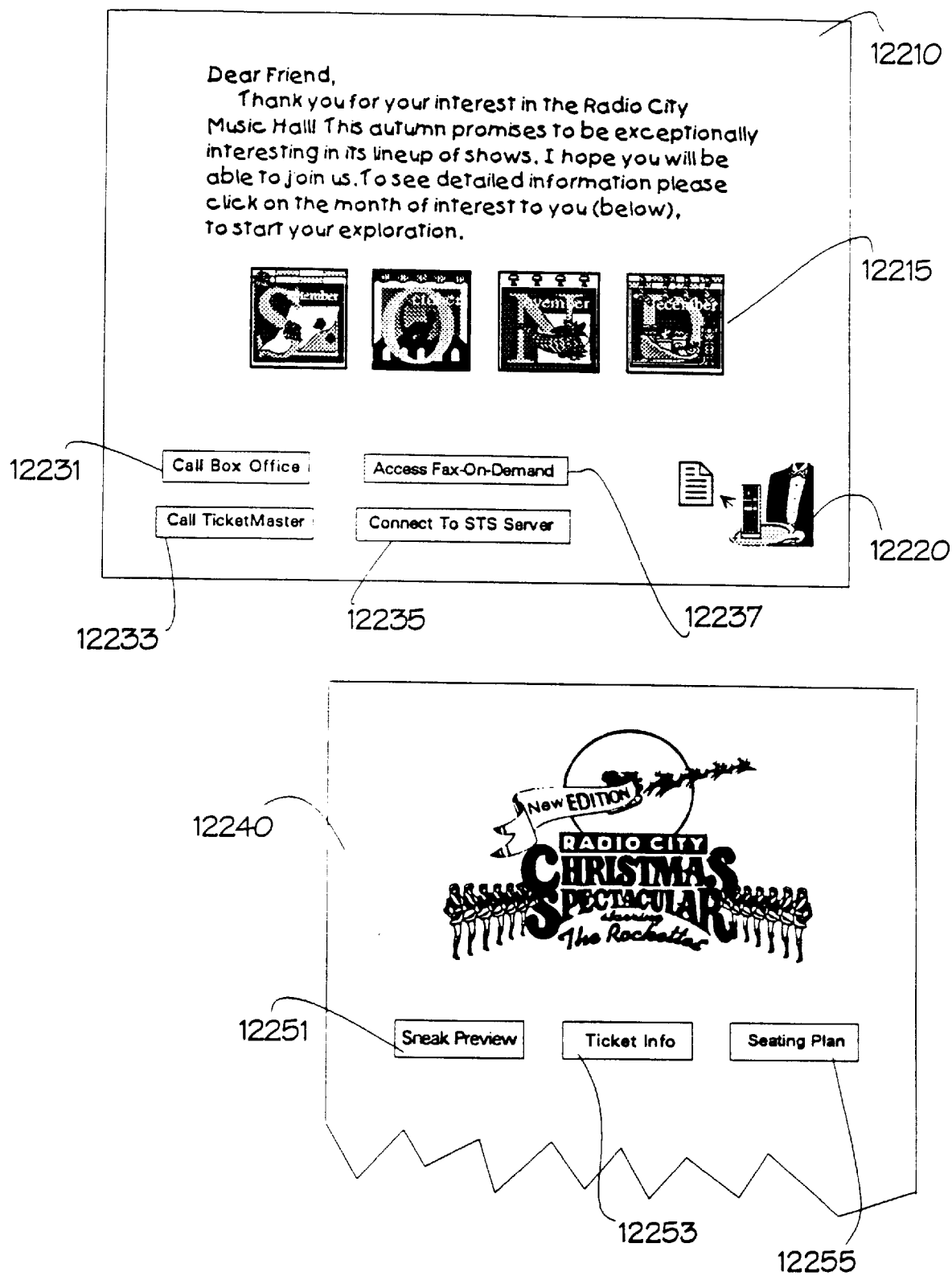

FIG. 86 shows a document received from a fax-on-demand service, and the Web page which can be retrieved from it.

Figure 87:
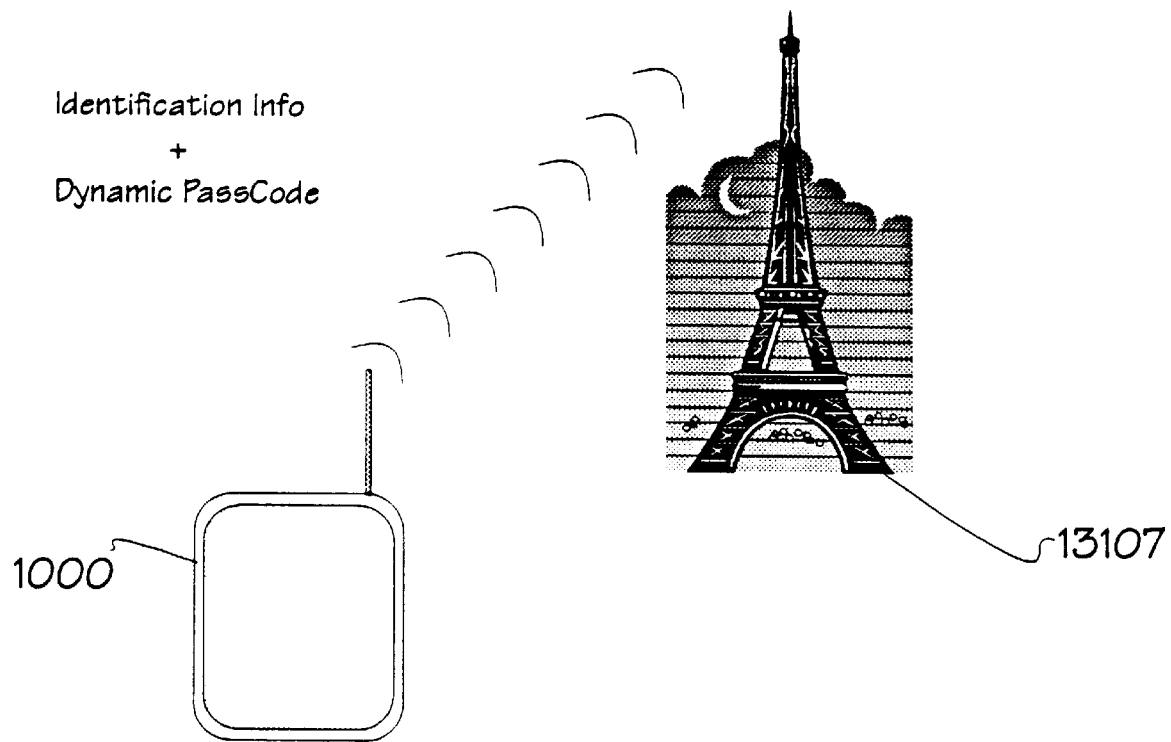

FIG. 87 shows a wireless connection being made using "Dual Component Dynamic PassCode Protection."

FIG. 88 shows one method of obtaining the Co-PIN Number within a Secure Envelope.

DESCRIPTION OF THE PREFERRED EMBODIMENT

The following detailed description is of the best presently contemplated mode of carrying out the invention. This description is not to be taken in a limiting sense, but is made merely for the purpose of illustrating the general principles of the invention. The scope of the invention is best defined by the appended claims.

The general form of the invention comprises a device capable of generating an image derived from an electrical representation of an image. The device possessing the capacity to be mounted or otherwise placed in such relationship relative to a copier that said copier can reproduce the image onto a substrate such as paper.

The electrical signals defining the image may originate from a computer, magnetic storage device, optical storage device, or from any kind of source or electronic apparatus capable of generating, manipulating, storing, or conveying electrical signals representing displayable information. The internal components and the manner of operation of these devices are well known in the art and, in the interest of simplifying the present disclosure, will not be discussed in the present disclosure.

Embodiments of the invention, in a sense, can be likened to "electronic paper" since it is usually a sheet of paper, bearing an image on it, that is placed on a copier for the purpose of being duplicated. Embodiments of the present invention, however, permit images to be easily altered or manipulated as they are of electrical origin. The function of the copier is to transform the "electronic paper" image into one on "real paper", or one on other suitable substrates.

As those skilled in the art of electronic information display are aware, there are numerous means by which an image, emanating from an electrical signal representative of that image, may be fashioned. Numerous strategies embraced by that technological family may be applicable to the reduction to practice of the present invention. Examples of potential image forming systems are: liquid crystal devices, gas plasma devices, fluorescent displays, cathode ray tubes, electrophoretic displays, and filed emission displays. The particular image forming technology used to implement the invention will influence the additional components needed to enable the image forming element to function as intended; impact the resolution, contrast, and quality of the printed output; and affect the overall configuration of the apparatus. For instance, electrophoretic displays would not require back-lighting. The aforementioned considerations are appreciable to those skilled in the art.

Figure 1:
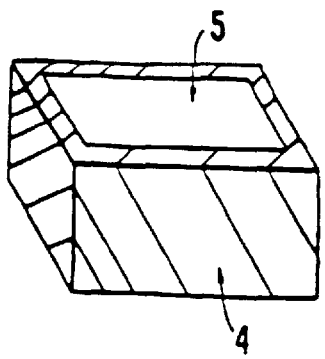
FIG. 1 illustrates a known copying apparatus in schematic form.
Figure 2:
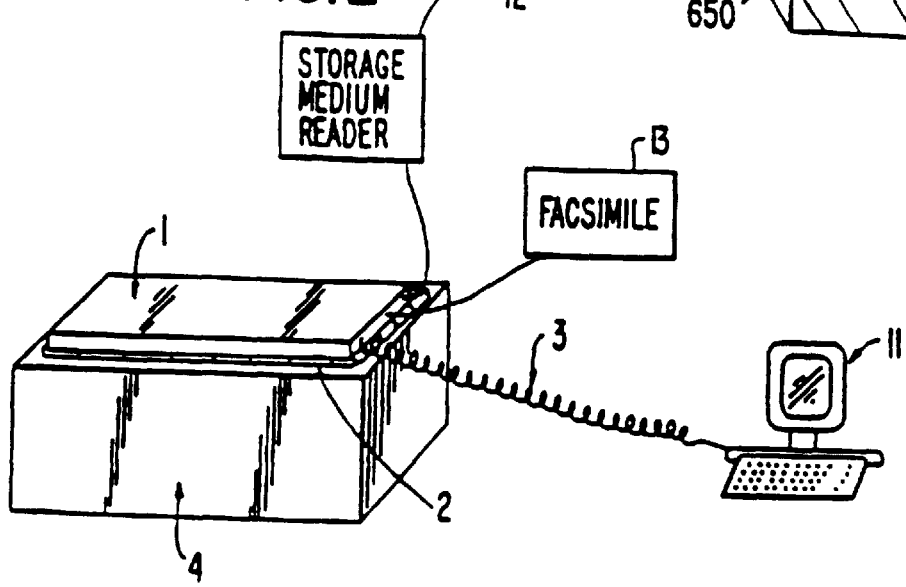
FIG. 2 depicts a preferred embodiment of the present invention mounted on top of the window of the copying apparatus illustrated in FIG. 1.

Depicted in FIG. 1 is a representation of a known copying apparatus, such as a copier. The known copying apparatus includes a body 4 and a copier window 5. In one embodiment, the invention is in the form of an image-forming tablet. As shown in FIG. 2, the image-forming tablet 1 may be placed on top of a conventional copier like an ordinary document, with the copier window 5, shown in FIG. 1, immediately beneath the tablet 1. An electrical cable 3 may be used to convey the signal representative of the image to the tablet 1 from a signal source 11. As described above, the signal source 11 may include a variety of devices, such as a computer, a magnetic storage device, an optical storage device, etc.. A light shield 2 may serve to reduce the leakage of ambient light through the copier window 5, and may be constructed of any suitable, compliant material.

An image forming element of the liquid crystal variety is pictured in FIG. 3. The liquid crystal image forming element includes a liquid crystal image forming layer 6a, capable of forming an image 60 (in this particular example, a set of alphabetical characters assembled into the word "Hello").

FIG. 4 illustrates a reflective back-layer 6b which may be provided adjacent to the liquid crystal image forming layer 6a. For purposes of clarity, the liquid crystal image forming layer 6a and the reflective back-layer 6b are depicted as being spatially separated by a significant distance in FIG. 4. However, in most embodiments of the invention these layers would be relatively closely disposed to each other.

The reflective back-layer 6b may be applied directly to the back surface of the liquid crystal image forming layer 6a in the form of a coating. A primary function of the reflective back-layer 6b is to provide an albedo in the non-imaged areas of the liquid crystal layer 6a that is optically distinct from the imaged areas of the liquid crystal layer. Non-imaged areas of the liquid crystal layer 6a are substantially optically transparent to radiation of wavelengths within the domain of concern. It is also possible to substitute for the reflective back-layer 6b an active, light emitting source, such as an electroluminescent panel. Back-lighting, however, increases the power consumption level.

FIG. 5 depicts the elements of FIG. 4 with the inclusion of an alphabetic character string formed on the liquid crystal layer 6a.

FIG. 6 shows a schematic view from beneath the copier window 500 of an ordinary copying apparatus 40. The structures illustrated in FIG. 5 are shown positioned on top of the copier window 500, in the manner that they would be during the process of duplicating the image 60 formed by the image forming layer 6a.

Figure 7:
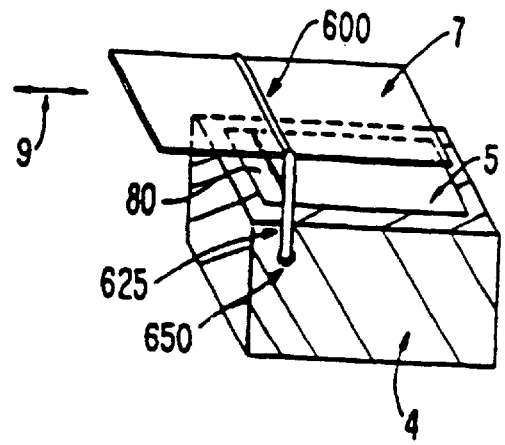
FIG. 7 illustrates an embodiment of the invention that can be used with copiers possessing moving copy-boards, which are common to many low cost "personal" copiers.

The tablet shaped embodiment of the invention described above is fully capable of being used with low cost "personal" copiers possessing moving copy boards. An embodiment of the invention specially adapted for use with such copiers is illustrated in FIG. 7. As depicted in FIG. 7, the imaging element along with its supporting members is in the form of a strip 600. The strip 600 may be held in place by a structural support 625, which in turn may be mounted to the body of the copier 4 by a fastener 650. Beneath the copier window 5 can be seen that part of the copier 80 which is sensing the pattern formed by the strip 600 for reproduction onto a substrate. Interposed between the image forming element 600 and the copier window 5 is a transparent copy board 7 which is the part of the copying apparatus that undergoes translational motion, and is the member upon which any document to be copied is ordinarily placed.

FIG. 7 is intended to demonstrate one configuration of the present invention that may be used in conjunction with low cost "personal" copiers possessing moving copy boards. It will be recognized by those skilled in the art that numerous alternative configurations are possible for such use.

Figure 8:
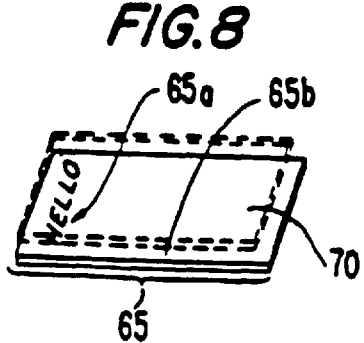
FIG. 8 illustrates an alternate embodiment to that depicted in FIG. 5 in which the image-forming element is of the emissive variety.

FIG. 8 illustrates an embodiment of the invention in which the image forming element is of the emissive variety; that is, of the type which emits radiation, e.g., light. Such an image forming element may, for example, employ a fluorescent display, a gas plasma display, etc. The image forming element 65, during the course of operation, may include one or more portions 65a that are not emitting light and one or more portions 65b that are emitting light. It is the sum of the non-light emitting areas 65b that collectively comprises the image to be printed.

In FIG. 8 the non-emitting areas 65a are seen to compose the character string "HELLO" against the background of emitting areas 65b. The photoconductor of a copier will be discharged by the light emitting portions 65b, to leave behind on the photoconductor a latent image charge pattern substantially identical to that defined by regions 65a. Also shown in FIG. 8 is an anti-reflective layer 70. The function of this anti-reflective layer is to reduce the amount of light emanating from the copier's internal light source that is back-reflected off of the surface of the image forming member of the apparatus of the present invention. In practice the anti-reflective layer is more likely to be present as a surface coating on the image forming member. An anti-reflective layer may be included in other embodiments, such as those employing liquid crystal components.

Figure 9:
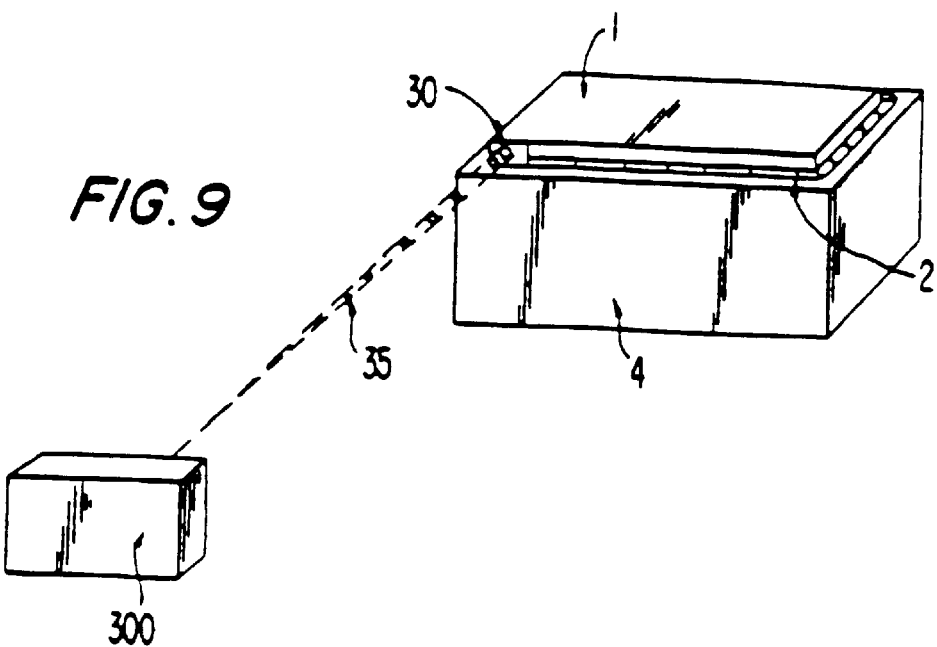
FIG. 9 illustrates an embodiment of the invention in which the signal representative of the image to be printed is transmitted to the image-forming member by an "intangible mechanism" such as an infra-red beam, rf-signal, etc. (in contrast to a cable or electrical wire).

FIG. 9 is a diagrammatic representation of an arrangement where the electrical signals defining the image to be printed are transmitted by an infrared beam, rf-carrier, or other "intangible medium" from a source 300 to the apparatus of the present invention 1. The point of reception of the information-bearing signal is shown as 30. The "intangible medium" that substitutes for the electrical cable or connector is indicated by 35. The copying apparatus is designated as 4; and the webbing which shields ambient light from leaking through the tablet/copier interface is identified as 2.

Figure 11:
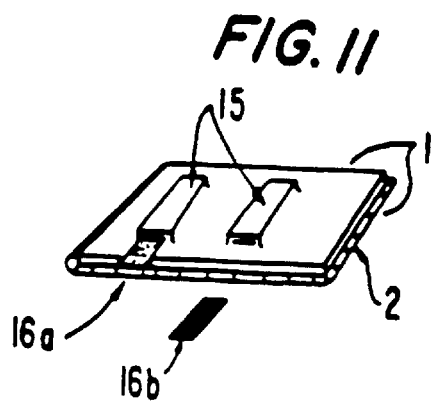
FIG. 11 illustrates an installation of two different and optional Device Emulation Modules, which impart to the apparatus additional capabilities such as facsimile machine emulation.

FIG. 11 illustrates the installation of two Device Emulation Modules into "Module Bays", 15. In FIG. 11, a first module, 16a, is designed to perform a first function, and a second module, 16b, designed to perform a second, different function. An example of a function which a module 16a or 16b may perform is that of facsimile machine emulation, as described in further detail below. Whereas two Modules are shown in FIG. 11, the apparatus of the present invention is not restricted to this number. Also, while some embodiments contain data storage devices such as disk drives, these are not represented in FIG. 11.

Some embodiments incorporate into the apparatus the means to read directly from data storage media such as magnetic diskettes, magnetic tapes, or optical discs. This facility permits text or graphical information to be directly loaded into the apparatus and obviates the need for connection to another device such as a computer. As some embodiments of the invention may be powered by batteries, certain versions, especially when coupled with the capability to read directly from data storage media are highly self-contained and portable: requiring for operation only a conventional copier and a diskette (for instance) containing material to be printed.

An embodiment specially adapted for "forms printing" includes a modification to the spacing between image forming element 6a and reflective back-layer 6b (which were discussed earlier in connection with FIGS. 4 through 6).

Figure 12:
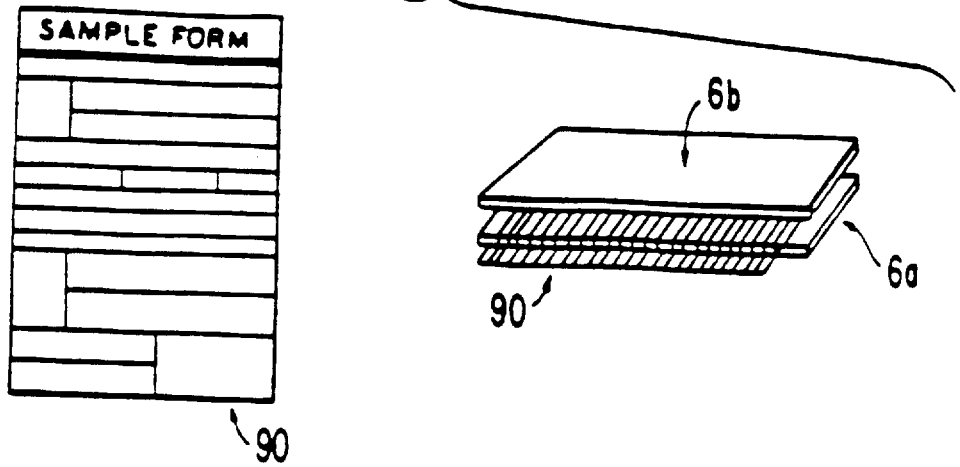
FIG. 12 illustrates an embodiment specially adapted for "forms handling"—that is, the computer assisted completion of forms, wherein a form (or application) is being inserted between an image forming element and a reflective back-layer.

As illustrated in FIG. 12, a blank form 90 is inserted between members 6a and 6b, with the front of the blank form facing 6a. The actual spacing between members 6a and 6b may be changeable so as to accommodate forms of different thicknesses; and means may be provided to adjust the spacing to suit the inserted form. Additional means may be provided to alter the relative positions of layers 6a and 6b to facilitate insertion and removal of blank forms, as well as to insure their proper alignment within the tablet.

Figure 13:
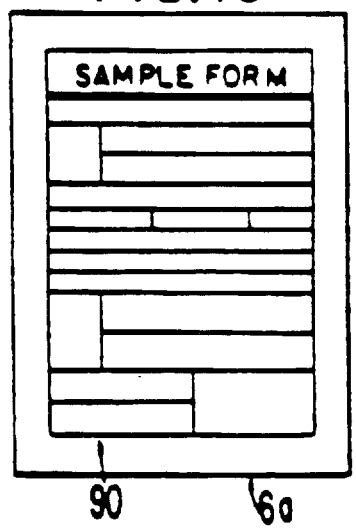
FIG. 13 is a view of a "blank form" as seen through the image forming member.
Figure 14:
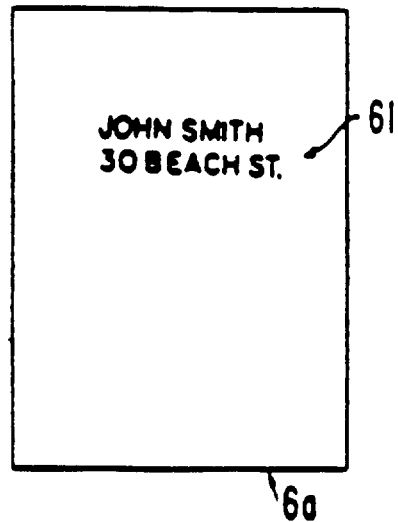
FIG. 14 illustrates an image forming member bearing information pertinent to completion of the "blank form" generated on it.
Figure 15:
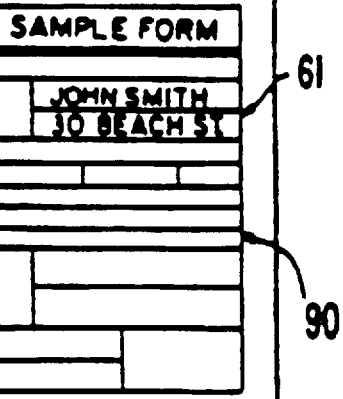
FIG. 15 depicts the information appearing in FIG. 14 superimposed on the "blank form".

FIG. 13 demonstrates how blank form 90 would appear viewed through image forming member 6a, which is the copier's perspective during the reproduction process. FIG. 14 depicts the image forming member, 6a, with alphanumeric information, 61, generated on it. In the illustrated example, the information comprises two data fields that are pertinent to completion of blank form 90: a name, and a street address. The information may be derived from a software package such as a data base manager, a spreadsheet, or a word processor. FIG. 15 portrays the visual overlay that results when blank form 90 is situated behind image forming member 6a, and displayable information is present on member 6a.

Figure 16:
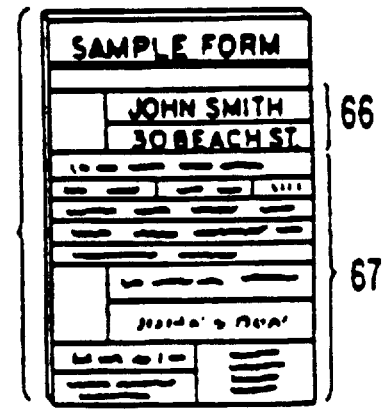
FIG. 16 shows a "completed form" that was created by the apparatus of an embodiment of the present invention.

Exhibited in FIG. 16 is the printed output of a copier that has been used in combination with the tablet of an embodiment of the present invention operating in "forms printing" mode. It can be seen that the original blank form, 90, has been duplicated and that the data discussed in connection with FIGS. 14 and 15 have been imprinted on the replica; they are indicated by 66. Other information, 67, relevant to the completion of blank form 90 has, in a similar manner, likewise been imprinted. The "filled out form" output by the copier is labeled 99.

In addition to serving as a portable conversion device that enables a conventional copier to function as an electronic printer, high speed printing matching and even exceeding the capability of dedicated electronic printers can be achieved by using the present invention in concert with high performance copying equipment. Further, other benefits provided by such equipment including large volume printing, and elaborate paper handling facilities like collation and stapling can be conveniently tapped.

Not only do embodiments of the present invention permit an ordinary copier to be utilized as a computer printer, but it also enables the conventional copier to function as a "receiving end" facsimile printer. In one embodiment a facsimile module can be plugged into the tablet to enable fax data transmitted over standard telephone lines to be intercepted, interpreted, and converted into displayable form. Once present on the image forming member, the graphical data can be reproduced by a copier. Further, it should be noted that the facsimile information can be directly viewed off of the image forming member, and thus need not be printed unless desired. In this manner the present invention provides for both "optical fax" and conventional "hard copy fax", and permits the user to inspect a transmitted document in entirety before deciding whether all or only portions are to be printed. Variations on this theme include embodiments possessing document scanning capabilities, so that data transmission is possible, in addition to data reception. Other embodiments are equipped with storage means so that incoming data can be saved, then printed in a time-shifted fashion at another moment.

Figure 10:
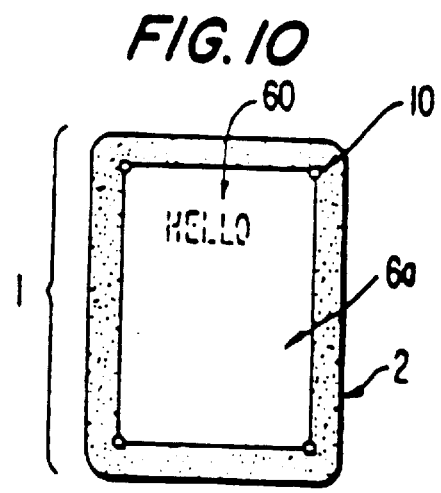
FIG. 10 illustrates one possible arrangement of photodetectors on an image forming tablet.

Embodiments of the invention may possess means to detect when a copier has completed its scan cycle; that is, when an image to be duplicated has been successfully captured by the copier. An example of a detection means is a photosensor 10 shown in FIG. 10. Shortly after the photosensor 10 detects the flash from the copier's source of illumination, the next image, or page, is formed on the image forming member. With the next image present, the succeeding copy cycle prints the next page of information. Multiple copies of each page are handled by counting the number of flashes emanating from the copier; when the count reaches the number of copies desired for that page, the next page is formed on the image forming member. The copier must be set to the total number of pages that are to be printed.

In practice it is convenient to employ four photodetectors positioned approximately at the corners of the image forming tablet. After all four photodetectors register exposure to the copier's source of illumination, "page flipping" on the image forming member takes place. "Page flipping" does not take place if all of the photodetectors do not register an exposure, since such a situation may be the result of an error condition: for example, the page on the image forming member may not have been completely scanned by the copier. As would be clear to individuals skilled in the art of circuit design, the above-described operation is easily accomplished by simple logic circuitry; which is preferably incorporated into the tablet of the present invention. The method described for controlling "page flipping" applies to copiers with scanning light sources and copiers with flash type light sources with equal facility. Manual "page flipping" is also possible, but requires the sustained presence of an operator. Furthermore, it will be recognized that other types of detection means for detecting when a copying operation is being, or has been, performed may be employed (e.g., thermal sensors, current or voltage sensors, etc.).

While the placement of an image forming element of one of the kinds described herein within an otherwise typical, dedicated copying tablet is possible, it has not been the objective here to propose device modifications. In contrast, the goal of the present invention is to make use of existing conventional, dedicated copying equipment to print images created or stored in an electronic format that heretofore has necessitated the use of an tablet such as a "computer printer".

Examples of Option Modules, which provide device emulation means, are discussed in greater detail below in connection with FIGS. 17 through 32. The following discussion is divided into two parts. First, examples of some general features and operational characteristics of a tablet featuring option modules are presented. Second, a treatment of some of the technical considerations involved for reducing this aspect of the invention to practice is provided.

I. EXAMPLES OF SOME OPTION MODULE CHARACTERISTICS

It is recognized that different computer platforms have different strengths. Individuals skilled in the use of more than one type of machine may feel inclined to migrate from one piece of equipment to another in an effort to maximally utilize available resources. This is especially true at universities and in research settings. One of the problems encountered by people who employ a multiplicity of platforms in their work is the need to return to each of the platforms used in order to produce hard copy. This may mean returning to a number of different and geographically segregated sites. Another problem is that the software originally used to create each portion of the whole work must still be present (or available) on each of the platforms used. When hardware is shared among many users, it is not uncommon for software to be erased by people seeking to free-up disk space. This means having to re-install applications software—a potentially time consuming process.

One of the primary objectives of the present invention is to provide hard copy of electronic format information arising from diverse origins. Another objective is to provide hard copy of electronic format information arising from diverse origins in a manner that is flexible and accessible, even to people with non-technical backgrounds. Yet another objective of the present invention is to accomplish the above goals in a fashion that is economical and user-customizable. These and other objectives are facilitated by Option Modules.

Prior to the advent of the present invention, in order to obtain hard copy of information generated by a particular type of equipment, one needed to return to, and to employ, that specific type of equipment. For instance, a diagram drawn on an Apple Macintosh computer would typically necessitate the use of an Apple Macintosh computer in order for a printout to be produced. A document written on a Smith Corona dedicated word processor would require the application of such a unit for print out to be obtained. A photograph taken by a still video camera would customarily make use of a video-floppy disk printer to make the journey from electrical signals to ink on paper. Because the inventory of equipment that generates electronic format data is enormous, and continuing to grow, the complexity of producing hard copy is also increasing.

The present invention employs an ordinary copier as a source of a print engine. It then builds on this with the support of Option Modules which, by providing device emulation means, transforms an ordinary copier into a universal print engine. Furthermore, because the user interface has been tailored to people having non-technical backgrounds, information generated on a variety of computer platforms and devices is made accessible even to those who do not know how to operate the equipment that originally created the information.

Because a modular approach is employed, users can customize a tablet in accordance with the present invention to suit their particular printing needs. For example, one who only uses an Apple Macintosh computer can install a Macintosh-only option module for printing out Mac files saved on floppy diskettes. Similarly, for those whose computing needs are met exclusively by IBM/DOS machines, only an IBM/DOS option module need be used. University libraries, on the other end of the spectrum, are likely to have installed more costly multi-platform adapters so that files originating from a range of sources, such as IBM PC's, Macintoshes, Commodore Amiga's, Next Stations, Smith Corona word processors, etc. can all be printed using a library copier. Not only is the modular approach of the present invention functionally adaptable, but it is also economically flexible. Because different copiers can be used in conjunction with a single tablet, the overall system performance can be customized by the user. For example, a tablet might be used with a low cost "personal copier" for ordinary print jobs. The same tablet might later be used with a high speed collating copier to print archival data from a CD-ROM. And still later, that same tablet might be employed, for example, with a "blue print" machine to print an architectural blue print. Thus, the overall system can be tuned to meet specific printing needs by varying the choice of option module and print engine—the latter being conveniently and economically furnished by an ordinary copier.

Figure 17A:
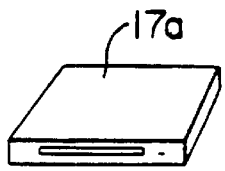
Figure 17B:
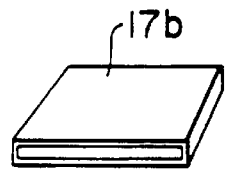
Figure 17C:
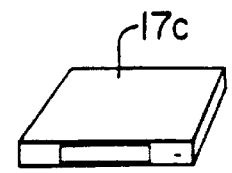

FIGS. 17(d) and (e) illustrate an example of a tablet 1 equipped with device emulation module receiving means 15, into which option modules 16a and 16b may be inserted. Additional receiving means 177 may also be supplied in some embodiments to allow data storage device modules such as 17a, 17b, or 17c to be installed. In FIGS. 17(a)–(c), the illustrated data storage device module 17a comprises a 3.5" floppy diskette drive; the illustrated data storage device module 17b comprises an optical storage unit such as a CD-ROM drive; and the illustrated data storage device module 17c comprises a tape drive.

The illustrated device emulation controller module 16a contains a storage device controller (e.g. an Apple Macintosh 3.5" diskette drive controller, an IBM 5.2" diskette drive controller, a Next machine 3.5" drive controller, etc.) to control the data storage device module 17. Depending on the data storage device module 17 installed in the tablet 1, different storage device controllers may be used. The device emulation controller module 16a may also comprise a "multi-media" storage device controller, capable of controlling a range of storage device types, and thus of providing access to a plurality of data storage formats. If this is the case, then a single device emulation controller module 16a would be capable of controlling a plurality of data storage device modules 17. The device emulation controller module 16a will incorporate circuitry similar to that which may be currently found in diskette drive adapters, tape drive adapters, CD-ROM adapters, etc.

Also illustrated in FIG. 17(e) is a second device emulation module 16b which provides the means to translate data from one format into another. The source data format would typically be the "native format" of an applications software package, such as WordPerfect, Lotus 1-2-3, Paradox, etc.. As used herein, the term "native format" means the default data storage format of the applications program that created the data. For instance, "Publisher's Paintbrush", a popular paint program for IBM-compatible platforms, has "PCX" as a native storage format.

The applications file interpreter module 16b operates in concert with the storage device controller present in the device emulation controller module 16a and the data storage device module 17. The applications file interpreter module 16b enables the tablet 1 to access and then to translate (or interpret) information stored in different native formats on various data storage media into a form that may be displayed on the image display screen of the tablet 1. Once in screen displayable form, such information may be printed, as on plain paper hard copy output P by the copier 4, as illustrated in FIG. 17(d).

Additionally shown in FIGS. 17(d) and (e) is an example of an operator's console 100, which provides a graphical user interface for the apparatus and may be found on the back of the tablet 1. The operator's console 100 may include an ATM-style touch-sensitive operator's console screen, so that intuitive or "natural" operation of the tablet 1 may be facilitated.

FIG. 18(a) illustrates four 3.5" floppy diskettes 18a–18d, generated by four different computer platforms, that may be inserted into the data storage device module 17a of the tablet 1. The illustrated 3.5" floppy diskettes 18a–18d contain data saved in a variety of different and mutually incompatible formats. For example, the data on the diskette 18a was created by an IBM/DOS machine, the data on the diskette 18b was created by an Apple Macintosh, the data on the diskette 18c was created by a Next machine, and the data on the diskette 18d was created by a Commodore Amiga.

In the illustrated example, the device emulation controller module 16a is preferably a multi-format storage device controller. This eliminates the need to plug in a different, dedicated controller module prior to the insertion of each different type of diskette. If, on the other hand, it is known that the tablet 1 will only be used to reproduce documents stored in, for example, IBM/DOS format, the device emulation controller module 16a may be equipped to read only IBM/DOS format diskettes.

Techniques for enabling a device emulation controller module 16a to operate as a multi-format storage device controller are well known to those skilled in the art. That is, the capability of reading diskettes of more than one format using a single disk drive are well known. As an example, disk drive controllers that permit both Apple Macintosh and IBM PC diskettes to be read have been available for some time. "Central Point Software, Inc."of Beaverton, Oreg. has long been marketing a hardware adapter board for IBM compatible computers called the "Option Board" (and after 1988, the "Deluxe Option Board") that allows IBM compatible computers to read Apple Macintosh diskettes. There are other, similar diskette drive adapter manufacturers. In a somewhat similar fashion, Apple Macintoshes may also read IBM/DOS diskettes. Thus, the production of a device emulation controller module 16a which would enable the tablet 1 to read diskettes from a variety of different platforms, as shown by way of example in FIGS. 18(*a*) and (*b*), would be well within the purview of the skilled artisan.

The file interpreter module 16b performs the function of converting data from various source formats into the screen control codes used to generate displayable images on the image display screen 6a of the tablet 1. Electronic format data files are generally comprised of two components. First, there is the raw data itself. Second, there is the set of formatting instructions that describe how the raw data is to be made use of. Accessing a data storage medium, such as a magnetic diskette, is only half of the requirement for being able to print native format files saved on native storage media. Interpreting, or translating, the accessed native format file is the other half.

As a familiar example, consider a word processor data file. The file may be composed of the words that constitute the document. The file may also be composed of the formatting commands, or control codes, that describe how the words are to be arranged on each page of the document, how typefaces should appear and in what sizes, whether some words are underlined, and so forth. Similar concepts apply to other types of data files, whether they originate from spread sheet programs, data base managers, paint or draw programs, etc.

The file interpreter module 16b provides the means to make sense of the data files. That is, the file interpreter module 16b provides the means to apply the formatting rules of different software applications programs to the raw data contained in the data files created by such applications. The result of this action is the creation, in screen displayable form, of information formatted as it was intended to appear by the original author of the data file. The displayed information may subsequently be copied by a copier in accordance with the general principles of the present invention, as previously described.

FIGS. 19(*a*) through 19(*g*) illustrate an example of the process that might be involved in creating a hard copy of a disk file using a tablet in accordance with the present invention. The illustrated process is extremely simple, and may be performed by people with non-technical backgrounds, including people who do not know how to use a computer.

FIGS. 19(*a*) through 19(*g*) illustrate the images that might appear on the operator's console screen 100 to guide a user in obtaining a printout P. The operator's console screen 100 depicted in FIGS. 19(*a*)–19(*g*) is a touch sensitive screen, similar to screens used in some automatic teller machines. The images displayed on the operator's console screen 100 lead the user through the process of selecting and printing files selected from a disk 18a inserted into the data storage device module 17a of the tablet 1.

The process begins with the insertion of a disk, such as an IBM/DOS format floppy disk, into a data storage device module 17a (see, for example, FIG. 18(*a*)). Then, as shown in FIG. 19(*a*), the operator's console screen 100 presents a listing 210 of the files detected on the inserted disk. Platform identification information 212 may also appear at the top of the operator's console screen 100.

As shown in FIG. 19(*b*), the user may select the files to be printed by touching the touch sensitive operator's console screen 100. The selected files appear in highlight boxes 215. To de-select a chosen file, the user might simply touch the selection again. The selection would then toggle off. When the user has completed making selections, the "Done" screen-button 214 may be pressed. If the user is unsure about the procedure, or requires assistance, a "HELP" screen button 247 may be provided.

As shown in FIG. 19(*c*), a list of the selected files 217 may then be displayed, together with a list of applications software origins 219. The user may then indicate what software package was utilized to create the selected files, with the designated software origins being indicated in the form of numerals 222 alongside each selected file (see FIG. 19(*a*)). As illustrated in FIG. 19(*d*), for example, the files "Organic3.LEC" and "Organic2.LE" represent files created using WordPerfect software. The origin number of these files would therefore be "6. WordPerfect". The file "Organic1.LEC" represents a file created using "Ventura Publisher" software. The origin number of this file would therefore be "8. Ventura Publisher". When the user has completed indicating what software package was utilized to create the selected files, the "Done" screen-button 214 may be pressed. (To return to a previous screen menu, the user may press the "Go Back" screen button 249.)

As shown in FIG. 19(*e*), a variety of print options 224 may then be presented as electives. These include, for example: multiple copies, a feature called "pseudo-collation" (described later in connection with FIG. 23), separator sheets, title sheets, print halt options, printer adjustment options, etc.

As shown in FIG. 19(*f*), the user may be presented with a print pre-commencement advisory screen 225. The advisory screen informs the user of the total number of pages that will be generated, so that the copier may be adjusted accordingly. As shown in FIG. 19(*f*), for example, the total page count is indicated as being 87. This page count includes all page-consuming special features, such as separator sheets. As indicated in the advisory screen 225, printing may be initiated by depressing a copy start button on the copier.

Figure 19A:
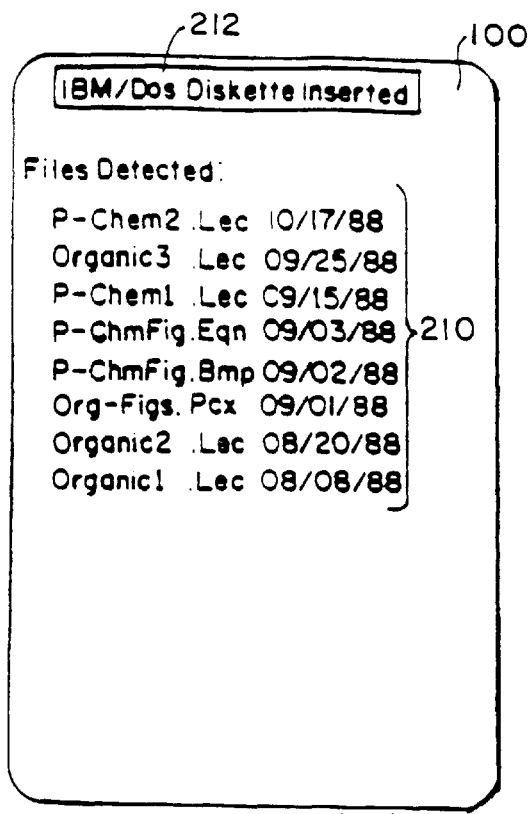
Figure 19B:
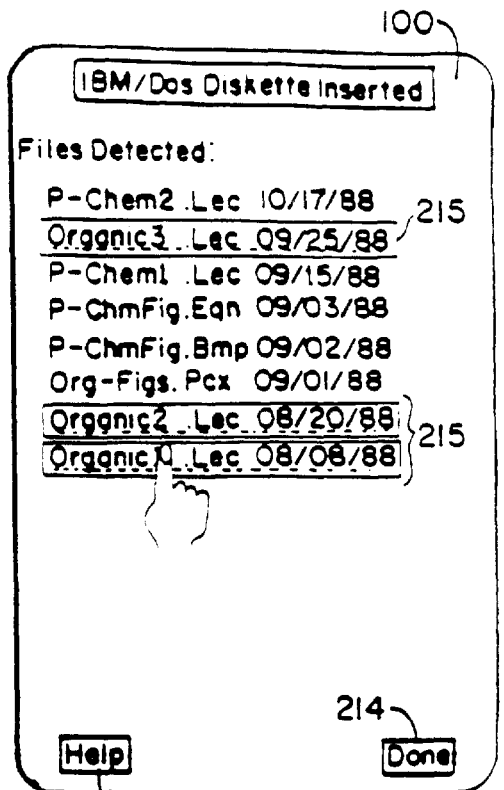
Figure 19C:
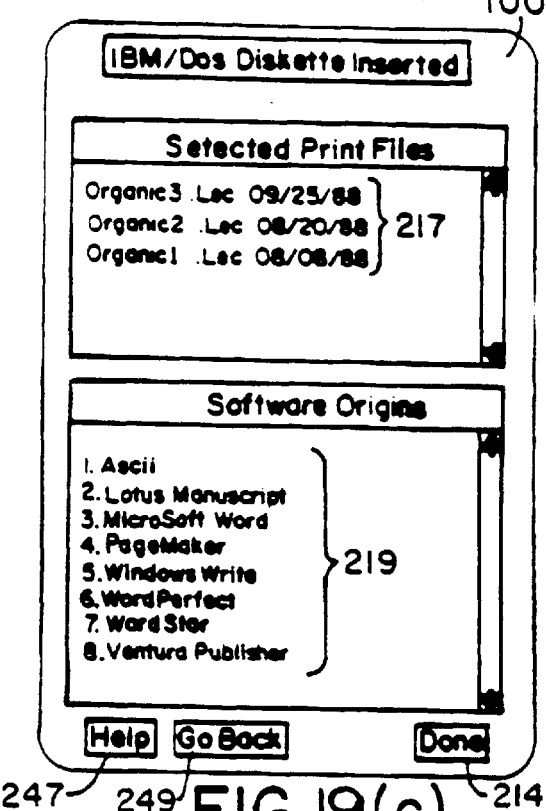
Figure 19D:
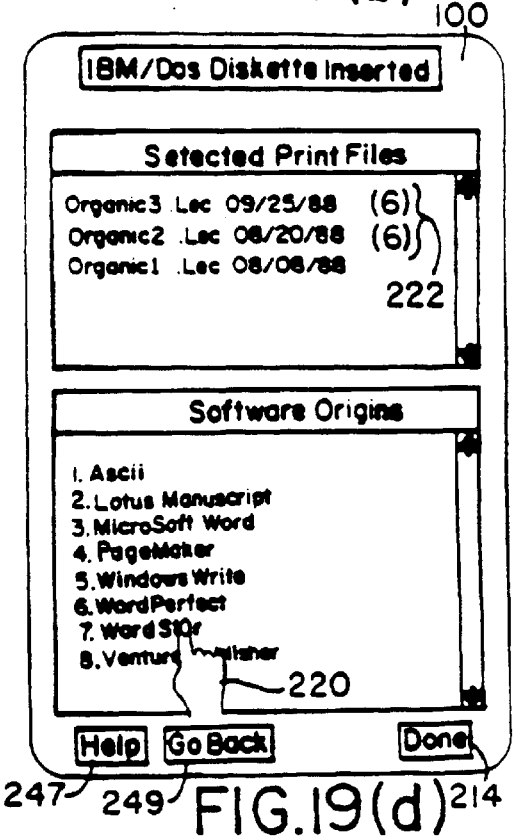
Figure 19E:
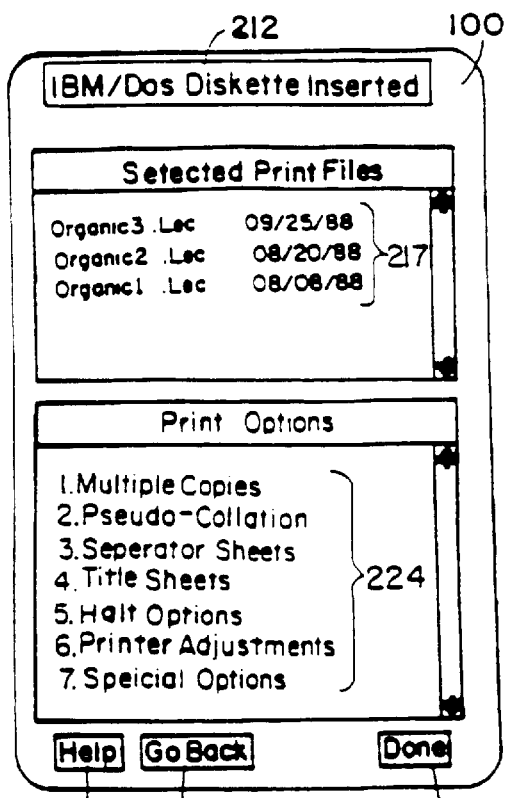
Figure 19F:
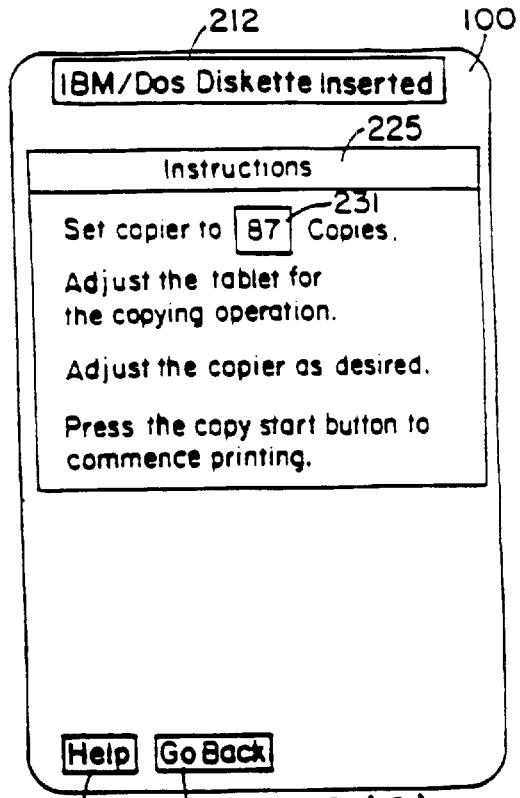
Figure 19G:
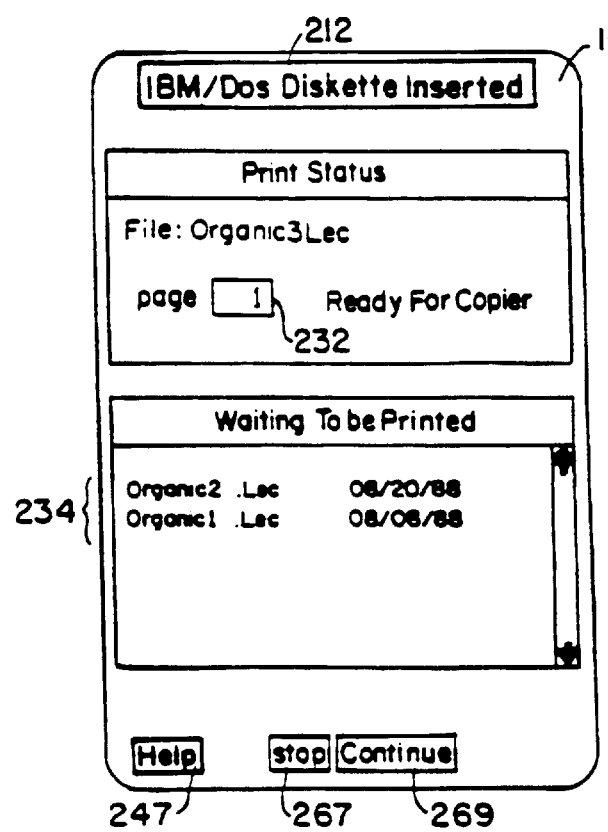

As shown in FIG. 19(g), the user may monitor print status during the printing process. The "page number box" 232 displays the page currently being displayed on the image-forming screen of the tablet. This allows the user to know the status of the print job while the print job is taking place. To suspend the printing process, the copy cycle may be interrupted at the copier. Since, in a preferred embodiment, the tablet follows the copier by "watching out" for copy execution via sensors, halting the copier will also place the tablet into suspended operation. Alternatively, a "Stop" screen button 267 may be provided to suspend printing. Resumption of printing may be initiated by depressing a "Continue" screen button 269. FIG. 19(g) also shows a listing of files remaining in the print queue 234.

FIGS. 20(a)–(c) illustrate an example of the versatility afforded by an embodiment of the present invention. FIG. 20(a) shows a diskette 18a that may be inserted into a data storage device module 17a of a tablet 1. The diskette contains a word processor document that was created on an IBM/DOS machine. The hard copy output P1 and P2 produced by the copier 4 comprises text material.

As shown in FIG. 20(b), another diskette 18b may subsequently be inserted into the same data storage device module 17a of the tablet 1. The second diskette 18b may contain drawings that were made on another computer platform, such as an Apple Macintosh, using a program such as "Beaker", which is not available to an IBM/DOS platform. The hard copy output P3 and P4 produced by the copier 4 comprises molecular diagrams.

As shown in FIG. 20(c), an ordinary textbook 73 may be copied (printed) alongside any of the above-mentioned electronic format information. The hard copy output P5 and P6 produced by the copier 4 comprises pages copied directly from the textbook 73.

All of the above printing of hard copies P1–P6 may be accomplished at the same physical site, using the same equipment, and in a "continuous flow" that is both intuitive and user-friendly. Moreover, the present invention brings these capabilities to ordinary users because all of the required equipment is relatively affordable. The copier 4 may be a low-cost "personal copier". Still further, the present invention provides room for growth, as more expensive, higher performance copying equipment can be substituted at a future time. The present invention is therefore highly adaptable to one's needs and resources.

FIG. 21 illustrates an example of the use of a tablet 1 in printing digital photographs taken by an electronic still camera 110. The illustrated electronic still camera 110 may store pictures on 2-inch video floppy disks 18V in a standard format defined by the "Electronic Still Camera Standardization Committee". The data storage device module 17V may comprise a video floppy disk reader installed in the tablet 1 to enable video floppy disks 18V to be read and printed. The hard copy output P7 comprises a paper print specimen of a photograph taken by the camera 110. The ability to create rapid photographic proofs in this manner may be desirable to organizations such as news bureaus.

FIG. 22 illustrates an example of the incorporation of a compatibility assurance card reader 130 into the tablet 1. One purpose of a compatibility assurance card 120 is to insure that the tablet 1 may be used to print files created by various software packages. Another purpose is to accommodate changes in data storage formats by software manufacturers.

The compatibility assurance card 120 may comprise a credit-card sized element provided by software manufacturers to licensed owners of their products. For example, the manufacturer of a word processing software package might include a compatibility assurance card 120 in the package. The compatibility assurance card 120 may contain information on the data storage convention utilized by the latest release of the software. Each of the formatting and control characters used by the software program when writing data to disk files would be available on the card 120. By inserting the card 120 into the card reader 130, the tablet 1 may download the storage convention information from the card into the memory of the tablet 1. This information may then be used in place of, or as a supplement to, the information contained in an installed file interpreter module 16b.

A person who, for instance, utilizes a plurality of software packages in the course of conducting business might be provided with a plurality of compatibility assurance cards. In this fashion, such an individual would be assured of being able to print out data at suitably equipped copiers at field locations, at libraries, post offices, drug stores, etc. It is anticipated that most people would require three or fewer compatibility assurance cards: for example, one for a word processor, one for a spread sheet program, and one for a data base manager.

Compatibility assurance cards 120 may comprise plastic cards similar to credit cards, having a magnetic recording layer in which information such as symbol tables for data file translation may be retained. Compatibility assurance cards 120 may also comprise "smart cards", optical memory cards, or any other type of medium that is cost effective and that is capable of holding the required format translation instructions.

FIG. 23 illustrates an example of a feature referred to as "Pseudo-Collation". "Pseudo-Collation" is a technique that permits low-end copiers that are not equipped with collating capability to simulate the benefits of collation. When a tablet in accordance with the present invention is used to print multiple copies of a single document, the tablet may handle the task as follows: the first document page is displayed and printed, the second document page is displayed and printed, the third document page is displayed and printed, and so on until the final document page is displayed and printed. The routine is then repeated a number of times, depending upon the number of copies desired.

Between displaying the final document page of one copy set and the first document page of the next copy set, a separator page may be displayed to the copier by the tablet. In FIG. 23, for example, the separator pages are illustrated as pages 167a, 167b and 167c. Also shown in FIG. 23 is a page Px preceding the separator page 167a and a page Px between the separator pages 167a and 167b. The pages Px denote complete document copy sets. In the illustrated example the borders of the separator pages 167a–167c are darkened. When a stack of printed pages Pm is fanned, the dark borders of the separator pages 167a and 167b facilitate location of the document copy sets preceding and following the separator pages. This allows low-end, non-collating copiers to produce multiple copy sets of documents in a fashion that approximates true collation.

II. EXAMPLES OF SOME TECHNICAL CONSIDERATIONS

Option Modules, which provide device emulation means, supply a mechanism by which users may customize, expand, upgrade, and modify a tablet in accordance with the present invention. For example, a print spooler might be installed to more effectively handle large volume print needs. Option Modules further provide the capability to directly access native format data files on the original medium of the devices that created them. Option Modules enable printout to be obtained using only a copier and a diskette (for example) containing data to be printed. A connection to a computer becomes unnecessary. Using a native format file reader as an illustrative example, examples of some Option Module implementations are discussed below.

FIG. 24 illustrates an example of a hardware configuration in one embodiment of the present invention. In the illustrated embodiment, all of the components comprise part of the tablet, with the exception of the device emulation controller module 16a, the file interpreter module 16b, and the data storage device module 17, all of which are Option Modules.

In the illustrated example, the device emulation controller module 16a comprises a "multi-media" controller capable of controlling more than one type of storage device. The device emulation controller module 16a may, for instance, be capable of controlling an Apple Macintosh 3.5" diskette drive as well as an IBM/DOS format 3.5" diskette drive. The method of accomplishing this is known in the art. Several computer peripheral manufacturers have long been marketing products that enable a single 3.5" diskette drive to read and write in the storage format of more than a single computer platform. Examples of such manufacturers are numerous, but include Central Point Software of Beaverton, Oreg., and Apple Computer, Inc. of Cupertino, Calif. (for use by Apple). The device emulation controller module 16a is connected to the storage device module 17, and is also connected via the I/O bus 385 to the tablet 1.

The file interpreter module 16b contains a native format file interpreter. The file interpreter module 16b is also plugged into the I/O bus 385 by virtue of being installed into the module receiving bay 15. The file interpreter module 16b performs the function of converting native format files into screen displayable form. The file interpreter module 16b may comprise a ROM. The ROM may include translation tables and interpreter instructions for translating data, appearing in the native format of various applications software packages, into a single target format. The target format will ordinarily be the screen control codes 305 used by the video controller 350 to generate images on the image display screen 6a of the tablet 1.

As appreciated by persons skilled in the art, the screen control codes 305 may comprise a graphics language, such as PostScript. (The screen control codes 305 may also comprise a bitmap, rather than a true language.) If the screen control language is PostScript, then translation may not even be required in some instances, since certain software programs permit data to be saved in this format as an output option. Techniques for translating data from one storage format into another are known in the art. Many software applications packages provide what are referred to as "Import" and "Export" facilities. These facilities are essentially software translators. Additionally, there are several software manufacturers that specifically market format conversion programs. Examples of such manufacturers are Inset Systems, which produces "HiJaak", and SCC, which produces "Software Bridge". The methods of data format conversion are therefore well established in the art.

Returning to FIG. 24, a secondary processor 376 is shown having access to both the I/O bus 385 and the common bus 383. As is standard practice when a single processor has dual bus access, buffers 353 are provided to enable bus selection. The buffers 353 are similarly present for the primary processor 375, which communicates with both the common bus 383 as well as primary bus 381. A memory block 364 is present on the I/O bus 385. A subset of the memory block 364 is reserved for non-volatile memory 365. When a storage medium, such as a diskette, is placed into the data storage device module 17, the device emulation controller module 16a, under the control of the secondary processor 376, may read data from the medium. The acquired data may be placed into the memory 364. Using format translation rules provided by the file interpreter module 16b, the processor 376 may translate the native format data read from the diskette into the screen control codes (language) used by the video controller 350. The translated screen control codes may be placed into the memory 362 by the secondary processor 376. The primary processor 375 moves the translated screen control codes from the memory 362 into the local memory 360. The video controller 350 is able to access the screen codes from the memory 360 in order to generate images 60 on the image display screen 6a. While the primary processor 375 is moving data from the common memory 362 to the system memory 360, the secondary processor 376 may continue retrieving and translating additional native format data from the data storage device module 17.

Also shown in FIG. 24 is a ROM unit 367, which contains instruction code for controlling basic system operation. An EPROM may be substituted for the ROM unit 367 in some embodiments, so that new system code can be incorporated into the tablet simply by downloading the new code from a diskette into the EPROM. A non-volatile memory block 365 may be used to retain translation instructions which are supplemental to the instructions found in the file interpreter module 16b. The supplemental instructions may be downloaded from data storage media such as diskettes, which may also be accessed using the data storage device module 17. The memory units (e.g. 362, 364, 365) may be used as shadow RAM for instruction code or translation code saved in ROM (e.g. 367, the file interpreter module 16b). This may offer an improvement in overall performance of the tablet.

FIG. 25 illustrates an example of the application of MicroChannel Bus architecture by the tablet so that multiple masters can be effectively supported. In this configuration either Option Module 1 or Option Module 2 can take control of the overall system from the default system 390 (master). Either Option Module 1 or Option Module 2 can control the function of the tablet. For example, an option module might be installed to operate the tablet as a "printer" that serves a computer network. In the illustrated example, Option Module 1 corresponds to the device emulation controller module 16a and Option Module 2 corresponds to the file interpreter module 16b. However, the present invention does not require that the Option Modules correspond identically to either the device emulation controller 16a or the file interpreter 16b.

FIG. 26 illustrates an example of a process for obtaining hard copy with a tablet from data created by a software package, that is saved on a medium such as a diskette. In FIG. 26, element 301 represents a storage medium, such as a diskette, that contains a file that was created by an applications program. The data is in the "native" format of the applications program that created it. As used herein, the term "native" means the format customarily employed by the program for the storage of information.

Step 302 denotes the process of accessing a file on the native storage medium. This involves reading the storage medium (which may be, for example, a floppy diskette). Step 302 is accomplished by having a storage device controller, appropriate for the storage format of interest, control the storage device so as to be able to access the storage medium. For example, step 302 might entail employing hardware similar to an IBM/DOS floppy diskette drive "adapter" to control a 3.5" diskette drive, so that data stored on a 3.5" IBM/DOS format diskette may be read. The diskette drive "adapter" of this example may be included in the device emulation controller module 16*a*, and the 3.5" diskette drive may be furnished by the data storage device module 17. As mentioned earlier, the device controller module 16*a* may be a "multi-media" storage device controller capable of providing access to the storage media of more than one type of computer platform. Multi-media controllers are familiar in the art, and the manner of their application and construction would be known to skilled artisans.

In FIG. 26, element 303 represents data that has been read into the memory of the tablet. After being read into the tablet, the data may optionally be placed into another storage medium such as, for example, a fixed disk drive connected to the tablet. The data 303 is still in its native format. That is, for example, if the data 303 started out as a WordPerfect document file, it is still in WordPerfect file format.

Step 304 represents the step of translating the native format data into a form that can be displayed on the image forming screen of the tablet. The element 305 represents the screen control codes that the native format data is translated into in step 304. The screen control codes 305 may comprise the instructions of a display language, such as PostScript. The screen control codes 305 may also comprise the bitmap of the image that is to be displayed. In the latter case the screen control codes would not constitute a true language. The screen control codes 305 may also comprise the linguistic elements of numerous other techniques currently available for representing graphical information on display devices, including novel display languages fashioned specifically for use by the tablet.

The process of translating native format data into the screen control codes, or language, used by the tablet, would depend on the choice of screen language adapted by the particular embodiment of the tablet. The principles behind translation, however, are well known to software engineers. "Import" and "Export" functions provided by many software packages perform translation between different file formats. For example, users of Microsoft Word may "Import" documents created by WordPerfect, and edit them using Microsoft Word instead. Similarly, most graphics programs can read and write "BMP", "PCX", and "TIFF" file formats, regardless of the native format of the program itself. In addition to the "Impor" and "Export" features built into most applications programs, are the software packages that specifically provide the service of format conversion. Examples are "HiJaak" by Inset Systems, and "Software Bridge" by SCC. The principles governing format conversion are thus familiar in the art.

Step 306 of FIG. 26 represents the step of image generation by the video hardware 350 of the tablet. An image 60 is displayed on the image display screen of the tablet. The process by which an image may be generated from data and displayed by video hardware is ubiquitously well known. The graphics adapters of all computers perform this function.

FIGS. 27 and 28 illustrate examples of alternate methods of getting data created by an applications program into the tablet. As illustrated in FIG. 27, a program 410 is run by a computer 408. As a result of running the program 410 on the computer 408, data 412 is created. The step 409 denotes the act of sending data to a printer 415, by way of executing a print command from within the program 410. The data 412, however, does not reach the printer 415, because it is intercepted by a TSR (Terminate but Stay Resident) Program 414*a*. The TSR program 414*a* redirects the print stream to a storage medium, such as a floppy diskette 401*a*. The data file recorded on the storage medium 401*a* may contain printer control language data, since the data stream was originally intended for a printer. The step 302 involves accessing the storage medium 401*a*, as in FIG. 26. When the storage medium 401*a* is read, the printer control codes are read into the memory of the tablet. The element 405 represents printer control codes in the RAM of the tablet. The step 304 involves translation of the printer control codes into the screen control codes 305. As in FIG. 26 screen image generation 306 causes the data to be displayed as an image 60 on the image display screen of the tablet.

FIG. 28 shows another technique for getting data into the tablet. As in FIG. 27, a computer 408 is shown running an applications program 410 (for instance, a spread sheet program) which generates data 412. The user executes a print command from within the program 410 to send the data to a printer 415. Step 409 represents the act of sending data to a printer from within the applications program. Instead of going to the printer 415, the data stream is translated by the computer 408 into the screen control codes 305 of the tablet 1 and then written to a storage medium. The element 401*b* represents a storage medium, such as a diskette, containing screen control codes representative of the data that was queued for printing. The element 414*b* represents a driver that emulates a printer driver, installed on the computer platform 408. Prior to executing the print command, the user selects from the printer setup menu of the applications program 410, "Copier Printer" as the print device. The driver 414*b* is then invoked when the print command is issued from the applications program 410. Rather than sending a stream of printer control language codes to the printer 415, the driver 414*b* writes screen control codes 305 to a storage medium, such as a magnetic diskette. Step 418 represents writing captured data to a storage medium such as a diskette.

Drivers are commonly used by software. For example, on an IBM/DOS platform running Microsoft "Windows", most applications programs have setup menus that permit the selection of any printers or devices that might be installed. By selecting a device from such a menu, a driver for controlling the selected device is selected behind the scene. When a print command is executed from within an application, the driver communicates the device control codes that operates the device. In the present case, a driver may be employed that emulates a printer driver and that sends screen control codes to a storage medium, such as a diskette, instead of sending printer control codes to a printer.

After the screen control codes have been placed onto a diskette, as in element 401*b* in FIG. 28, the information may be accessed by reading the diskette, as in step 302. Reading the diskette places the screen control codes 305 into the tablet RAM. Step 306 involves generating an image, using the data, onto the image display screen of the tablet 1. Element 60 in FIG. 28 represents the displayed image.

FIG. 29 illustrates an example of how the device controller module 16*a* and the file interpreter module 16*b* of the tablet 1 might be "borrowed" by a conventional printer. A printer interface adapter 201 is used to provide a means for the conventional printers 415*a* and 415*b* to acquire some of the functionality afforded by the option modules 16*a* and 16*b*. The printer interface adapter 201 is supplied with option module receiving means 155, which are analogous to the module receiving bays 15 found on tablet 1. In FIG. 29, the interface unit 201 is not furnished with storage device receiving means comparable to 177 of tablet 1. Instead, one 3.5" diskette drive 197 and one 5.25" diskette drive 198 are provided in a fixed mount. The dual format disk drives 197 and 198 may be of the 42 mm twin mount variety, to conserve space. An operator's console 191 may be found on the top of the unit 201. The operator's console 191 has similar characteristics to the operator's console 100 of tablet 1. The interface unit 201 is connected to a printer 415 by an electrical cable 411.

The device controller module 16a may supply the means to control diskette drives 197 and 198. The file interpreter module 16b may supply data interpretation means, so that the data files read by the disk drives 197 and 198 may be printed by the printers 415a and 415b. Because the file interpreter module 16b contains instructions for generating the screen control codes 305 of the tablet 1, a second level of translation may be required in order to properly control the printers 415a and 415b. The instructions for translating screen control codes into, for instance, HP-PCL (a printer control language) may be supplied by a user-installable ROM which may be installed at the outset, when the interface unit 201 is first attached to the printer 415b. Alternate embodiments of the file interpreter module 16b may, however, be equipped with "extended" interpretation capabilities that include instructions for translating native format data into either screen control codes, or printer control codes. When the screen control codes are comprised of a language such as Postscript, for example, and the printer control language is also Postscript, translation naturally would not be required. As would be recognized by persons skilled in the art, the principles of operation and construction of the interface unit 201 would be similar to the concepts presented above.

FIGS. 30 through 32 illustrate an embodiment of a portable computer constructed specifically to permit data to be "printed" by using its display screen with a copier. As shown in FIGS. 30(a) and 30(c), the portable computer 535 comprises a base unit 535B and a detachable screen unit 535S having a display 56A. Around the perimeter of the display element 56A is a light gasket 502 for keeping ambient light from leaking in between the display 56A and the copier window 5. The light gasket 502 may comprise any suitable, flexible material (e.g. rubber). At the corners of the display element 56A are a set of sensors 10 for detecting copy execution. A set of LED's 517 in the form of arrows point towards the screen unit 535S. Whenever print data is being diverted to the screen unit 535S, the LED's 517 blink to indicate that a data stream is being captured by the screen unit.

A spring-loaded switch 518 may be slid to the left or to the right of a detente, center position (see FIG. 30(b)). The "normal" setting 521 of the switch 518 allows data queued for printout by the computer 535 to be routed to the parallel or serial ports of the computer. In the "normal" setting 521, the execution of a print command from within an applications program would cause the data stream intended for printout to be sent to whichever output port or device has been selected in software. This is similar to what conventionally occurs when a print command is executed on an ordinary computer. The switch position 523, located to the right of the center, detente position, and having a small copier icon associated with it, causes a data stream queued for printout to be diverted to the screen unit 535S.

FIG. 31 illustrates an example of the data capture process of the portable computer 535. As shown, the portable computer 535 comprises a base unit 535B and a screen unit 535S. The arrows 513 indicate that the screen unit 535S may be detached from the base unit 535B. The base unit 535B includes a system unit 503 for running applications software 410. The software program 410 creates the data 412. In screen capture mode, whenever the computer operator executes a print command from within applications program 410 to send the data 412 to the "outside world" 357 (e.g. via Lpt 1 or 2), the data stream is instead intercepted by a software daemon 514 and sent to a capture unit 555 in the screen unit 535S. "Daemons" are a member of a larger class of RAM resident software processes that "transparently" perform specific tasks in the background. Daemons and TSR's (Terminate but Stay Resident programs) may be invoked by "Hot-Key" sequences, interrupts, or by conditions that may arise during the course of normal system operation. The entire length of object code required to perform the task for which the daemon is responsible need not be RAM resident. Rather, there may be a smaller portion of the complete code which, when activated, would load the remainder of the code which would subsequently perform the function. These concepts are familiar to software engineers. An example of a TSR (or daemon) might be a program that handles facsimile reception on a computer. When the facsimile hardware detects a call on its phone line, the TSR (or daemon) is invoked to service the incoming fax transmission. In the present case, the daemon 514 is invoked by the execution of a print command, or by an attempt to place data onto a serial or parallel port of the computer 535. The data stream that is queued for output via the serial or parallel port is instead sent to a capture unit, identified as 555 in FIG. 31. The capture unit 555 is described further in connection with FIG. 32. Data sent to the memory 560 of the capture unit 555 may be in a number of different possible formats. It is possible to construct the daemon 514 to write the actual screen control codes 305 used by the video adapter into the memory 560. For instance, the daemon 514 may include a software driver that emulates a printer driver, but which is used to generate screen control codes instead of printer control codes. This is similar to a technique used by some computer facsimile programs to capture a print stream and to transmit it as a fax document, rather than to an actual printer. The Fax TSR of such devices includes a driver that writes the print data as transmission-ready fax data, rather than as a stream of printer control codes used to drive a printer. In the present case, where screen control codes are placed into the memory 560 of the screen unit 535S, the capture unit 555 would not have to perform further translation on the data before it may be interpreted by the video hardware. The capture unit may, in such instances, merely comprise the memory 560. In contrast, in some embodiments it may be preferable to have the daemon 514 place into the memory 560 print stream data in an intermediate format. For example, it may be desirable to perform compression on the data before it is placed into the memory unit 560. The purpose of writing compressed, intermediate format data into the screen unit memory may be to permit lengthier documents to be loaded into the detachable screen unit 535S. This intermediate format data would then need to be converted into usable screen control codes by the capture unit. Also shown in FIG. 31 are a video adapter 550 and a display screen 56A of the computer 535. The video adapter 550 uses the screen control codes 305 to generate displayable images on the display 56A.

FIG. 32 illustrates an embodiment of the computer 535 in which the capture unit 555 includes logic for converting intermediate format capture data into usable screen control codes. Such may be the case where the daemon print stream diverter 514 does not write usable screen control codes into the memory 560. The top of FIG. 32 illustrates the system unit 503 and some peripheral devices with which it may communicate. The peripheral devices include a storage device 517, such as a fixed disk drive, and a compatibility assurance card reader 130 (an example of which is described above in connection with FIG. 22). Also included is an I/O Processor 138, which acts as an intermediary between the peripheral devices 130 and 517 and the rest of the system. The capture unit 555 is illustrated as being within the detachable screen unit 535S. In the illustrated configuration, the capture unit 555 includes a microprocessor 576, a ROM 516, and a memory block 560. The applications software 410 shown in FIG. 31 may, in fact, be run by the system unit microprocessor 575. Moreover, the software daemon 514 may also be run by microprocessor 575. When daemon 514 re-directs print data to the capture unit 555, it is actually causing the microprocessor 575 to place the data into the memory unit 560. Using the instructions contained in the ROM 516, the capture unit processor 576 translates the captured data, that was earlier placed into the memory 560, into the usable screen control codes 305. Also present in FIG. 32 is a block of non-volatile memory 565. The non-volatile memory 565 may be used to retain supplements to the instructions stored in the ROM unit 516. Supplemental or update information may be introduced into the non-volatile memory 565 from a diskette, or it may come from a compatibility assurance card. In the latter case, the compatibility assurance card would be inserted into, and read by, the CAC reader 130.

The present invention enables detection of the amount of misalignment between a tablet and a copier window. The present invention further enables the use of image reorientation techniques, so that an image displayed by a tablet may be reoriented and printed by a copier as if the tablet and the copier window were in alignment, even if the tablet is initially misaligned relative to the copier window. Examples of systems for optimizing the orientation of a hard copy image generated by a tablet are discussed in greater detail below in connection with FIGS. 33 through 38.

FIG. 33 illustrates an example of a system for optimizing the angular orientation of a hard copy image generated by an image display screen of a tablet. FIG. 33 shows, in schematic form, the image display screen 6 of a tablet 1 in position on top of a copier window 5. The relative position of the image display screen 6 and the copier window 5 may be different each time the tablet 1 is placed on the copier window 5. Consequently, the image displayed by the tablet 1 may occasionally be skewed or misaligned relative to the copier window 5.

As shown in FIG. 33, the tablet 1 defines a rectangle. Each of the four corners of the rectangle may be provided with a corresponding light detecting sensor S. Each one of the four sensors S may provide information to the tablet's microprocessor.

As further shown in FIG. 33, the angle of skew or misalignment between the tablet 1 and the copier window 5 may be designated by $\ddot{y}$. If there is virtually no misalignment between the tablet 1 and the copier window 5, then $\ddot{y}$ is approximately equal to zero.

In the embodiment illustrated in FIG. 33, the light source of the copier scans across the copier window 5 in an upward direction, from the bottom of the page towards the top of the page (as shown by the upward pointing arrows $t_1$, $t_2$ and $t_3$). Consequently, each of the four sensors S is first exposed to light from the copier light source at a different point in time. As shown in FIG. 33, for example, light from the copier light source will expose sensor $S_0$ first, sensor $S_1$ second, sensor $S_2$ third and sensor $S_3$ fourth. The time intervals between exposure of the different sensors S will be determined by the length L, width W and angular orientation of the tablet 1.

The time at which the first sensor $S_0$ is exposed to the copier 4 light source may be represented by $t_0$. The elapsed time between exposure of the first sensor $S_0$ and exposure of the second sensor $S_1$ may be represented by $t_1$. Similarly, the elapsed time between exposure of the first sensor $S_0$ and the third sensor $S_2$ may be represented by $t_2$, and the elapsed time between exposure of the first sensor $S_0$ and the fourth sensor $S_3$ may be represented by $t_3$.

The width W and length L of the tablet 1 are known constants that may be stored in the tablet's microprocessor. The angle $\ddot{y}$ between the actual angular position of the image and the desired angular position of the image may be calculated by the microprocessor, based upon the information received from the sensors S, in accordance with the following formula:

$$\ddot{y} = \operatorname{Tan}^{-1}(L/W)^*(t_1/(t_3-t_1))$$

The microprocessor thus uses the information received from the sensors S to electronically calculate the angle $\ddot{y}$. Once $\ddot{y}$ has been determined, the tablet 1 may be physically rotated by the calculated angle $\ddot{y}$ to thereby move the image to the desired angular orientation. Alternatively, the microprocessor may use the information received from the sensors S to electronically rotate the image by an angle $\ddot{y}$, from the image's present angular orientation to the image's desired angular orientation. Any number of known techniques may be used to electronically rotate the image by the calculated angle $\ddot{y}$.

FIG. 34 illustrates an example of an operator's console screen 100 that may be provided on the back of the tablet 1 to visually illustrate the calculated angle $\ddot{y}$. The unbroken cross bars in FIG. 34 depict the image's desired angular orientation. The broken cross bars depict the image's present angular orientation. The angle between the unbroken and broken cross bars corresponds to the skew angle $\ddot{y}$.

FIG. 35 illustrates an example of an alternative display in which $\ddot{y}$ is depicted as an arc of a circle.

FIG. 36 illustrates an example of a system for optimizing the rectilinear orientation of a hard copy image generated by an image display screen of a tablet. The illustrated system enables the user to define one or more points on the printed page, and then move the image and/or tablet relative to the copier window so that the rectilinear orientation of the image may be optimized.

As shown in FIG. 36(*a*), four buttons B may be provided on the back of the tablet 1. Each one of the four buttons B is associated with a corresponding one of the four edges of the tablet 1. The buttons B provide data input to the tablet's microprocessor. Depressing any one of the buttons B will cause the tablet 1 to produce an image of a dot D on the image display screen. The dot image will be located on the edge of the image display screen, at a position substantially corresponding to the location of the depressed button B. The hard copy output P of the copier will then include a printed dot D at a location on the page P corresponding to the depressed button B, as illustrated in FIG. 36(*b*). Optionally, each button B on the back of the tablet 1 may include a small LED or other light generating device, so that the button B is illuminated after it is depressed.

If the image is optimally aligned, then the dot D printed on the hard copy output P will appear substantially adjacent the edge of the printed page (see FIG. 36(c)). The degree to which the printed dot D is spaced from the edge of the printed page P indicates the degree to which the image must be shifted to correct the rectilinear alignment of the image (see FIG. 36(b)).

Once the distance of the dot D from the edge of the page P has been determined, the tablet 1 may be physically shifted by the indicated distance to thereby move the image to the desired rectilinear orientation (see FIG. 36(d)). Alternatively, the image may be shifted electronically from the image's present rectilinear orientation to the image's desired rectilinear orientation. Any number of known techniques may be used to electronically shift the image by the required distance.

FIG. 37 illustrates an example of an alternative system for optimizing the rectilinear orientation of the image on the printed page. As shown in FIG. 37, the back of the tablet 1 defines a rectangular frame configured to receive a printed page P from a copier. The rectangular frame defines four edges. Each of the four edges is provided with a corresponding electronic touch sensitive strip ST. The touch sensitive strips TS provide information to the tablet's microprocessor.

In the example shown in FIG. 37, the strip $TS_1$ illustrated on the left hand edge of the frame is designated as a "FROM" strip. The strip $TS_2$ illustrated on the right hand edge of the frame is designated as a "TO" strip. Similarly, the strip $TS_3$ illustrated on the lower edge of the frame is designated as a "FROM" strip , while the strip $TS_4$ illustrated on the upper edge of the frame is designated as a "TO" strip.

In operation, a printed page P from a copier is first placed into the frame on the back of the tablet 1. In the example illustrated in FIG. 37, the printed page P contains several lines of printed text. If the user wishes to shift the image upward, as shown in FIG. 37, then the user first touches a point on the left hand "FROM" strip $TS_1$ corresponding to the actual location of the first line of text on the printed page P. This sends an electronic signal to the microprocessor indicating the present position of the printed image. Next, the user touches a point on the right hand "TO" strip $TS_2$ corresponding to the desired location of the first line of text on the printed page P. This sends an electronic signal to the microprocessor indicating the desired position of the printed image. The microprocessor than uses the information received from the "FROM" and "TO" strips to electronically shift the image upward, from the image's present orientation (as indicated by the "FROM" strip signal) to the image's desired orientation (as indicated by the "TO" strip signal). Pages that are subsequently printed by the copier will provide images that are shifted upward by the indicated amount.

In a similar manner, the top and bottom edge strips may be used to reorient the printed image horizontally. If, for example, the user wishes to shift the image rightward, as shown in FIG. 37, then the user first touches a point on the lower edge "FROM" strip $TS_3$ corresponding to the actual location of the text on the printed page P. Next, the user touches a point on the upper edge "TO" strip $TS_4$ corresponding to the desired location of the text on the printed page P. The microprocessor than uses the information received from the "FROM" and "TO" strips to electronically shift the image rightward, from the image's present orientation (as indicated by the "FROM" strip signal) to the image's desired orientation (as indicated by the "TO" strip signal). Pages that are subsequently printed by the copier will provide images that are shifted rightward by the indicated amount.

It should be appreciated that either strip of the pair of strips parallel to the length of the tablet, or of the pair of strips parallel to the width of the tablet, may serve as a "FROM" strip or as a "TO" strip. The designation of "FROM" or "TO" is relative to which strip of the pair is touched first.

FIG. 38 illustrates an example of an alternative system for optimizing the angular orientation of the image on the printed page P. The system for optimizing angular orientation shown in FIG. 38 is essentially similar to the system for optimizing rectilinear orientation shown in FIG. 37.

As shown in FIG. 38, the back of the tablet 1 defines a rectangular frame configured to receive a printed page P from a copier. The rectangular frame defines four edges. Each of the four edges is provided with a corresponding electronic touch sensitive strip ST. The touch sensitive strips TS provide information to the tablet's microprocessor.

In the example shown in FIG. 38, the strip $TS_1$ illustrated on the left hand edge of the frame is designated as a "FROM" strip. The strip $TS_2$ illustrated on the right hand edge of the frame is designated as a "TO" strip. Similarly, the strip $TS_3$ illustrated on the lower edge of the frame is designated as a "FROM" strip, while the strip $TS_4$ illustrated on the upper edge of the frame is designated as a "TO" strip.

In operation, a printed page P from a copier is first placed into the frame on the back of the tablet 1. In the example illustrated in FIG. 38, the printed page P contains several lines of printed text. If the user wishes to rotate the image clockwise by an angle $\ddot{y}$ as shown in FIG. 38, then the user first touches a point on the left hand "FROM" strip $TS_1$ corresponding to the actual location of the first line of text on the printed page P. This sends an electronic signal to the microprocessor indicating the present position of the printed image. Next, the user touches a point on the right hand "TO" strip $TS_2$ corresponding to the desired location of the first line of text on the printed page P. This sends an electronic signal to the microprocessor indicating the desired position of the printed image.

The width $\dot{y}$ of the printed page P is a known constant that may be stored in the microprocessor memory. The vertical distance between the actual location of the image and the desired location of the image may be calculated by the microprocessor, based upon the information received from the "FROM" and "TO" strips. The desired angle of rotation $\ddot{y}$ may also be calculated by the microprocessor in accordance with the following formula:

$$\ddot{y} = \tan^{-1} \dot{y}/\dot{y}$$

The microprocessor thus uses the information received from the "FROM" and "TO" strips to electronically rotate the image clockwise by an angle $\ddot{y}$ from the image's present angular orientation to the image's desired angular orientation. Pages that are subsequently printed by the copier will provide images that are rotated by the indicated amount.

Embodiments of the present invention enable a conventional copier to function as a "receiving end" facsimile printer. In one embodiment a facsimile module may be plugged into the tablet to enable fax data transmitted over standard telephone lines to be intercepted, interpreted, and converted into displayable form. Once present on an image forming screen, the graphical data may be reproduced by a copier. The facsimile information may be directly viewed off of the image forming screen, and thus need not be printed unless desired.

In this manner the present invention provides for both "optical fax" and conventional "hard copy fax", and permits the user to inspect a transmitted document in its entirety before deciding whether all or only portions are to be printed. Variations on this theme include embodiments possessing document scanning capabilities, so that data transmission is possible, in addition to data reception. Other embodiments may be equipped with storage means so that incoming data may be saved, then printed in a time-shifted fashion at another moment. The information received via fax transmission may include both visual information as well as audio information.

Examples of systems that use the present invention as a fax device are discussed in greater detail below in connection with FIGS. 39 through 52.

FIG. 39 illustrates an example of how a fax document might appear displayed on the image display screen 6A of a fax tablet 1000. As shown in FIG. 39, the fax document includes the image of a shirt, a body of handwritten text, and a telephone number. Also represented in the figure is a light gasket 2, located along the perimeter of the display element 6A. The light gasket performs the function of keeping stray, ambient light from leaking in between the display 6A of the tablet and the copier window of the copier while the tablet 1000 is being used with a copier to create hard copy.

FIG. 40 illustrates an example of the light gasket 2 of the fax tablet 1000. A portion of the tablet 1000 is shown in an enlarged view to better illustrate the light gasket 2. As shown, the light gasket 2 is in the form of a soft, deformable material layer situated along the perimeter of the display element 6A, that is minutely elevated above the surface of the display screen. The light gasket 2 may be constructed of any suitable, flexible material (e.g. rubber).

FIGS. 41(a) and (b) illustrate an example of a procedure for retrieving "Voice Notes" from fax documents containing audio components. "Voice Notes" and "Audio Overlays" are novel features of the present fax unit. They permit an audio component, such as a note or memo dictated in the voice of a person sending a fax document, to be incorporated into otherwise conventional fax transmissions. The present invention enables audio overlays to be incorporated into hard copy fax documents. This permits voice notes to be accessible not only from just-received fax documents, but from fax documents that may have been received long ago, as well as from ones that may have been received by fax units other than the one currently in use. As will be seen, a preferred method employed by the present invention to incorporate audio signals into hard copy fax documents preserves the "look and feel" of the conventional, plain paper fax documents.

Looking now at FIG. 41(a), the fax document first appearing in FIG. 39 may again be seen on the display screen 6A of the fax tablet 1000. Depicted are a picture of a shirt, a body of handwritten text, and a telephone number. Both the image of the shirt 1110a and the telephone number 1110b are graphically enclosed by boxes that are darkened or otherwise highlighted. These highlighted boxes indicate that there are audio messages associated with the highlighted portions of the fax letter.

The image-forming screen 6A of the fax tablet 1000 is an ATM-style touch-sensitive screen. By touching any of the highlighted regions appearing on the screen 6A, the user may play back the audio message associated with the highlighted portion of the document. A loudspeaker (not shown) included in the tablet may be used to play back the audio messages.

FIGS. 41(a) and (b) illustrate an example of a procedure for playing back the audio component of a fax message. By touching the highlight box 1110a enclosing the image of the shirt as shown in FIG. 41(a), the user causes the tablet 1000 to play back an audio message stating that "This style comes in sizes small, medium and large. It does not come in extra large." By touching the highlight box enclosing the telephone number 1110b as shown in FIG. 41(b), the user will cause the tablet 1000 to play back a received audio message stating that "My fax tablet number 854–5678, in case you want to transmit voice/fax mail to me."

FIGS. 42(a)–(d) illustrate an example of the document scanner facility of the fax tablet 1000. The document scanner facility includes both an audio sub-assembly and a conventional graphic sub-assembly. The audio assembly includes two sub-components: an audio read/write head, and an "audio patch" applicator.

In FIG. 42(a), a document input tray 1120 is shown. The user would place a document into the document input tray 1120 to have the document processed by the document scanner facilities. A document input through the document scanner tray 1120 is transported through the scanner assembly and exits at exit slit 1121. FIG. 42(b) illustrates the removal of a part 1123 of the tablet 1000 so as to reveal the components of the scanner assembly. FIG. 42(c) shows the audio components of the scanner assembly. Audio read/write means 1126 are pictured as well as an "audio patch" applicator 1124. The audio read/write means 1126 performs the function of reading from and/or writing to an audio patch as a document is being transported through the scanning assembly. The audio read/write means 1126 may comprise a magnetic read/write head, similar to those used in tape recording equipment or to those employed to store and to retrieve data onto an from computer diskettes. The "audio patch" applicator 1124 is in essence a label applicator that applies adhesive labels, having, for instance, a magnetic recording surface layer coated onto the non-adhesive face, onto documents passing through the scanner pathway. FIG. 42(d) shows an optical scanner 1127 on the cut-away portion 1123 of the fax tablet 1000. The optical scanner 1127 may comprise a linear photodetector array similar to those found in optical scanners currently available.

The audio patch retains information for the audio component of a fax document, when the document possesses such a component. In a preferred embodiment, an audio path may comprise a small strip of flexible magnetic material, although other types of recording media may be used (e.g. optical). The substrate of an audio patch might be constructed of a flexible polymer, of treated paper, or it might be constructed of a flexible metal such as aluminum, onto which a recording medium may be applied. The audio patch applicator 1124 applies the audio patch to the back of a document sheet, generated by a copier. The audio patch technique of the present invention enables a fax document to retain the "look and feel" of a conventional, plain paper fax document. Yet it permits the document to retain audio information in addition to the conventional, graphical information.

An entire fax transmission, including both audio and visual information, may be received by the tablet 1000 from a remote audio-capable fax unit and stored in the tablet's memory. The visual information may be played back on the tablet's image display screen, while the audio information may be played back on the tablet's loudspeaker.

FIGS. 43 and 44 illustrate an example of the process of producing hard copy of an entire audio-fax document that includes the associated audio messages. The tablet 1000 may first be placed on a copier 4 and plain paper hard copy P may be generated by the copier in a manner previously described. The plain paper hard copy P (which is similar in appearance and mechanical properties to that produced by a conventional plain paper fax machine) may then be taken from the copier 4 and fed through the scanning assembly of the fax tablet 1000. As the sheet P is being fed through the scanning assembly, the audio patch applicator 1124 will generate an appropriate audio patch AP (based on the audio information in the tablet's memory) and will apply the audio patch AP to the back of the fax document P. The audio patch AP enables the user to keep the recording of the audio portion of the fax transmission.

FIGS. 44(*a*) and (*b*) respectively illustrate an example of the front and back of a page P printed by the copier 4. The back of the page P is blank and has not yet received an audio patch. The printed page P is fed into the scanning assembly as if the user were scanning the page for transmission. The audio patch AP is then applied to the back of the printed page P, as shown in FIG. 44(*e*).

In an alternative embodiment, the tablet may simply create an audio patch but not apply the audio patch to the back of the printed page. In such an embodiment, the audio patch may be manually applied to the back of the printed page as a separate procedure. The back of the printed page may be provided with printed guide markers to assist in positioning the audio patch.

FIG. 45 illustrates an example of a system for playing back a printed page P having an audio patch AP. FIG. 45(*a*) illustrates the front of the printed page P containing both text and graphic information. FIG. 45(*b*) illustrates the back of the printed page P to which an audio patch AP has been applied. The printed page P may be fed through the scanning assembly of the tablet 1000, as shown in FIG. 45(*c*). The text and graphic information on the front of the printed page P may be scanned by an optical scanner 1127, in a manner well known in the art. The text and graphic information scanned by the optical scanner 1127 may be stored in the memory and displayed on the display image display screen 6 (see FIG. 45(*d*)).

The audio patch AP on the back of the printed page P may be read by an audio read/write head 1126. The audio information read by the audio read/write head 1126 may be stored in the tablet's memory and played back through the tablet's loudspeaker.

The text and graphic information displayed by the image display screen may include highlight boxes (see FIGS. 45(*e*) and (*f*)). Touching a highlight box on the tablet's touch sensitive image display screen causes an associated audio message to be played back through the tablet's loudspeaker. This system enables the user to access the audio information of a fax transmission that may have been received years earlier, or that may have been received by another fax machine.

FIGS. 46 and 47 illustrate an example of how the audio portion of a fax document may be recorded. In FIGS. 46(*a*) a user's finger is shown on the upper left corner of what will be an audio highlight box. In FIG. 46(*b*) the user's finger is shown dragging the bottom right corner of the forming highlight box to enclose the image of the shirt. In FIG. 46(*c*) the image of the shirt has been completely enclosed within the borders of a highlight box. FIG. 46(*d*) portrays a completed highlight box defining a region of a fax document for which an audio message may now be recorded.

FIG. 47(*b*) shows an enlargement of several on-screen buttons, including a screen button having the icon of a tape cassette. The screen button may blink to indicate that a region of the document has been selected (highlighted) and is awaiting the recording of an audio message. The user touches the screen button having the icon of the tape cassette, to initiate the audio recording sequence, and begins speaking into a microphone supplied with the tablet. When the dictation of the audio message has been completed, the same screen button is again pressed. An audio overlay message has now been created for that particular, highlighted portion of the document. In FIG. 47(*a*) the highlight box is darkened to indicate that an audio message is present. In contrast, in FIG. 46(*d*) the highlight box is clear, and is formed of dotted lines. This indicates that a region has been defined for incorporation of an audio overlay, but that no audio message has yet been recorded.

While the audio overlay examples described above have involved human voice dictations, it is possible for audio overlays to comprise other forms of acoustic material. For example, a fax document containing a list of musical recordings, such as a listing of compact discs, may have a few seconds of sample music included with each title listed. Other varieties of acoustical information may also be with the audio overlays of the present fax unit.

A fax tablet in accordance with the present invention may communicate via either a cellular link or a conventional wire link. A fax tablet in accordance with the present invention may communicate with other, conventional fax machines that do not have audio message capabilities and that do not have image display screen capabilities.

FIG. 48 illustrates an example of a communications protocol for fax transmission. The illustrated protocol enables a receiving fax unit having audio capability in accordance with the present invention to be used with both prior art transmitting fax units as well as transmitting fax units having audio capability.

As illustrated in FIG. 48, when the transmitting fax unit has completed transmitting conventional (i.e., non-audio) fax information, the transmitting fax unit transmits a disconnect signal ("DCN") to the receiving fax unit. A conventional receiving fax unit will hang up upon receipt of such a disconnect signal.

In the illustrated example, a receiving fax unit having audio capability in accordance with the present invention will not hang up immediately upon receipt of the disconnect signal. Instead, the receiving fax unit waits for a predetermined period of time (for example, fifteen seconds). If the transmitting fax unit is an audio capable unit, then the transmitting fax unit transmits an audio capable signal ("VOC") shortly after transmitting the conventional disconnect signal ("DCN"). If the audio capable receiving fax unit receives the audio capable signal from the transmitting fax unit, then the receiving fax unit sends an audio acknowledge signal ("VOA") back to the transmitting fax unit. Then, the transmitting fax unit begins transmitting the audio component of the fax transmission. After transmission of the audio component is completed, the transmitting unit sends another disconnect signal. The disconnect signal may be identical to the previously sent conventional disconnect signal ("DCN"), with the receiving fax unit being designed to hang up after receiving two cycles of disconnect signals.

When a fax tablet displays a fax transmission, it may also be programmed to label each separate highlight box with a corresponding identification letter or numeral. FIGS. 49(*a*) and (*b*) illustrate examples of highlight boxes that are labeled with small superscript identification numerals. In the illustrated example, the highlight box containing the image of the shirt has been labeled with a superscript identification numeral "1", and the highlight box containing the telephone number has been labeled with superscript identification numeral "2". The primary purpose for such identification numerals is to allow a user to identify and play back specific audio messages without requiring the use of a touch sensitive image display screen.

FIG. 50 illustrates an example of a voice capable desktop fax unit containing an image display screen that is not touch sensitive. In the illustrated example, if the user wanted to hear the audio message identified by the numeral "2", then the user would first place the fax document having an audio patch in the scanning tray of the desktop fax unit. The user would then push a button on the operator's console that says "play voice note #02". The document would be transported through the scanning assembly and an audio read/write means in the desktop fax unit would read and play back the audio message identified by the numeral "2".

FIG. 51 illustrates an example of a cradle C into which a fax tablet 1000 may be placed. The cradle C may provide many or all of the electrical connections between the tablet 1000 and the outside environment. For example, the cradle C may include a phone connector for connecting the fax tablet 1000 to a phone line. The cradle C may include a computer connector for connecting the tablet 1000 with a computer or computer printer. The cradle C may also include a power supply for powering and/or charging the tablet 1000.

FIG. 52 illustrates an example of a cradle C equipped with a video camera VC which enables the fax tablet 1000 docked in the cradle to send, receive and display video images.

FIG. 53 shows a page $D_p$ which may either be a page of an electronic document as it appears on the display screen of a device such as 1000, or an actual printed page. Portions of the page, as indicated by the dark bounding boxes, contain information that is electronically linked to electronic reference information.

A characteristic of every link region, such as LR1 and LR2 in FIG. 53, is a set of information that defines its position within the document. There are many ways to represent the location of a link region. One method is to employ coordinates. The zero-point of the coordinate system may be a reference position such as the top or left margin of the document page. In FIG. 53 the link region LR1 is defined by the coordinates [Xa(1),Ya(1); Xb(1),Ya(1); Xb(1),Yb(1); Xa(1),Yb(1)], starting at the top left vertex of the bounding box and going around the quadrangle in a clockwise direction.

Position information defining a link region is obtained whenever, for example, an audio highlight box is defined as illustrated in FIGS. 46(a) through (d). There are many ways to convey the position of a link region besides through coordinates, for instance with markers, embedded codes, recorded patterns, etc..

FIG. 54 illustrates how link information stored on a printed document in the manner illustrated in FIG. 50 may be used to regenerate the electronic bounding boxes 1110a and 1110b of FIGS. 41(a) and 41(b). In FIG. 54, $D_{prn}$ represents a printed document. Like in FIG. 50, portions of the printed page contain information that is electronically linked to electronic reference data. Those portions of the page may be enclosed by printed markings having a predefined appearance. In both FIGS. 50 and 54 small superscript identification numerals are used as the delimiters of link regions.

For example, the superscript numeral 1 is used to identify the first link region 5011 on hardcopy page $D_{prn}$, and the superscript numeral 2 is used to identify the second link region 5022 on $D_{prn}$. When the printed page $D_{prn}$ is scanned by a tablet 1000 as in FIG. 45(c), or similarly when it is scanned by a desktop fax unit like the one pictured in FIG. 50, electronic information representative of the image appearing on the printed page is obtained.

In FIG. 54 5025 represents the electronic information representative of only the bottom portion of page $D_{prn}$. The concepts surrounding digital image representation are appreciable to individuals skilled in the art and the electronic representations may, for example, be in the form of bitmaps. Optical character recognition, or more generally, pattern matching, may be performed on the electronic image data. This is illustrated using image information 5025. When the image data 5025 is scanned 5027 for the presence of patterns used to denote link region boundaries, the positions of the patterns that are successfully recognized 5029 are recorded 5031. The small superscript numeral 2 is identified 5029 as a link region delimiter, and its position is recorded 5031, as symbolized by the placement of the crosshair. The other crosshairs shown in FIG. 54 correspond to, and are similarly derived from, the other numeral 2 superscripts in document $D_{prn}$.

The actual geometric shapes employed to designate link region boundaries may be arrived at by agreement. For example, whereas in FIGS. 49, 50, and 54 the shapes used are in the form of small superscript numerals, they are by no means limited to these. Indeed FIG. 55 illustrates an alternative in which the delimiters are in the form of brackets drawn by hand.

After all of the link region delimiters of a given group, for instance those involving the superscript numeral 2, have been identified, error detection procedures may be performed.

As an example if, by convention, link regions are always confined within geometric boxes, then a software routine may be included to confirm that the shape traced out by the sum of the identified link region delimiters is in fact quadrangular.

Once a link region has been identified it may be electronically associated with a piece of electronic reference information. Different linking conventions are possible. An example of an implicit method might be to associate the first link region identified on a page, where "first" may be interpreted in the top-down/left-right sense, with the first piece of electronic reference information (electronically) associated with the document.

In FIG. 54 the link region 5010 is electronically linked to a first piece of electronic reference information, and the link region 5020 is electronically linked to a second piece of electronic reference information. An example of an explicit link mechanism might be to connect the link region having the numeral 2 for delimiters on $D_{prn}$ with the second piece of available electronic reference information, regardless of the physical position of this link area on the page. Therefore, link region 5020 could be electronically linked to the second piece of electronic reference information even if it were located on top of link region 5010 in $D_{scr}$ in FIG. 54.

FIG. 55 illustrates how printed documents do not have to be originally created with electronically linked electronic references in mind in order to accommodate this feature. Printed document $D_{prn2}$ may have been taken from a magazine, or in the extreme may even be a historical document—and can still be used with electronically linked electronic reference information.

In FIG. 55, 5041 denotes a designated first link region, and 5042 denotes a designated second link region. The link regions are identified by brackets 5050, which may be hand drawn 5055. It is not a requirement that the link area identifiers be brackets. For instance, the superscript numerals of FIG. 50 and FIG. 54 may also be penciled in by hand. Similarly, the identifiers do not have to be manually drawn. They may be stamped onto $D_{prn2}$, or superimposed using overlays or other techniques, etc.

The concept illustrated in FIG. 55 is the addition of link region identifiers in a step separate from the generation of the printed matter to which the identifiers are being added. After $D_{prn2}$ is scanned as in FIG. 45(*c*), pattern matching may be performed as described in connection with FIG. 54. Bounding boxes such as 5010 and 5020 may be generated, and these may be electronically linked to electronic reference information in the manner practiced throughout this disclosure.

Figure 56B:
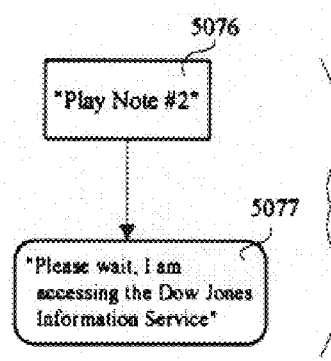

FIGS. 56(*a*) and (*b*) illustrate the storage of a remote link to electronically linked electronic reference information in an electronic data storage medium capable of being included on a printed document $D_{pn}$. The term "Electronic Data Storage Medium" (or EDSM) offers a more accurate description of the device element that is capable of being included on printed documents to retain or to convey electronically linked electronic reference information. Where the electronic reference information is comprised of electronic audio information, the EDSM may also be referred to as an "Audio Patch". The electronically linked audio information of FIG. 41 was stored in the audio patch AP of FIG. 44(*e*) with a local link.

It is not a limitation, though, of the links stored in the Electronic Data Storage Media described herein to be of the local variety. As shown in FIG. 43(*a*) the apparatus 1000 can communicate with a variety of devices situated at remote locations via wired (line) or cellular connections. In response to such capability, it will sometimes be necessary to store remote links in the EDSM so that (portions of) printed documents may reference information that may not be saved on the EDSM included with the document.

FIG. 56(*a*) shows an electronic data storage medium AP capable of being included on a printed page $D_{pn}$. The (EDSM) electronic data storage medium includes link information (LI) and electronic reference information (ERI). A local link 5060 is shown which points to reference information 5061. In FIG. 56(*a*) both the link information and the electronic reference information are depicted as being stored in a series of fields. It is preferable that at least the link information be saved in this manner, or in some other comparable fashion whose objective is to enable each piece of electronic reference information to be accessible independently of any extraneous data.

As shown in FIG. 50 the storage structure should permit convenient access to the electronic reference information even in the absence of a (Graphical User Interface) GUI Pointer (e.g.. touch sensitive screen, mouse, electronic pen, etc.). Furthermore, it should be possible to access any piece of electronic reference information without the need to refer to the original body of electronic data having the electronic links to the electronic reference information. The structure of FIG. 56(*a*) permits this.

Two remote links are shown in FIG. 56(*a*) and they are indicated as 5064. The first remote link is depicted as pointing to electronic reference information residing in a mass storage device. Mass storage device 5071 may be a hard drive included with the desktop fax machine of FIG. 50. Or, it may be a PCMCIA card present in the tablet 1000 of FIG. 45. These are but two examples.

The remote link information recorded in AP includes node access requirement information (NAR). The node access requirement information may include instructions, passwords, etc. in addition to the identities of any hardware or software which may be needed to enable the electronic reference information saved in the mass storage device 5071 to be retrieved.

The saved link information also includes the remote address (R_Address) of the electronic reference information such as the physical and logical drive names, directory paths, etc. where they are located. Information identifying the portion of the document making the reference call may also be supplied. This is represented as 5069. A second remote link is shown in FIG. 56(*a*). This time it points to electronic reference information located on a network or on a remote host 5073.

The tablet 1000 may be in communications with such devices as seen in FIG. 43(*a*). To illustrate this, the video sequence in FIG. 52 may constitute information deposited in a voice mail box which is electronically linked to, for instance, the name appearing on a printed copy of the little girl's report card. The tablet 1000, docked in video cradle C (as in FIG. 52), may access the voice mail box (as in FIG. 43(*a*)) using a remote link stored in the electronic data storage medium AP.

As another example, in FIG. 56(*b*), the execution of the command "Play Note #2", 5076, causes the second field of link information stored in AP to be read. Here, the information comprises a remote link to an on-line service 5073. NAR2 of this stored link may include the phone number of the desired on-line service, as well as any communications protocols or passwords which may be needed to establish the connection.

"R_Address 2" may include the sequence of commands required to enter the portion of the on-line service providing the desired reference information. Or, in an abbreviated arrangement which requires less storage space on the electronic data storage medium AP, the NAR frame may indicate the name of a complete applications module or batch file which must be available to the document playing apparatus, in order for the sought-after remote-linked reference information to be obtained.

5077 in FIG. 56(*b*) represents a message which may be issued by an apparatus that is playing a document $D_{pn}$ during the time that a remote connection is being established via a remote link. Also, 5076 may be an actual voice command spoken by the person playing document $D_{pn}$ to, for example, a tablet 1000. This may be the case where the tablet 1000 possesses voice recognition capability.

FIG. 57 shows the use of a Non-Standard Facilities frame by a facsimile apparatus, to tell a comparable apparatus how it will be conducting a modified facsimile session. The NSF frame is included as an optional feature of the CCITT fax communications protocol. In FIG. 57, the NSF data may include codes for designating the transmission mode, link mode, special characters in use, etc.. For example, the document image data as well as the linked reference data may be encoded as fax data and transmitted. Whereas the document image data dispatched in this fashion may still be intelligible to an unsuspecting receiving apparatus, the linked reference data may be useless unless the receiving apparatus is aware that such a (modified) transmissions scheme is being employed.

FIGS. 58(*a*–*d*) show the communications protocol of FIG. 48 in greater detail.

FIG. 58(*a*) outlines the general scheme of the communications protocol. The method utilizes two communications sessions, executed typically, although with some exceptions, in back-to-back sequence. The first session is referred to as the Primary Communications Session, and the second session is referred to as the Secondary Communications Session.

During the Primary Communications Session the document will typically be transmitted, by way of a conventional data transmission technique such as one of the CCITT fax protocols. During the Secondary Communications Session the electronically linked electronic reference information will typically be transmitted. This was seen in connection with FIG. 48 where electronically linked audio information was sent. While the Primary Communications Session may involve one of the CCITT fax protocols, this is not a limitation of the present method, whose objective is to enable bi-directional communications of electronically linked electronic reference information with existing communications schemes not intended to accommodate this capability.

The document which is transmitted during the Primary Communications Session of FIG. 58(*a*) may optionally include link information embedded with the document information. The electronically linked electronic reference information which is transmitted during the Secondary Communications Session will usually include link information; although the link information need not be conveyed in an explicit form. That is, the link information may be manifest in the transmission and storage structure of the electronically linked electronic reference information.

For example, a pre-defined period of silence may separate two successive pieces of electronic reference information during their transmission; and, when stored in the electronic data storage medium which will be included on a printed document, each piece of electronic reference information may be assigned a separate storage field. For instance, the third piece of electronic reference information may be located in the third storage location.

FIGS. 58(*b*)–(*d*) illustrate how the presently taught communications procedure enables otherwise conventional fax transmissions to include electronically linked audio information. In FIG. 58(*b*) a document containing electronically linked electronic audio information is being sent using an existing fax protocol, such as the CCITT Group 2 or Group 3 facsimile communications protocol. In the primary communications session a facsimile image of the document is transmitted in a manner consistent with the CCITT standard. Electronic data representative of the original document image is transmitted.

A novel (optional) addition of the present method involves transmitting electronic data not just representative of the original document, but representative of the original document with superimposed link region delimiters like the ones shown in FIGS. 49, 50, 54 and 55. If the transmitting station comprises an apparatus such as the communications tablet 1000 in FIG. 43, or the desktop fax unit shown in FIG. 50, then the link information may be electronically superimposed onto the electronic representation of the original document by the apparatus. In the case where the transmitting station comprises a conventional, current-art fax machine, the above-mentioned link information may be hand drawn as described in connection with FIG. 55.

The linked audio information communicated during the secondary communications session in FIG. 58(*b*) is being transmitted in what will be referred to as Voice Mode. After the fax transmission of the primary communications session has been successfully completed, the sending facsimile apparatus disengages the line. If the sending station comprises a conventional fax machine, then it simply hangs up. If the sending station is an apparatus such as the tablet 1000 of FIG. 43(*a*), then the apparatus 1000 does not hang up but instead disengages the use of the fax component of the equipment. The linked audio information is then sent as "voice dat". If the sending station employed a conventional fax machine to transmit the fax portion in the primary communications session, then a telephone on the same line as that fax machine may be used to send the linked audio information.

To illustrate the method, consider sending the two linked audio sequences depicted in FIG. 47. After the fax machine has hung up, the sender may press a key on the key pad of the telephone she is using—for instance, the "*" key. In accordance with the DTMF (Dual Tone Multifrequency) method, this generates a tone which is actually comprised of two frequency components: 941 Hz and 1209 Hz. A receiving apparatus such as 1000 of FIG. 43(*a*) will detect the tone and interpret it as designating the start of transmission (in the voice band) of electronically linkable electronic (audio) reference information.

The remote apparatus may respond with a voice prompt such as "Ready to receive". The sender may then press the "#" button followed by the number of the linked electronic reference that will be sent, for example "1", and again followed by the "#" button. The sender then dictates the voice note over the phone, for example: "This style comes in size small, medium and large. It does not come in X-large." After the dictation of the linked audio message has been completed the "#" button is again pressed. The first linked voice note has now been communicated to the remote, receiving station.

Similarly, to send the second linked audio reference shown in FIG. 47, the sender would press "#2#" and speak into the phone: "My fax-tablet number is 854-5678, in case you want to transmit vice/fax mail to me." This is again followed by pressing the "#" button on the telephone keypad. After all of the linked electronic audio references have been dictated, the sender presses the "*" button on the telephone keypad. The receiving apparatus 1000 will respond by offering a set of options: "Would you like to replay your voice notes?", etc.. Some versions of the receiving apparatus may hang up upon receipt of the terminal "*" tone.

The audio passages received by the apparatus 1000 may be stored in a memory unit included with the apparatus, whether the memory is in the form of semiconductor RAM, magnetic or optical disk drive, or magnetic or optical tape, etc.. The apparatus may also proceed to immediately store the audio information in an electronic data storage medium AP which can be included on a printed document, as illustrated in FIG. 44(*e*).

In the manner just described, it is possible to create and to send, using a conventional facsimile machine, a document having electronically linked electronic reference information (e.g. audio passages), to a receiving apparatus such as the tablet 1000 of FIG. 41 or FIG. 43(*a*).

The present method also accommodates the situation where the sending station comprises an apparatus such as the tablet 1000 of FIG. 41, and the receiving apparatus comprises a conventional fax machine with telephone answering machine capability. In such a case the tablet 1000 will first transmit the document image information to the receiving station as an ordinary facsimile transmission. The actual electronic representation of the document that is transmitted may include link region delimiters such as those depicted in FIG. 49 superimposed onto the original document. In this way embedded links may be stored on the printed document such that portions of the printed document may be electronically re-linkable to electronic reference information at a later time. (In some versions machine readable optical codes may be superimposed onto the original document.) This permits the linking step to be time-shifted.

After the document has been successfully transmitted to the receiving station, both stations hang up. The sending station then redials the receiving station and waits for the outgoing announcement played by the telephone answering machine component of the receiving station to be completed. When the sending apparatus detects that the audio signal level coming over the telephone line from the receiving apparatus has dropped, the outgoing announcement is interpreted as complete. The sending apparatus then begins playing to the answering machine of the receiving station (over the telephone line) the audio passages associated with portions of the already faxed document. The "#" tone may be played over the telephone line by the sending apparatus between successive audio passages.

Some versions of the apparatus may identify each audio passage by including the audio note number, for example, by playing the "#2#" tone prior to playing audio note 2. Other versions of the apparatus may even identify each audio note by playing an identifier using a synthetic voice, for example, "Voice Note 3 follows", followed by playing voice note 3.

The present method therefore enables an ordinary fax machine working in conjunction with an ordinary telephone answering machine to send, receive, store, and to generate printed documents having portions that are electronically linked to electronic reference information. Furthermore, by re-inputting the information received by the telephone answering machine into the apparatus 1000 of FIG. 41, and by scanning (as in FIG. 45(c)) the fax document received by the ordinary fax machine into the apparatus 1000, the linked audio information may again be accessed as illustrated in FIGS. 41(a) and 41(b).

Figure 58A:
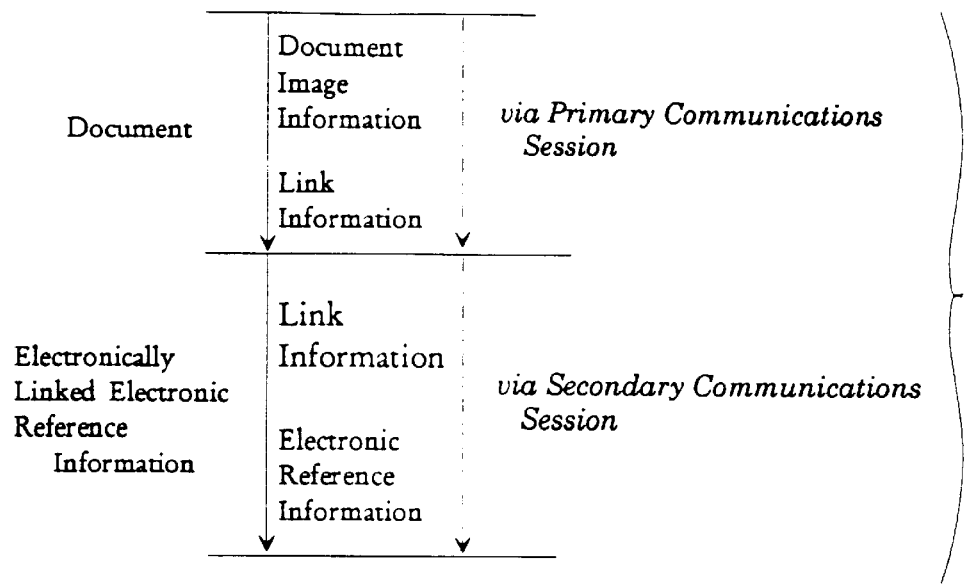
Figure 58B:
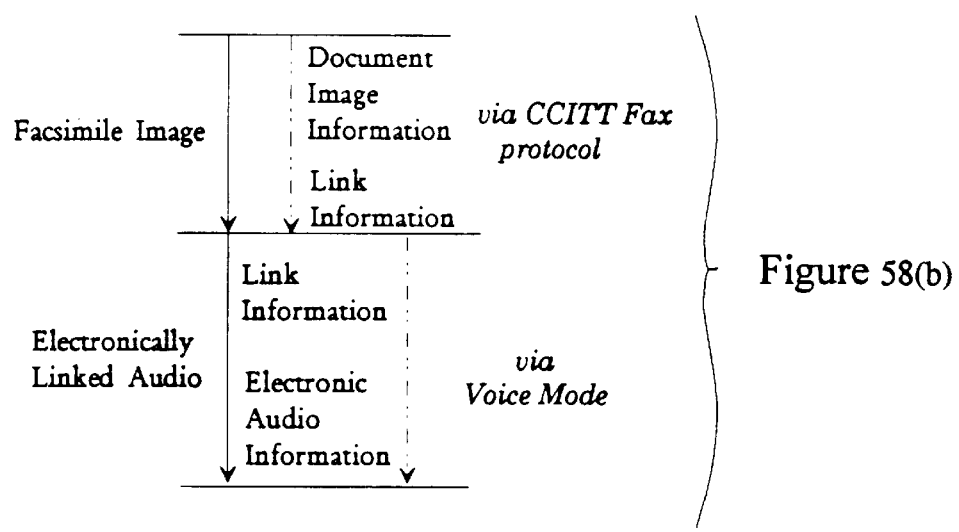
Figure 58C:
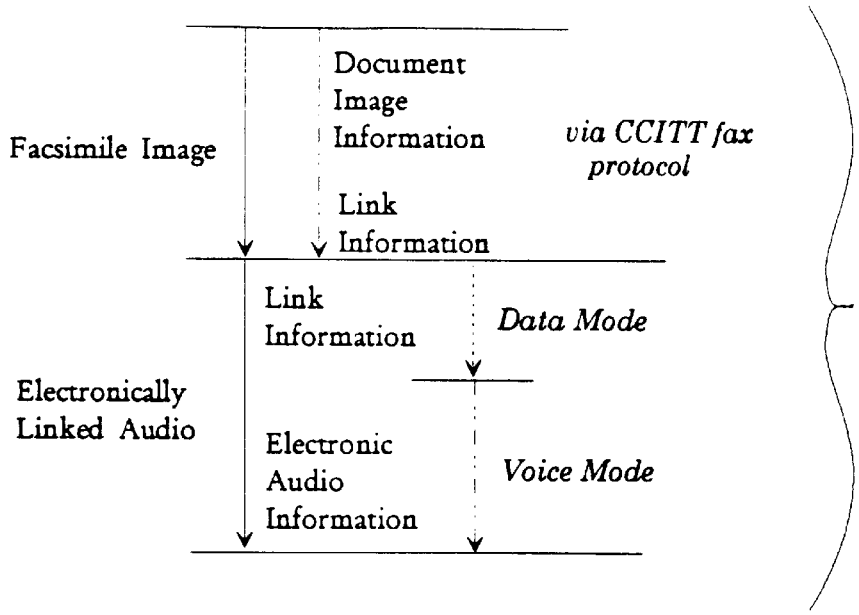

FIG. 58(c) illustrates a variation of the communications method in which a document having electronically linked electronic reference information is transmitted using three communications modes. First, the document itself is transmitted using, for example, the CCITT Group 3 fax protocol. The transmitted document may include embedded link information in any of the ways described earlier. Next, the electronically linked electronic reference information (for example voice notes) is transmitted using two modes. A data mode is used to send data including link data and a voice mode is used to send audio passages.

In accordance with FIG. 58(c), two pieces of equipment (like 1000 of FIG. 43(a)) may implement a multimode transmissions scheme to communicate documents having electronically linked electronic reference information. After the document portion has been successfully transmitted using, for example the CCITT Group 3 fax protocol, a data modem using pre-defined settings may be used to transmit data such as that shown in FIG. 56(a) stored in AP. Other forms of data may also be sent, such as computer files.

Following the data mode a transition to voice mode may be made, in which the data modem releases the line without hanging up. In the AT Command Set a modem command such as "AT+FVo", "AT+FVoice", and "ATG" will bring about a transition to voice. Spoken information may be transmitted using voice mode, as described above in connection with FIG. 58(b). The "VOC" command of FIG. 48 may be transmitted at the start of data mode in FIG. 58(c) by the data modem of the sending station.

One form the "VOC" command may take is a set of "*" tones of the form "*N", where "N" is a one digit number from 0 to 9. For example "*1" may comprise a tone of 941 Hz and 1209 Hz followed by a tone of 697 Hz and 1209 Hz. Then minimum duration of each tone may be 75 milliseconds, and the minimum interdigit interval may also be 75 milliseconds. The tone of "*" without a following numeral may default to signify that a transition to voice mode will be made. This was seen in connection with FIG. 58(b) where, after the fax hardware released the telephone line, the "*" tone was used to signal the start of dictated voice notes.

The tones associated with "3" (941 Hz and 1209 Hz plus 697 Hz and 1477 Hz) indicate to the tablet 1000 of FIG. 43 that data mode is being used. This simply means that a data modem will be transmitting data over the line, which is still active, although the fax component has already disconnected from the line.

Figure 58D:
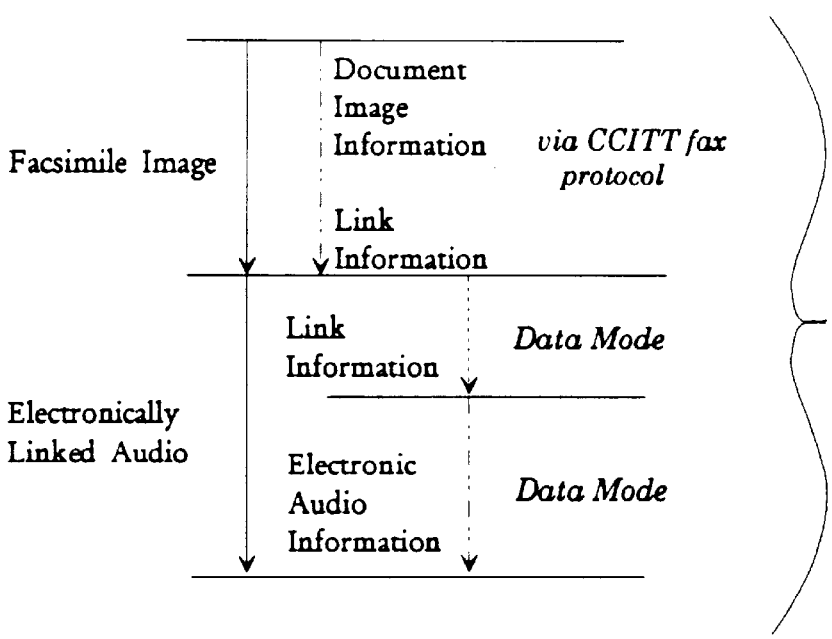

FIG. 58(d) shows a version of the communications scheme in which two modes are employed: a facsimile mode and a data mode. The document having the electronic links to electronic reference information is sent using the facsimile mode; and the linked audio information is sent using the data mode. The fax portion of the scheme is as described earlier. The data portion is similar to the data portion in FIG. 58(c), except that in FIG. 58(d) the audio passages themselves are transmitted as electronic data. This requires that the audio information, which may have been obtained as illustrated in FIG. 47(b), be in digital form. The conversion of audio signals into digital form is well known in the art and, other than placing greater requirements on the data processing and transmissions overhead of the present method, offers many conveniences to the user. It is possible to transmit many forms of electronic data besides electronic audio or video information. For example, computer files may be sent instead.

Using the methods described above it is possible to transmit documents having electronic links to a vast array of types of electronic reference information, and to do so while making use of existing equipment which otherwise would not have this capability. Variations of the methods described above are also possible. For example, the electronic reference information may be transmitted prior to the transmission of the facsimile image.

Finally with regard to the presently taught communications method, it is possible for the Non-Standard Facilities (NSF) feature which is a part of the CCITT facsimile protocol to be utilized to enable an apparatus such as the tablet 1000 of FIG. 43 to communicate with another similar apparatus. It is also possible for the audio information, which comprises link information and audio data, to be transmitted as NSF data.

For example, a non-standard setup may involve sending audio data encoded as facsimile data. In some instances this method may even be desirable. However, to enable bi-directional compatibility between the devices presently taught and conventional devices such as ordinary fax machines, the scheme described in conjunction with FIGS. 48 and 58 is believed to be better. The NSF feature which is an integral part of the CCITT facsimile standard may be resorted to when it is known that comparable equipment will be used at both sending and receiving stations. The NSF feature may also be applied to supplement the methods described herein, as between two similar devices such as 1000 in FIG. 43(a).

FIG. 59 illustrates the synchronization of information storage (into an EDSM to be included on a printed document) with the formatting of the associated document. 5100 represents electronic data having portions that are electronically linked to electronic reference information. Some of the electronic data, represented by 5110, will be used to generate printed copy. Other parts of the electronic data, indicated by 5120, comprise electronic reference information and link information. Pathway 5113 illustrates what may occur without synchronization. AP is an electronic data storage medium capable of being included on a printed document. The data printed onto page Pg includes three reference calls to electronically linked reference information: 5134, 5136, and 5138. 5124 represents the electronic reference information associated with reference call 5134; 5126 represents the electronic reference information associated with reference call 5136; and 5128 represents the electronic reference information associated with reference call 5138. After storing the data associated with 5124 and 5126 in the electronic data storage medium AP, the remaining storage space 5127 on AP is insufficient for retaining the data associated with electronic reference information 5128.

Pathway 5117 illustrates formatting the hardcopy and partitioning the storage of electronic reference information in synchronization. Printed page Pgx has been formatted to include the information containing reference calls 5134 and 5136. The electronic reference information 5124 and 5126, which are respectively linked to 5134 and 5136, is stored on a first electronic data storage medium AP capable of being included on page Pgx. The data which includes the reference call 5138 is printed on another page Pgy. The electronic reference information 5128 which is electronically linked to 5138 is stored in a second electronic data storage medium capable of being included on the second printed page Pgy.

FIGS. 60(*a*) and (*b*) illustrates an example of how information may be organized so that it will not be necessary to acquire an entire body of electronic data in order to access to the electronic reference information that is electronically linked to portions of that body of electronic data.

FIG. 60(*a*) represents the electronic data having portions that are electronically linked to electronic reference information. Three link regions $LR_a$, $LR_b$, and $LR_c$ are shown within a "primary" block of electronic reference information $ERI_p$. Link region $LR_a$ is linked to electronic reference information $ERI_{a(1)}$. Similarly link region $LR_b$ is linked to $ERI_{b(1)}$, and $LR_C$ is linked to $ERI_{C(1)}$. $ERI_{b(1)}$ itself includes a link to an electronic reference $ERI_{b(2)}$.

Given the electronic data shown in FIG. 60(*a*), the information shown in FIG. 60(*b*) may be (electronically identified and) obtained. The table of FIG. 60(*b*) is offered only as an example. Other organizational schemes are possible.

The first horizontal row in the table identifies the access requirements of each of the nodes in the complete body of electronic data shown in FIG. 60(*a*). The first row may be considered a Node Access Requirement Header. It may be more efficient for a printed document that includes a data storage medium containing complex, linked electronic reference information to have the information shown in FIG. 60(*b*) readily accessible. A table as shown in FIG. 60(*b*) may be stored in the electronic data storage medium that is included on the printed document. It may also be retained in the memory of a device such as 1000 in FIG. 41, or in the memory of the desktop fax apparatus of FIG. 50.

The Node Access Requirement Header may reveal the requirements which must be met in order for each of the electronic references to be accessed; for example, any supplemental hardware or software needed by the electronic reference data. Each column in the table furnishes information used to access (and to establish the link to) a piece of electronic reference information. For instance, looking at the second column, the first entry identifies any special hardware or software which may be needed to access the electronic reference information labeled $ERI_{a(1)}$ in FIG. 60(*a*); and the second entry enables a link to $ERI_{a(1)}$ to be established. Each piece of electronically linked electronic reference information may be retrieved independently of any other information contained in the original body of electronic data. Similarly, GUI pointers are not required for access to be achieved. The example supplied in FIG. 50 may make use this feature: "Play Voice Note #02".

Figure 61B:
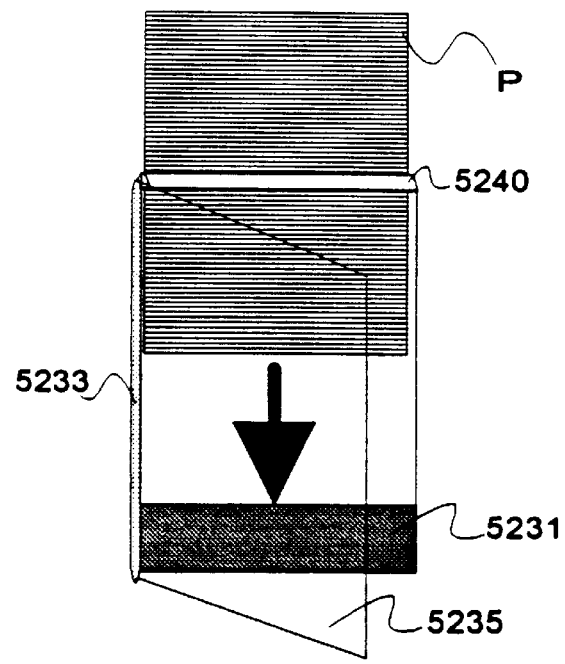

FIGS. 61(*a*) and (*b*) illustrate an apparatus for playing printed documents that have electronic data storage media included thereon, such as the page P of FIGS. 45(*a*) and (*b*). In FIG. 61(*a*) a printed document P is being inserted into the playing apparatus 5225. Scan window 5230 includes an optical or magnetic read head for reading the electronic data storage medium AP included on the rear surface $P_b$ of the printed document P (as in FIG. 45(*b*)). Cover plate 5235, which is attached to playing apparatus 5225 by a hinge 5233, comprises a liquid crystal display means. Cover plate 5235 is substantially optically transparent, and thus when closed shut over a printed document P which has been placed into the playing apparatus 5225, will permit information formed on the printed document to be viewed.

Images generated on the liquid crystal display means 5235 may be superimposed onto images formed on the printed document P. This allows graphics derived from electronic reference information linked to portions of the printed document P to be overlaid onto the printed document. FIG. 61(*b*) illustrates a printed document being optically scanned by playing apparatus 5225. The optical scanning mechanism 5240 may include a linear photodetector array like 1127 in FIG. 42(*d*). FIG. 61(*b*) also shows a backlit portion 5231 of the playing apparatus 5225.

FIG. 62 shows the playing apparatus 5225 playing a printed document P. The dark portion of the graph 5258 in the center of the page is formed on the liquid crystal display means of the cover plate, and is being superimposed onto the printed information of page P. The two arrows are also electronically formed images overlaid onto the printed page.

The data and instructions for forming these images comprise electronic reference information saved in an electronic data storage medium affixed to the page P. The video sequence 5250 pictured at the bottom of the apparatus 5225 is similarly being formed from electronic reference information on the liquid crystal member. The person shown in the video sequence is explaining the printed document P. The audio portion 5255 of the video sequence 5250 is being played in coordination with the graphical plot 5258 and the appearance of the arrows. The lower arrow is pointing to the part of the graph on the printed page, which represents "the department's prediction". The upper arrow is pointing to the part of the graph formed on the liquid crystal display means. It represents the "actual outcome" spoken of by the person in the video sequence 5250.

FIG. 63(*a*) shows a page of a hardcopy document that will be sent by a conventional facsimile machine having only monochrome capability to the receiving apparatus of the present invention. A conventional facsimile transmission protocol will be used, such as the CCITT group 3 facsimile transmission protocol. In FIG. 63(*a*) 8400 represents one page out of a multi-page hardcopy document which can contain any number of pages. At the top of the page is the word "URGENT", 8440. In this illustration the sender wishes to emphasize to the recipient of the fax transmission that the incoming document is of a high priority. Thus, the sender would like the word "URGENT", 8440, to be in red in the received document. Similarly, FIGS. 63 (*a*) and (*b*) contain a block of text 8420 which the author of the document (sender) considers to be of particular significance. To signify this, 8420 is desired to be in green when received. The color selections mentioned are merely for illustrative purpose, and there is no substantive relevance to the particular colors chosen.

FIG. 63(*b*) shows graphical identifiers 8470 being drawn by hand onto the document image of the hardcopy page. In actuality, any means for graphically adding the identifiers may be employed. For example, they may be printed or stamped onto the document, or even added in the form of adhesively applied appliques. Also several different schemes may concurrently be employed to accomplish the task. When the document is in electronic format, the graphical identifiers may be electronically added. In FIG. 63(b) the graphical identifiers 8470 are shown being manually marked 8480 onto the document page 8400. The graphical identifiers are depicted as comprising delimiters in the form of double brackets. Double brackets are but one possibility, and not a limitation of the invention. For example, a highlight marker may also be used, such as one which renders the highlit portion a particular color or shade of gray. In such instances, the hardware must be able to accommodate images containing those chromatic values; for example, the document scanner used to input the hardcopy document for transmission must be capable of detecting color or grayscale. The delimiters 8470 graphically added to the document image designate which portion of the received document is to have an operation performed on it. A variety of different "grammars" or conventions for a document image processing language are possible, and it thus should not be construed that the ones presently suggested are limiting.

In FIGS. 63(a) and (b) there is a portion of the document image, 8450, that will be electronically linked to the photograph 8460 of FIG. 65. Portion 8450 is located on the first page of the two page fax document being sent to the receiving apparatus, and 8460 is located on the second page. After they have been electronically linked to each other by the receiving apparatus it will be possible to access either linked portion without having to jump between the actual pages they are located on within the document. In lengthy multi-page fax documents this feature can be very convenient in facilitating the review of thematically related material.

In FIG. 64, 8410 corresponds to hardcopy document page 8400 of FIG. 63 after it has been completely marked up for transmission on a conventional (monochrome) facsimile machine. The sender wishes the word "URGENT", 8440, appearing in the top left corner of the document page, to be in red when received. FIG. 64 illustrates one example of a grammar for indicating the operations to be performed on the document portions 8440, 8420, and 8450. The different symbols used to designate different operations may be considered the grammar for a document image processing language. For example, the portion of the document designated 8440 will be translated into red as follows: first, portion 8440 (containing the word "URGENT") is placed in delimiters 8470 to signify to the receiving apparatus that the designated portion has to have an operation performed on it; and second, a transfer function of "R" (for red) is placed in the lower right corner of the delimited region. The black pixels in the delimited portion of the document image will be translated to red pixels. Numerous transfer functions 8490 are available for bringing about translation, or re-mapping, of document image attributes. The one just described in connection with the translation of pixel color is but one example.

There is another portion of the document image, 8420, in FIG. 64 which will undergo color translation. In the case of 8420 the black pixels in the designated document portion will be remapped to green. The image attribute transfer function 8490 for the delimited portion containing 8420 is "G". Thus when hardcopy page 8410 of FIG. 64 is received by the apparatus of the present invention, the document portion 8420 will appear in green; even though the conventional fax machine which sent the page, sent it in black.

There is also a third document portion, 8450, shown in FIGS. 63 and 64. Unlike the just-described document portions 8420 and 8440, portion 8450 will not undergo color translation. Instead, it will become the first element of a linked sequence. The numeral "1" in the upper left corner of the delimited portion containing 8450 is referred to herein as a connection identifier 8500. Such connection identifiers are used in one embodiment of the present invention to electronically link portions of multi-page documents to each other. Two types of connection identifiers are utilized by the embodiment of the present invention described herein—connection identifiers that identify the sequence to which the document portion belongs, and connection identifiers that identify the position of the particular document portion within its sequence.

Linked sequences are a novel feature of the present invention. They offer a convenience to recipients of multi-page fax documents when those documents are received by the apparatus of the present invention. In a multi-page fax document there may be portions of one page which bear relevance to specific portions of other pages. At present, one can only insert a written note such as "(See page 4, lines 55–67)" in the vicinity of the point in the multi-page document making the reference to the indicated portion of the document. The method now taught enables a plurality of linked sequences to be defined. Each linked sequence being comprised of a collection of document portions out of the complete multi-page fax transmission. Each of the individual portions within any given linked sequence presumably possesses some degree of thematic relevance to one another. When any given page is displayed the linked portions are identifiably presented in highlight boxes, within marquees, or in other manners known in the art of graphical user interfaces. When a linked portions is selected, such as by clicking a mouse with the pointer over the linked portion, a window will open containing the portion of the multi-page fax document which constitutes the next element in the linked sequence. Forward and reverse controls enable a user to advance or retreat to the next or previous element in the linked sequence. The present system thereby permits conventional facsimile machines to send multi-page fax documents containing a plurality of portions of special thematic relevance, said portions being electronically linkable to each other such that from any given linked document portion, all other linked portions may be conveniently accessed for review. In current systems, in contrast, the recipient of the multi-page fax document would have to read the "See page xx, line yy" note, manually advance to the referenced page, and then inspect the just-advanced-to page in order to manually find the position being referred to.

FIG. 64 illustrates one example of the use of delimiters and graphical codes to indicate specific operations to be performed on designated portions of a document. The particular delimiters and symbols used are not critical to the invention, all that is necessary is that the sender and recipient of the document agree in advance on how portions will be designated and the particular symbols used to identify the operation to be performed on the portion.

FIG. 65 shows the second page 8430 of a two-page fax document. Double bracket delimiters 8470 have been graphically added to the document image to identify a portion 8460 of the page that contains a photograph with a caption. The photograph and its caption will be the second element of the same linked sequence, in which 8450 of FIG. 64 was the first element. There is only one linked sequence in the present example, but this is not a limitation of the invention, which supports a plurality of linked sequences.

In FIG. 65, the portion of the document in delimiters, 8460, is to be electronically linked to electronic reference information in the form of an audio passage in the manner previously described in connection with generating electronic links to electronic reference information. A link identifier 8520, shown here as numeral "1", has been placed in the upper right corner of the delimited portion 8460 to signify that the delimited portion is to be electronically linked to the acquired piece of electronic reference information identified (in any of the ways already taught herein) as "electronic reference number 1". In the present case the electronic reference information will be in the form of electronic audio signals, such as a musical swatch, which will be accessible for playback from 8600.

The left side of the delimited portion of the document image in FIG. 65 contains a connection identifier in the upper left corner to identify the sequence number 8500 of the particular linked sequence. In the example there is only one linked sequence, though this is not a limitation of the invention. The sequence number 8500 of document portion 8460 in FIG. 65 and the sequence number of document portion 8450 in FIG. 64 are both "1". This defines both portions of the document as members of "Linked Sequence #1".

The numeral in the bottom left corner of the delimited portion 8460 is a connection identifier that identifies the position of the portion 8460 within the particular linked sequence and may be referred to as the sequence element I.D. number 8510 of linked portion 8460. In FIG. 65, the linked portion 8460 has a sequence element I.D. number 8510 of "2" which defines portion 8460 as the second element in the linked sequence. In FIG. 64, no sequence element I.D. number is shown for document portion 8450 because the first element of a linked sequence encountered in the document by the receiving apparatus is implicitly interpreted as having a sequence element I.D.number of "1". If portion 8450 of FIG. 64 had been provided with a sequence element I.D. number by the sender of the document, the default value of "1" would be overridden by it.

Thus, in FIGS. 64 and 65, a document image processing language has been defined as follows: double brackets are used to designate (delimit) portions of the document to be either transformed in some way, linked to another portion of the same document, or linked to electronic reference information. In the present example, the brackets delimit rectangular portions of the document, but this is not a limitation of the present invention. A symbol present in the lower right hand portion of the delimited portion indicates an operation to be performed on the text (or figure) within the brackets. The symbol (in the present example, a numeral), in the upper left hand corner is the connection identifier that identifies the particular linked sequence to which the delimited portion belongs. The symbol in the lower left hand corner (also a numeral in the present example) identifies the sequence element-I.D.-number, i.e., the position of the delimited portion within the linked sequence identified by the connection identifier in the upper left hand corner. Finally, the symbol in the upper right hand corner (also a numeral in the present example) is a link identifier to designate a link to electronic reference information as previously discussed. This document image processing language is intended to be exemplary only—the way in which the portion of the document is delimited, the particular delimiters used, the locations of the symbols, and the symbols themselves may be chosen according to any convention agreed upon by the sender and recipient of the document image.

FIG. 66 shows how the marked-up document 8410 of FIG. 64 would appear when received by the apparatus of the present invention. Hardcopy document 8410 was transmitted to the receiving apparatus of the present invention by a conventional (monochrome) facsimile machine, using a standard facsimile transmission protocol. 8530 is the electronic representation of the image of hardcopy document 8410 of FIG. 64, as it might appear on the screen of an image display device 8580. 8540 is 8440 in red and 8550 is 8420 in green. 8560 is a highlight box containing document portion 8450.

FIG. 67 shows what happens when highlight box 8560 of FIG. 66 is "selected", such as by clicking on it with a mouse, or by touching it when the display device includes a touch sensitive screen—a window 8590 is opened. The window is used to view the document portions that are within the same linked sequence as portion 8560. In the present example, when highlight box 8560 is accessed, portion 8460 of FIG. 65 appears in window 8590 on the image display device 8580 in electronic form 8600. But 8600 is also electronically linked to an electronic audio passage as previously discussed. Controls 8610 are thus provided for controlling the aural reproduction of the linked audio information by the audio speakers 8640.

In the example supplied herein, there is only one linked sequence, and that single linked sequence contains only two items: document portions 8450 and 8460. Still, controls 8620 and 8630 are provided for advancing to the next linked portion and retreating to the previous linked portion. In the present case, pressing 8630 when 8600 is in window 8590 will cause an electronic representation of 8450 to appear in place of 8600. And, pressing 8630 again will cause the image displayed in window 8590 to cycle back to 8600. Notice that in FIG. 67 the electronic representation of document image 8530 is still present in the background of window 8590. This is not essential and can be altered through adjusting user preference settings.

The transformation of the text within a designated portion of a document image is described with reference to FIGS. 68 and 69. FIG. 68(*a*) shows a set of pixels that might comprise a small part of a digital image. The numbers beneath each pixel denote the data that represents the pixel. For purposes of illustration each pixel has been represented by a three-bit data word. It should be recognized that the present invention is in no way limited to 3-bits/pixel. As persons skilled in the art can appreciate, an 8-bit, 24-bit or other size representation may equally be used. In actuality only a single bit is needed to represent the monochrome bi-level bitmap image of FIG. 68(*a*), as only two states are present: white (0) and black (1). As an example, pixel 8650 is shown as a white, or non-printing pixel. The data 8670 associated with pixel 8650 contains all 0's because the pixel is white or non-printing. Pixels such as 8690 and 8660 are black, or printing pixels, and are represented by the data word "001".

FIG. 68(*b*) shows the pixel-wise translation of image attributes from monochrome to color in accordance with one embodiment of the present invention. When the data associated with pixel 8690 of FIG. 68(*a*) is translated from "001" to "010", the image attribute of pixel 8690 is translated from black to the color (or pattern) identified as 8700 in FIG. 68(*b*). Likewise when the data associated with pixel 8660 of FIG. 68(*a*) is translated from "001" to "100", the color (or pattern) of 8660 is re-mapped from black to the color (or pattern) of 8770 in FIG. 68(*b*). Several additional examples of image attribute translation are supplied in FIG. 68(*b*) but without further discussion.

Figure 69A:
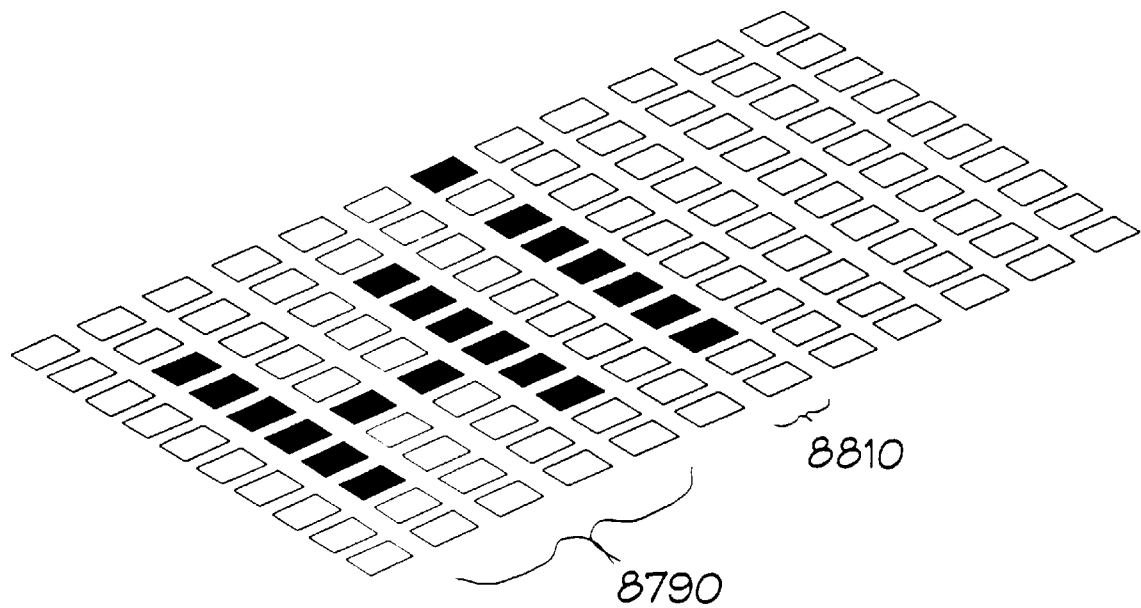
Figure 69B:
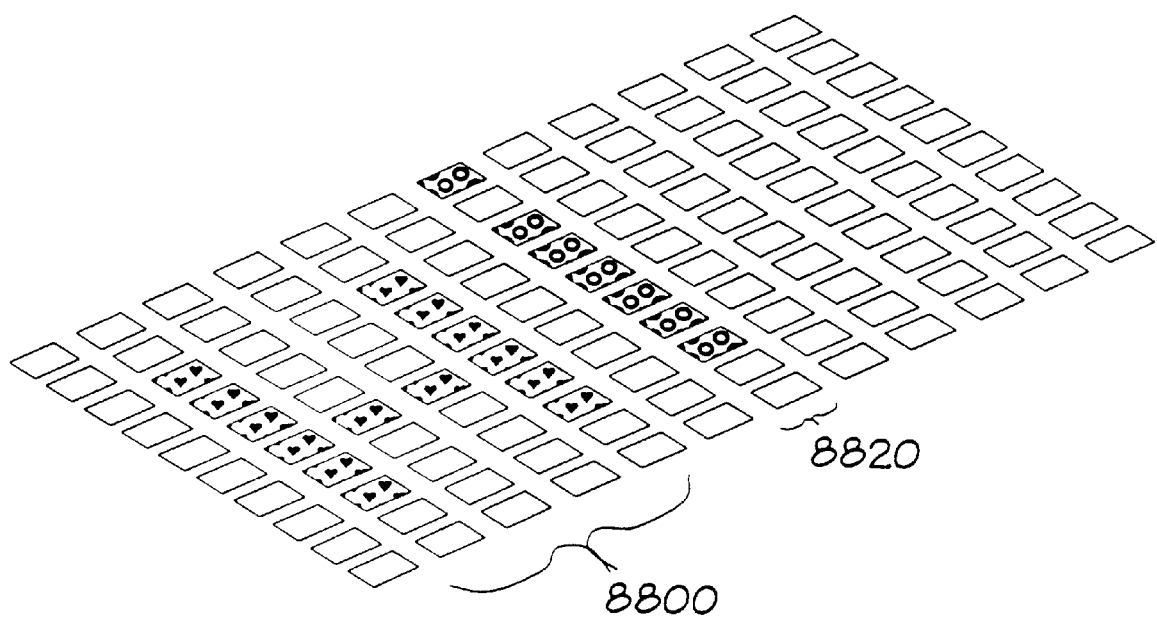

FIGS. 69(*a*) and (*b*) illustrate the transformation of pixels in a received image (FIG. 69(*a*)) to a displayed image (FIG. 69(*b*)). FIG. 69(*a*) shows the monochrome bitmap of the word "Hi". All of the black pixels which comprise the letters "H" and "i" are represented by the data word "001", which is consistent with what was seen in FIG. 68(a). A monochrome bi-level representation of a page of a conventional fax document containing the word "Hi" can be constituted in the manner illustrated in FIG. 69(a). FIG. 69(b) shows what happens when all pixels represented by data of a first form "001", are translated to data of a second form. The letter "H", 8790 in FIG. 69(a), has all of its "001" pixel data words translated to "100" data words. 8800 in FIG. 69(b) shows the consequence of this translation of the associated image data. Similarly, the letter "i" of FIG. 69(a), 8810, has all of its "001" pixels translated to "110" data words. The result is a letter "i" with the image attribute 8820 shown in FIG. 69(b). Typically, image transformation is not done on an individual character basis as illustrated in FIG. 69, but transformation on a character basis is possible using the exemplary document image processing language of the present invention. Alternatively, rather than displaying the document image on a display device such as a computer monitor, it may be displayed in hard copy format using a color printer.

While the image data of pixels shown in connection with FIGS. 68 and 69 were depicted as being comprised of 3-bit code words, this was only for purposes of simplifying the illustration. Longer data words may be used. Indeed, longer data words are preferred. Longer code words permit a wider range of possible image attributes to be supported.

FIG. 70 shows some examples of the use of a document image processing language to convey instructions or operations to be performed on designated portions of document images. Double bracket delimiters 8470 are used to signify that the portion of the document image within the double brackets comprises a designated portion upon which an operation is to be performed. It should be understood that this represents but one possible way to identify designated portions—any predetermined attribute of the portion of the document image may be used. For example, a convention may be established whereby bold-face type indicates that the text should be displayed in blue, italics indicate that the text should be displayed in red, etc. In this manner, neither delimiters nor codes indicating the color for the delimited text need to be added to the document image.

In FIG. 70 the designated portion DP1 is to have its black pixels translated to red as indicated by a transfer function 8490 identified as "R." Similarly, designated portion DP2 will have its black pixels translated to green as indicated by a transfer function 8490 identified as "G." Transfer function identifiers R and G convey information pertaining to the transformation of image attributes from a first form to a second form by translating, or re-mapping, image data associated with the specific pixels within the designated portion of the document image as discussed above. For example, the transfer function identified as R may translate image data words from a value of "001" to a value of "111."

In connection with DP3 of FIG. 70, transfer functions 8490 are placed in position (D), in the lower right corner of the designated portion of the image. Connection identifiers are placed on the left side of designated portions, in positions (A) and (B). Connection identifiers include link sequence number 8500 and sequence element I.D. number 8510. Position (C) is used to specify electronic links to electronic reference information.

DP4 of FIG. 70 has a link sequence number 8500 of "1." Thus the image information of document portion DP4 belongs to a first linked sequence. A sequence element I.D. number is not shown which indicates that the default sequence element I.D. number of "1" is assigned to DP4.

Document portion DP5 is also part of Linked Sequence "1". It has a sequence element I.D. number of "2," and thus is the second member in linked sequence "1." Note that the sequence number of DP5 is "1" and not "2." A sequence number of "2" would signify that DP5 is part of a second linked sequence as opposed to the first linked sequence. DP6 is a second example of a document portion belonging to a first linked sequence, in which it is the second member of the sequence. DP6 also contains an electronic link to electronic reference information. The electronic reference information associated with DP6 may be acquired in the manner previously described.

The sample document image processing language described in connection with FIG. 70 also supports the case where the electronic reference information to be linked to a portion of the document image is in the form of optically encoded data imprinted on hardcopy, where the hardcopy is received as part of the incoming document stream. Using DP3 ("Gates-Mail", or G-Mail) for illustration, the portion of the document image making the call to electronic reference information is marked as follows: locus-C, 8520, is provided with the number of the piece of electronic reference information to be linked to that portion of the document image, e.g. "1." Each portion of optically encoded data is marked as follows: locus-D, 8490, is marked with an "X." The symbol "X" has been selected to designate optically encoded information. Locus-A, 8500, is marked with a numeral which matches the current piece of electronic reference information, e.g. "1". Therefore, locus-A for the optically encoded data portions matches Locus-C for the portion of the document image to be electronically linked to the optically encoded data; locus-B is marked with the number of the particular portion of optically encoded data— for example "1" if there is only one optically encoded portion, and "1" and "2" respectively in association with the first and second portions, where there are two optically encoded data portions. This is illustrated and described further below in connection with FIG. 72.

The foregoing illustration represents one possible embodiment of a document image processing language of the present invention. Other embodiments are possible. It will also be appreciated by persons skilled in the art that some of the methods taught herein may be extrapolated to document images specified using page description languages.

FIGS. 71(a) and 71(b) show that the delimiters graphically added to document images may be electronically erased from the electronic representations of the images they appear in. That is, the graphical identifiers added to hardcopy need not appear in their received versions. Shown in FIG. 71(a) are the pixels of delimiters 8830 and the "1" bits 8850 which code for them. (Single bracket delimiters are depicted in the drawing for simplicity) After the delimiters have been found by pattern matching performed on the electronic representation of the document image, the "1" bits 8850 which make up the delimiter pixels can be translated to "0" bits 8860, yielding clear, or background color pixels 8840. Auto-erasure of delimiters also demonstrates that delimiters are not always necessary. In many instances document portions may be designated by a predetermined attribute of the portion. For example, the presence of a pixel density (shade) greater than a predetermined level may, by agreement between sender and recipient, denote an area to be translated into red. Thus, rather than using graphical delimiters to designate a portion of text and another symbol to identify a transfer function, it is possible to simply define pixel densities as representing different colors within the document image processing language. In this manner, no symbols need be added to the document—it is only necessary to alter the appearance of the text itself in a predetermined manner.

FIG. 72 provides two examples of how optically encoded data present in the transmitted document stream may be specified using the sample document image processing language disclosed herein. The optically encoded data may comprise audio or video data in optically encoded format. In FIG. 72, 8880 represents a first portion of a document image to be electronically linked to electronic data appearing in optically encoded form. Because 8880 is the first portion to be so linked, 8940 is marked with a "1". Because 8880 is to be electronically linked to optically encoded data which needs to be translated into electronic format in order to be of use, 8950 is marked with an "X". The actual optically encoded data is comprised of 8890 and 8900. To designate 8890 as a piece of optically encoded data, an "X" is placed next to the lower right corner of the delimited portion, 8980 containing the optically encoded data. To designate 8890 as a piece of optically encoded data associated with the first portion (8880) of the document image having an electronic link to optically encoded data, 8960 is marked "1". Similarly, 9000 is also marked with a "1" to designate 8900 as another piece of optically encoded data associated with the portion 8880 of the document image. To identify 8890 as the first of two parts of a single unified piece of optically encoded data, 8970 is marked with a "1". The sample image processing language of the present invention permits each piece of optically encoded data to be comprised of a plurality of parts. In the example in FIG. 72, the optically encoded data is comprised of two parts: 8890 and 8900. The second part 8900 of the single piece of optically encoded data associated with document portion 8880 is marked with a "2", 9010, in the lower left of the image portion containing 8900. The second example of FIG. 72 can be seen to parallel the first, just-described, example. In the second example, document image portion 8910 is to be electronically linked to a piece of optically encoded data also comprised of two pieces: 8920 and 8930. Note however, that because 8910 represents the second portion of the document image to be electronically linked to optically encoded data, 9020 is marked with a "2". For corresponding reasons, 9050 and 9080 are also marked with a "2".

In FIG. 73 a handwritten hardcopy document, 10010, is shown being fed into the document scanner of an ordinary facsimile machine, 10012. Document 10010 contains portions to be electronically linked to electronic reference information. In the present illustration the electronic reference information is comprised of instructions and/or data which may be used to establish a connection with a remote location. As discussed earlier, whereas a variety of predetermined attributes of the document image may serve to identify electronically linkable portions, in FIG. 73, delimiters are shown.

FIG. 74 illustrates one embodiment of a fall-back option under the Dual Disconnect Protocol (D$_2$P) described in connection with FIGS. 48 and 58. In FIG. 74 the sending station has already finished transmitting the electronic graphical representation of the document image, and is now attempting to negotiate an optimum mode for the automated transmission of electronic reference information to the receiving station. The embodiment shown represents but one possibility and is not meant to be limiting. After the sending station transmits the DCN signal (which would cause a conventional receiving fax apparatus to hang up) it sends the DTMF "*" tone of 941 Hz+1209 Hz, followed by CNG which consists of an 1100 Hz tone that is intermittently on for 0.5 seconds and off for 3 seconds. The receiving apparatus responds by sending "VOA" to indicate that it is capable of receiving electronic reference information in an automated session from the sending station. A specific setup may then be negotiated between sending and receiving stations based on the capabilities common to both sets of equipment at the two locations. The electronic reference information may then be transmitted. These concepts would be appreciated by persons skilled in the art of handshaking procedures between pairs of communicating data transmissions devices. Also, while the sending station is depicted as sending a DCN signal followed by the "*" tone, this is not mandatory. It is not a requirement for the receiving station to operate in "Silent Answer Mode". In alternate embodiments the receiving apparatus may issue a response such as a tonal reply or voice message following receipt of the "DCN" signal from the sending station.

FIG. 75 illustrates an example of a voice menu generated by the apparatus at the receiving station to assist an operator at the sending station through the process of creating electronic reference information for a fax document. The voice menu system of FIG. 75 may be used even in the case where a fax document and its associated electronic reference information are transmitted using Simultaneous Voice-Data (SVD) technology. However, in FIG. 75 it is depicted within the context of the Dual Disconnect Protocol (D$_2$P), because that communications scheme offers backwards compatibility with the prior art such as conventional facsimile machines operating on the public switched telephone network. It should be understood that the present invention is not constrained with respect to the temporal sequence in which a fax document and its associated electronic reference information is transmitted. In FIG. 75, after receiving the "*" tone, the receiving apparatus may issue a series of messages 10059 as part of its voice menu, beginning with the announcement: "Entering Fax Phase II". This announcement, of course, is furnished for the sake of example and should not be construed as limiting. When the person at the sending station hears the desired option in the voice menu, that choice may be selected, 10063, by pressing the appropriate key on the telephone keypad. These practices are well known in the art of voice menu driven systems.

FIG. 76 shows some of the voice menu options. For example, to create notes—including voice notes, one would press the "1" key to enter the notes menu, and then the "1" key again to access the audio sub-menu. Within the audio sub-menu additional instructions are furnished to assist a user through the process. 10087 shows part of the notes menu. 10089 shows some of the menu choices offered for the "Talk-Back" feature. The "Talk-Back" feature allows the recipient of a fax document to automatically establish a connection with a remote site, by simply selecting (such as by clicking on . . . ) the portion of the fax document making the reference to the remote site. For example, if the remote site happens to be someone's voice telephone number, that telephone number will be automatically dialed by the apparatus 1000. If the remote site happens to be a WEB site on the Internet, the apparatus 1000 will establish a connection to the Internet and then download the indicated information. 10089 in FIG. 76 also shows that, for example, the key sequence "2" and then "2" and then "2" again permits an operator at a sending station to designate a number for a fax-on-demand server.

FIG. 76 illustrated how an operator at a sending station could use the voice menu system provided by the apparatus at the receiving station to manually select and then input electronic reference information to the receiving apparatus. FIG. 77 shows how a telephone key pad 10140 may be used to pass alphanumeric information onto the receiving apparatus. Methods for communicating alphanumeric information using a standard telephone key pad are known in the art. The e-Mail address: "sjr@nasa.org", 10162, may be keyed in by the sequence 10165. Similarly, the Internet Web address 10169 may be input using the sequence 10167. Also, while it is common practice to employ "dual-digit encoding" in inputting alphanumeric information using a telephone keypad, for instance, the letter "s" is comprised of the key sequence 73 because "s" appears on the "7" key and is the $3^{rd}$ choice out of the letters appearing on the "7" key: "PRS"—other arrangements are also possible. For example, triple-digit encoding may be used. It is also possible for embodiments of the receiving apparatus capable fo voice recognition to accept address information from the sending station in the form of a spoken human voice.

FIG. 78 depicts the handwritten paper document 10010 of FIG. 73 on the screen of the receiving apparatus. In the on-screen version of the document 10205, are four regions that are electronically linked to electronic reference information: 10220, 10223, 10225 and 10227. These regions correspond to the portions of the original that possessed the predetermined attribute designating them as link regions. This can be seen in FIG. 73, where the names Mary, Steve, Sonia and Susan were enclosed in delimiters. Whereas link regions 10220, 10223, 10225 and 10227 may be displayed using highlight boxes, in FIG. 78 they are instead displayed in color, for example, in green. The method for accomplishing this, namely by re-mapping screen display attributes, has been taught above (See FIGS. 63, 64, 66, 68, 69, 71). Therefore, a user may designate just how linked regions are to be displayed on the screen; which is not always in highlight boxes. In FIG. 78 a cursor 10255, in the form of an arrow, is pointing to the name "Mary", 10227, which is linked to electronic reference information comprised of contact information. Whenever the cursor passes over a linked region its attributes are displayed. In the case of 10227, the portion of the document image containing the name "Mary" makes use of the "Talk-Back" feature of the present invention. Therefore, by double clicking on the name "Mary" a recipient of fax document 10010 can have the receiving apparatus automatically establish contact with, for instance, Mary. The "What box" 10215 identifies the electronic reference information associated with the region "Mary", 10227, as that of a voice telephone number: "Telephone.Voice". The receiving apparatus knows this because the sending station, in using the "Talk-Back" feature 10089 in FIG. 76, made a selection from the menu which identified the input data as being "For Voice Telephony". The "Where-Box" 10210 shows the contact address, for example the voice telephone number: 535-3665. By pressing the "Open" button in the menu 10206, an operator will cause the receiving apparatus to establish a connection to the "Talk-Back" address, which in the present example, means dialing the voice telephone number 535-3665, and then automatically turning on the microphone and speaker of the receiving apparatus (1000). A "Talk-Back" address can be other than a voice telephone number. For example, in FIG. 78 it may also be a fax number such as 10236, a beeper number such as 10233, or an e-Mail address such as 10235, etc..

FIG. 79 shows how a "Talk-Back" connection can be made from the Connection Processor window. The option of using the Connection Processor window can be selected by a user from the "Preferences" option, which is accessed from the "Mode" button in the menu bar 10206. When the cursor 10255 passes over a linked region such as 10277, the attributes of the link region are displayed, as in 10210 and 10215. If the cursor is then moved to another region of the document image that is free of linked information, the boxes 10210 and 10215 will be blank. However, by clicking once over a linked region the address associated with that region will be loaded into the information boxes 10210 and 10215, so that if the cursor then moves off of that linked region, and onto a link-free area, the already-loaded information will remain displayed in the boxes 10210 and 10215. A user may then click on the "Open" button in the menu bar 10206 to bring up window 10258 into the Connection Processor. Alternately (if this mode has been set), double clicking on a link region having a contact address will open the Connection Processor window 10258. It is also possible to select a setting whereby double clicking on a region having a contact address will directly cause a connection to be established, without the intervening Connection Processor window popping up. In FIG. 79, the Connection Processor window 10258 displays the contact address, or "Target" 10247, as well as its "Type" 10249.

FIG. 80 shows an example where a connection will be established with an alphanumeric pager. In the handwritten letter, 10205 of FIG. 80, there is one person: Sonia 10223, who is to be contacted through her paging unit. When cursor 10255 is placed over the name "Sonia": 10223, the What-Box 10215 displays "Pager.Alphanumeric" to indicate that the address of "617.879.4321", which is displayed in the Where-Box: 10210, is for an alphanumeric paging unit. Pressing "Open" 10287 in the menu bar 10206 will bring up the Connection Processor window 10258. If Sonia's paging unit had been of the straightforward numeric-only variety, a connection would have been directly established that is, the apparatus would have transmitted its own number to Sonia's device. However, because Sonia's unit is an alphanumeric pager, the Connection Processor window opens to let the operator input text to be sent to Sonia's alphanumeric pager. This is illustrated in FIG. 81. Double clicking on "Sonia" 10223, or single clicking on "Sonia" 10223 and then pressing the "Open" button in menu bar 10206 causes the Connection Processor window 10258 to pop up in FIG. 81. This time, the "Type" identifier 10249 displays "Alphanumeric Pager", and the "Target" identifier 10247 shows the pager's number. Text entry box 10264 is provided for entering text to be sent to the paging unit. Note that the cursor 10255 transforms itself into an I-Beam 10269 when it is situated within the text entry box 10264. Pressing the "Yes" button 10273 will cause the text entered in the text entry box 10264 to be sent to the alphanumeric pager at the "Talk Back" address specified.

FIG. 82 illustrates a handwritten letter 10510 that includes a "Talk-Back" address in the form of an Internet World Wide Web address. In FIG. 82 an individual has pasted a business card 10520 to a handwritten letter 10510. That business card includes references to an ordinary telephone number, a fax-on-demand number, and the URL of a company's web site. As a convenience to the intended Borg recipient of the letter, the author of the letter wishes to make use of the "Talk-Back" feature of the present invention to enable the receiving apparatus to automatically contact the company named in the attached business card for the addressee. The linked portions of the fax letter are chosen to be 10550 and 10530, because these are the portions of the attached business card which display contact information. They are designated using delimiters 10555, although, as mentioned repeatedly above, this is not the only means for designating linked portions.

In FIG. 83 the letter 10510 is sent using a conventional facsimile machine 10012; the pertinent "Talk-Back" information is then keyed in using the telephone keypad 10140. The Web address "www.pie.com", 10165, is entered as the sequence of numbers depicted as 10167. The fax number 10171 is entered as the sequence of numbers 10173. And, similarly, the voice phone number 10175 is input as the numeric sequence shown as 10177.

FIG. 84 shows how the business card 10520 of FIG. 82 appears on the screen of the receiving apparatus. Notice that the delimiters 10555 have been auto-erased as taught in connection with FIG. 71, and thus do not show up on 10521. When cursor 10255 moves over region 10551, the "Where-Box" 10210 reveals that the "Talk-Back" address is that of a Web site: "www.pie.com". The "What-Box" 10215 indicates that the region 10551 possesses two "Talk-Back" addresses, and that the web address of "www.pie.com" is only the first of the two: "[1 of 2]". The "What-Box" 10215 further shows that the web address "www.pie.com" is the only web address present "(1/1)". For example, had there been another web address reference, the "What Box" 10215 would have instead showed "[1 of 3] Web (1/2)". The business card 10521 in FIG. 84 also includes a reference to a voice telephone number, which is associated with region 10531. Notice that an up arrow 10277 and a down arrow 10278 have appeared adjacent to the "What" and "Where" boxes. These permit a user to scroll to specific "Talk-Back" addresses when there are a plurality of such addresses associated with a particular region of the document image. If the user were to press the "Open" button 10287 now, a connection to "www.pie.com" would be established by the Connection Processor in fulfillment of the "Talk-Back" request made by the user. Thus a fax document, which may even be handwritten, and which may be transmitted using an ordinary facsimile machine, can allow the recipient of the document to establish contact with a Web site by simply selecting the portion of the received fax document that refers to the Web reference.

FIG. 85 shows the use of the down arrow 10278 to scroll to the second of the two "Talk-Back" addresses linked to region 10551. The cursor 10255 is illustrated on top of the down arrow 10278. The "What-Box" 10215 accordingly indicates that the second "Talk-Back" address supplies a Fax-On-Demand number. Pressing "Open" 10287 will cause a connection to be established to the Fax-On-Demand server at the number indicated in "Where-Box" 10210.

FIG. 86 shows another example involving a "Talk-Back" address comprised of a Web site. Consider the following scenario. A person sees an advertise for a theatre in the bus on the way to work. Anxious to obtain show information, she calls while still on the bus, using her cellular phone, the number displayed in the ad. The theatre's fax-on-demand server answers her call and processes her request for information, in a manner well known in the art of fax-on-demand devices. She gives it the number of her fax tablet (i.e. device 1000 of FIG. 41) which is sitting in her office charging. By the time she arrives at work, document 12210 shown in FIG. 86 has already been received by her fax tablet. In document 12210 is an icon, 12220, depicting a butler, or "server", seen holding a tray containing a computer—which is serving documents. This icon may be clicked on to retrieve from the theatre's web site a symbolically encoded version of document 12210; which may be desirable in instances where the received fax document is not completely clear. Thus clickable icon 12220 furnishes the option of obtaining an "Internet copy" of the document, when they are available. Highlight boxes 12231 and 12233 are regions which enable automatic connections to be made to voice telephone numbers, via the "Talk-Back" feature of the present invention. 12237 re-establishes contact with the fax server which originally sent document 12210. And, 12235 generates a connection to an "STS" server (Station-To-Station Server), which is discussed in a co-pending patent application. The box labeled "December", 12215 in FIG. 86, contains a link to the theatre's web site which is represented as 12240. Therefore, by clicking on 12215 a user may access the web page 12240. Within the web page 12240 are buttons 12251 for seeing video sequences of sneak show previews; 12253, for obtaining ticket information; and 12255, which retrieves a seating plan for the theatre. The just-mentioned concepts which relate to operation solely within the context of the Web are known in the art, and, in the absence of regard for connectivity from an ordinary fax document, are also extraneous to the object of the present invention.

Because the apparatus 1000 may be operated as a portable unit communicating over a cellular connection (see FIG. 43a), it is desirable that the cellular connection be as resistant to cloning as possible. FIGS. 87 and 88 illustrate one embodiment of a system using "Dynamic PassCode Protection" to hinder cellular cloning. In particular, FIGS. 87 and 88 depict a specific embodiment of Dynamic Pass-Code Protection using a "Dual Component" approach.

In FIG. 87, a portable apparatus 1000 is establishing a connection with the nearest transmission station 13107 of a cellular service provider. In current art systems identification information is transmitted by the mobile unit to identify itself to the cellular service provider. More recently, in addition to the identification information, a PIN number is also transmitted. With the Dual Component Dynamic Pass-Code approach taught herein, the conventional PIN number is replaced by a PassCode which is the equivalent of the PIN number, except that the PassCode is changed immediately following the successful establishment of a cellular connection. Therefore, immediately following establishment of a connection, the just-used PassCode is invalidated. Thus if it is intercepted by a cellular thief it will no longer be of use. The algorithm applied to generate the dynamic passcode is contained in the firmware of the apparatus 1000; it is also known by the computer of the cellular service provider so that both may generate new passcodes in synchrony. A multiplicity of algorithms may be available such that any two portable units 1000 have a low statistical likelihood of having firmware containing the same algorithm. Also, the algorithm is contained in the firmware of the apparatus 1000 so that it will be more difficult to re-program with a new algorithm. Only the manufacturer of the apparatus 1000 knows which algorithm is contained in any given unit, although the necessary data associating each unit with its algorithm is passed on to the cellular service provider. It is further possible for each apparatus to include multiple algorithms, one of which may be designated as active at the time cellular service is first initiated. As shown in FIG. 87, the PassCode is generated preferably using two functions: "f" and "g". First, a dynamically changing variable is generated based on a function "g" of a number referred to as the "Co-PIN Number". The actual PassCode itself is then generated based on a second function "f" of the user's PIN Number and the dynamic variable g(Co-PIN #). Thus PassCode=$f$(PIN #, g[Co-PIN #]). The dynamic variable may be furnished by a number generator (i.e. function "g") which uses the Co-PIN# as its "seed", for instance. Variations on the theme are also possible, for example, using g(PIN#, Co-PIN#) either with another function "f" or alone, etc. It is also possible for the PassCode to be calculated using only the Co-PIN#.

FIG. 88 shows one method of synchronizing the Co-PIN Number between a cellular service provider and a cellular customer. It is preferred that a cellular customer call, using a conventional wired line, a telephone number reserved for establishing Co-PIN Numbers by the cellular service provider (e.g. 1.800.GetCode). Upon reaching a computer at the called number, the customer would provide information such as the phone number of the portable unit and the PIN #, and obtain in return from the computer, a new Co-PIN #. This may be done as frequently as desired. However, although it is not preferred, an optional method for obtaining Co-PIN numbers using a cellular connection is illustrated in FIG. 88.

In FIG. 88 a portable apparatus 1000 receives a "Secure Envelope" 13126, from the nearest transmitting station 13107 of the cellular service provider. The Secure Envelope contains the new Co-PIN Number 13133. In order to "open" the Secure Envelope 13126, the customer's PIN Number 13129 is required. The Secure Envelope may comprise any suitable scheme known in the art of data encryption for encrypting, or for otherwise containing or conveying the customer's Co-PIN # 13133, such that the PIN Number may be applied to extract the Co-PIN #.

The method shown in FIGS. 87 and 88 therefore offers a dynamic PassCode in place of the static PIN number currently used in the art. Additionally, the algorithm used to generate the dynamic passcode varies with the apparatus so that even knowledge of the correct PIN# and Co-PIN# is insufficient. Further, the customer's PIN# is never transmitted over the airwaves, and so is kept confidential. Still further, even when the Co-PIN# is transmitted over a cellular connection, it is contained within a Secure Envelope so that its interception alone is inadequate.

The presently disclosed embodiments are to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method for retrieving Internet information using facsimile data received with a facsimile reception protocol, comprising:

receiving facsimile data using a facsimile reception protocol, said facsimile data containing a portion linked to an Internet address;

obtaining Internet address information for said portion of received facsimile data;

automatically applying said obtained Internet address information for establishing establishing communication with said Internet address;

retrieving information from said Internet address; and displaying at least one of the received facsimile data and the retrieved Internet information.

* * * * *